United States Patent
Maeda

[19]
[11] Patent Number: 6,026,192
[45] Date of Patent: *Feb. 15, 2000

[54] IMAGE PROCESSING USING PROGRESSIVE ENCODING OF IMAGE DATA

[75] Inventor: Mitsuru Maeda, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/751,792

[22] Filed: Nov. 18, 1996

Related U.S. Application Data

[63] Continuation of application No. 08/229,735, Apr. 19, 1994, abandoned.

[30] Foreign Application Priority Data

Apr. 21, 1993 [JP] Japan ................................. 5-094378

[51] Int. Cl.[7] ................................................ G06K 9/36
[52] U.S. Cl. .................... 382/232; 382/240; 382/302; 382/299
[58] Field of Search ................................ 382/232, 302, 382/240, 298, 299; 395/164, 146; 348/396; 358/500, 456, 447

[56] References Cited

U.S. PATENT DOCUMENTS

| | | | |
|---|---|---|---|
| 4,743,959 | 5/1988 | Frederiksen | 348/396 |
| 5,050,230 | 9/1991 | Jones et al. | 382/240 |
| 5,134,495 | 7/1992 | Frazier et al. | 358/456 |
| 5,159,468 | 10/1992 | Yoshida et al. | 358/447 |
| 5,231,679 | 7/1993 | Matsuura et al. | 382/232 |
| 5,255,364 | 10/1993 | Hirose | 395/164 |
| 5,309,524 | 5/1994 | Hirabayashi et al. | 382/47 |
| 5,371,606 | 12/1994 | Katayama et al. | 358/400 |

FOREIGN PATENT DOCUMENTS

| | | | |
|---|---|---|---|
| 152355 | 8/1985 | European Pat. Off. | G06F 15/40 |
| 388160 | 9/1990 | European Pat. Off. | G06K 15/00 |
| 449529 | 10/1991 | European Pat. Off. | H04N 1/32 |

OTHER PUBLICATIONS

Yasuda, "Progress in Multimedia Coding Standard", in Signal Processing of HDTV, II, Chiariglione, ed., 1989, pp. 431–443.

Linotype–Hell, Referenzhandbuch LC, 1992, pp. 4–1 through 4–13 and 7–3 through 7–8.

Yamazaki et al., "Progressive Build–Up Coding Scheme for Bi–Level Images—JBIG Algorithm—", Journal of Institute of Image Electronics Engineers of Japan, vol. 20, No. 1, 1991, pp. 41–49.

*Primary Examiner*—Jose L. Couso
*Assistant Examiner*—Anh Hong Do
*Attorney, Agent, or Firm*—Fitzpatrick, Cella, Harper & Scinto

[57] ABSTRACT

An image processing apparatus and method for use with image data encoded in layers (progressively), capable of displaying image data in each layer and confirming the image at each layer, is provided. When an image is encoded, the inputted image data is stored in a frame memory, and reduced to ½ size, and then, stored in another frame memory. Encoding is performed based on the image data before and after the reduction. Whenever the reduction is performed, the reduced image is displayed on display. In decoding, the encoded data is decoded at each layer, and the decoded image data is stored in the frame memory. The image data at each layer can be displayed on the display. If an entire image is displayed at the resolution of the display, the image is to be enlarged at an appropriate magnifying power. If not, a part of the image is displayed. Accordingly, an operator can encode/decode while confirming the image.

24 Claims, 40 Drawing Sheets

IMAGE PROCESSING USING PROGRESSIVE ENCODING OF IMAGE DATA

This application is a continuation of application Ser. No. 08/229,735 filed Apr. 19, 1994, now abandoned.

BACKGROUND OF THE INVENTION

The present invention relates to an image processing apparatus and method of encoding progressive build-up image data, and decoding the encoded image data.

The concept of progressive build-up coding technique relating to the present invention is first described. The technique is described in Technical Survey "Progressive Build-up Coding Scheme for Bi-level Images—JBIG (Joint Bi-level Image Group) Algorithm" in *The Journal of the Institute of Image Electronics Engineer of Japan* Vol. 20, No. 1. The object of the progressive build-up coding is to grasp an entire image in a short time, and the conceptual diagram is shown in FIG. 40. The resolution of an input image is assumed to be 400 dpi to simplify the description. First, on the encoder side, the processing of reducing the image (a rectangular square 241 in FIG. 40) to ½ in width and length is repeated n times, and n reduction images where the smallest size of the image is $2^{-n}$ of the input image are generated. The input image is referred to as a "zero layer" image, and the image at the lowest resolution is referred to as an "n-th layer" image. In the Figure, since the reduction processing is repeated five times, the input image is reduced to $2^{-5}$, and the fifth layer image (an rectangular square 242 in FIG. 40) is obtained. As a reduction processing, a method capable of suppressing deterioration of information is adapted so that the information of an entire image at the low resolution such as 12.5 dpi or 25 dpi can be grasped (Note that the PRES method is adopted in the JBIG algorithm).

The n-th layer image at the lowest resolution is independently encoded, and an image at other layer is encoded with reference to the image whose resolution is one layer lower than the image to be encoded. That is, the i-th layer image (i=0, 1, . . . , n−1) is encoded with reference to the (i+1)-th layer image. In the JBIG algorithm, encoding is performed by arithmetic coding. In the JBIG algorithm, the encoding unit is a stripe obtained by dividing an image in a sub-scanning direction. At the leading portion of the data in the JBIG algorithm, the header data containing such information as the image size of the zero layer image, stripe width, number of layers is provided, and the obtained encoded data follows.

When decoded, the encoded data of the n-th layer image, the highest layer, is decoded first. The display is started with the image at the lowest resolution. The display is performed so that the resolution increases as information is supplied by enlarging the j-th layer image (j=n−1, . . . , 1, 0) to $2^j$ in the width and length. That is, the fifth layer image is enlarged to $2^5$, and then, the fourth layer image is enlarged to $2^4$.

In the conventional technique, a problem arises when the image is displayed while being decoded. In general, the resolution of a display is lower than that of the printer. For example, in a 17-inch display for a work-station, the number of pixels is 1280×1024, and the resolution is approximately 100 dpi which is considerably lower than that of the printer. In the case of FIG. 40, an image greater than 80 mm×50 mm cannot be displayed at the resolution of 400 dpi. Accordingly, it is difficult to display the original image based on the resolution of the display.

Furthermore, if the image at each layer is decoded, and then displayed, a user is uncomfortable because progressive stages in the decoding processing cannot be shown until the developing at each layer has ended.

Furthermore, various images at the zero layer image such as an original image whose resolution is different cannot be dealt with.

Still further, when encoded, the image display of the image varies when an original image is reduced at different magnifying power. However, in the conventional technique, the image cannot be confirmed during the encoding processing, and the image is confirmed at the decoding side. Accordingly, switching of the binarizing method at the reading of the image data or density adjustment to perform under color removal is difficult.

SUMMARY OF THE INVENTION

Accordingly, it is an object of the present invention to provide an image processing apparatus and method capable of outputting the decoded image data so as to be easily seen in accordance with the layer of the decoding.

It is another object of the present invention to provide an image processing apparatus and method capable of confirming the image at each layer while the image is being encoded in each layer.

It is another object of the present invention to provide an image processing apparatus and method capable of dealing with various images whose zero layer images are different.

It is another object of the present invention to provide an image processing apparatus and method capable of determining the image data to be decoded while an operator confirms the reduced image.

It is still another object of the present invention to provide an image processing apparatus and method capable of printing the image after the operator confirms the image decoded to a desired layer.

It is still another object of the present invention to provide an image processing apparatus and method capable of flexibly coping with the change of resolution of the image input source.

It is still another object of the present invention to provide an image processing apparatus and method capable of easily encoding and decoding an image while the window of the display is confirmed.

It is still another object of the present invention to provide an image processing apparatus and method capable of displaying an image by changing the display scale in accordance with the resolution of the image to be encoded or decoded and the resolution of the display.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

[The First Embodiment]

Figure 1:
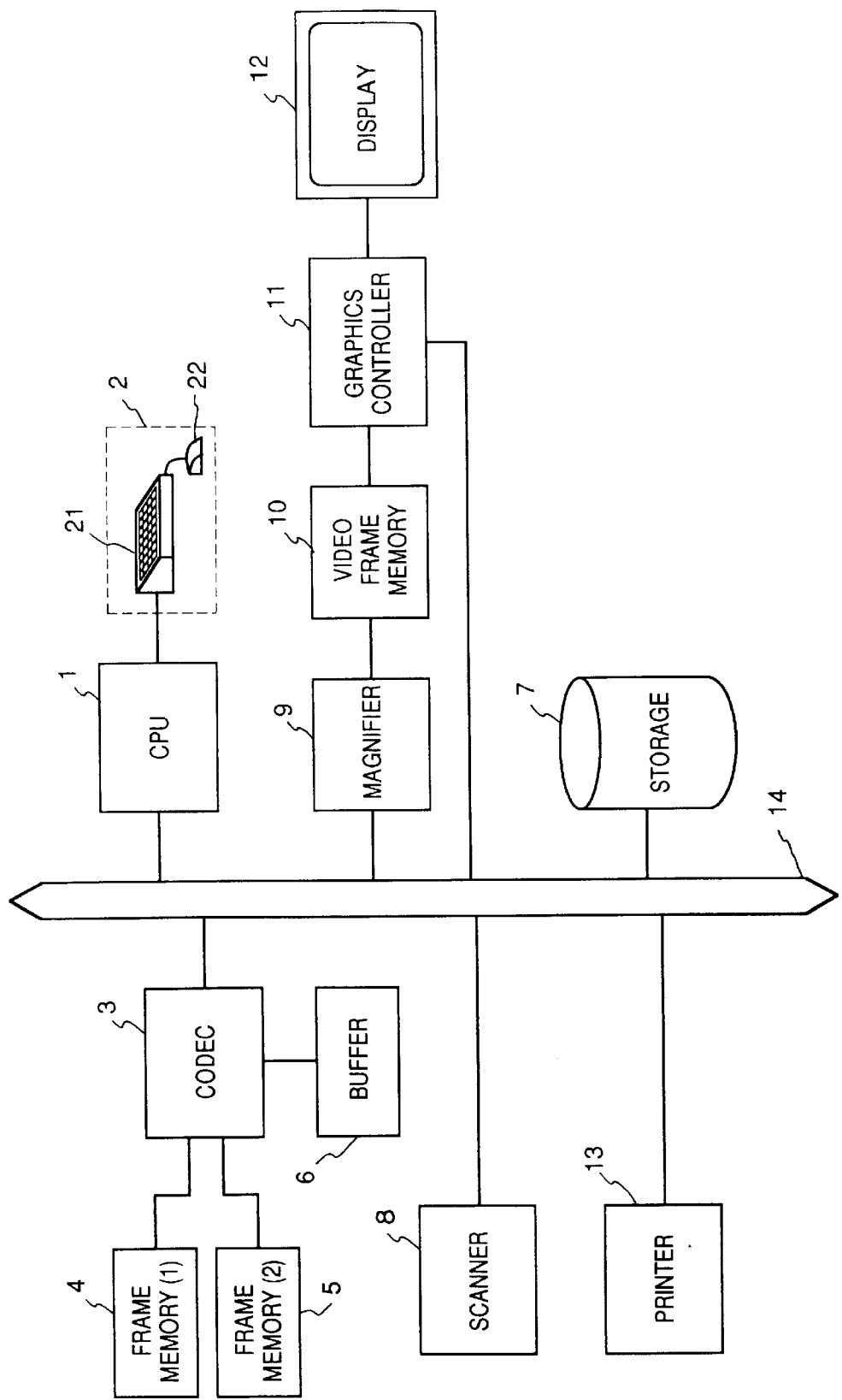
FIG. 1 is a block diagram illustrating the image processing apparatus of a first embodiment according to the present invention.

FIG. 1 is a diagram illustrating the feature of the image processing apparatus of the embodiment of the present invention.

<Structure of the Apparatus>

In FIG. 1, CPU 1 processes header information and controls the entire apparatus. The CPU 1 executes programs stored in a memory, and this memory and other memories required for executing the programs are included in the CPU 1. The input apparatus 2 includes a key board 21 and a mouse 22 to input commands from a user.

CODEC 3 encodes images. To simplify the description, the JBIG algorithm is taken as an example. Frame memories 4 and 5 store generated images. Buffer 6 stores progressive build-up encoded data. Storage 7 is comprised of, e.g., a magnetic storage to store the encoded progressive build-up data. Scanner 8 reads image data. Note that the resolution of the scanner 8 is 400 dpi.

Magnifier 9 magnifies an input image at a predetermined magnifying power. Graphics controller 11 generates graphics by control instructions from the CPU 1, and displays the image in a video frame memory 10 by generating windows, the panel for image input, the complementary display by inverting the image in the video frame memory, and the cursor operated by the mouse 22. Note that the resolution of the display 12 is 100 dpi.

Printer 13 prints reproduced image data. Note that the resolution of the printer 13 is 400 dpi. The bus 14 connects to those units to transmit/receive data or control instruction.

The resolutions of the scanner 8, display 12 and printer 13 are automatically set in the CPU 1 respectively when the power of the apparatus is turned on. In the embodiment, the resolution is set as 400 dpi for the scanner 8, 100 dpi, the display 12, and 400 dpi, the printer 13.

<Encoding Procedure>

Figure 2:
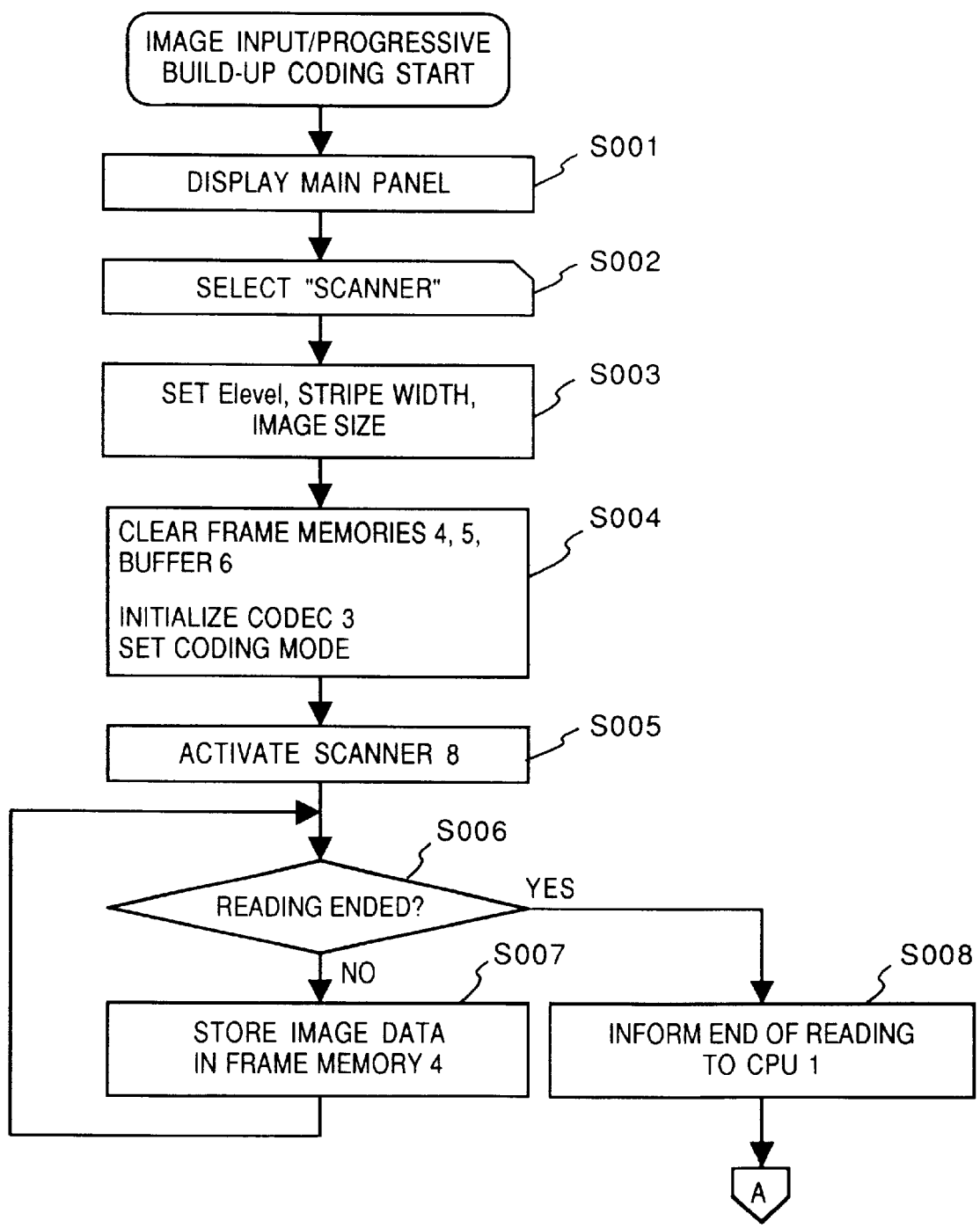
FIGS. 2 and 3 are flowcharts illustrating an example of a procedure of an image input and progressive build-up coding according to the present invention.
Figure 3:
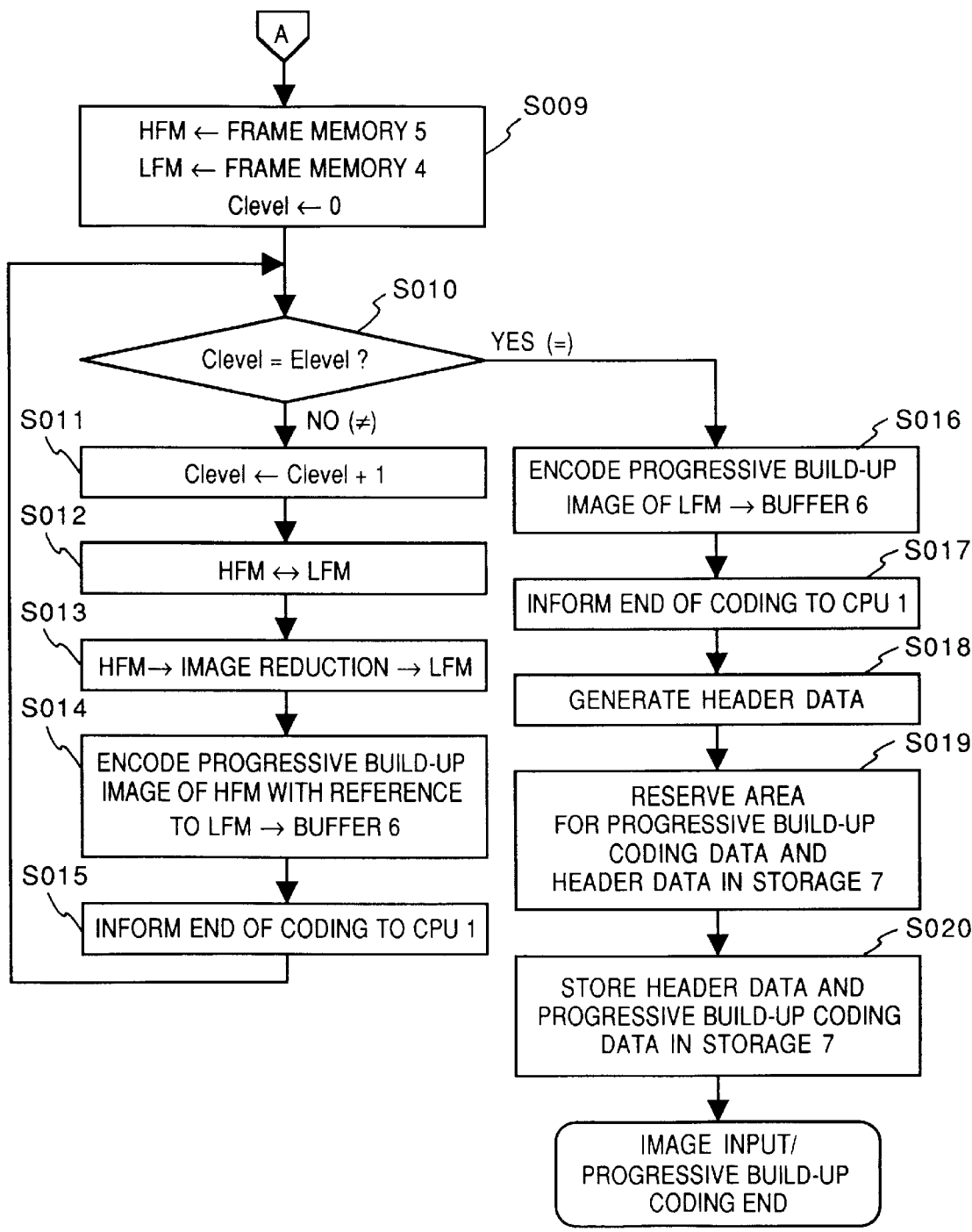

The image input/encoding procedure according to the embodiment is illustrated by the flowcharts of FIGS. 2 and 3.

Figure 4:
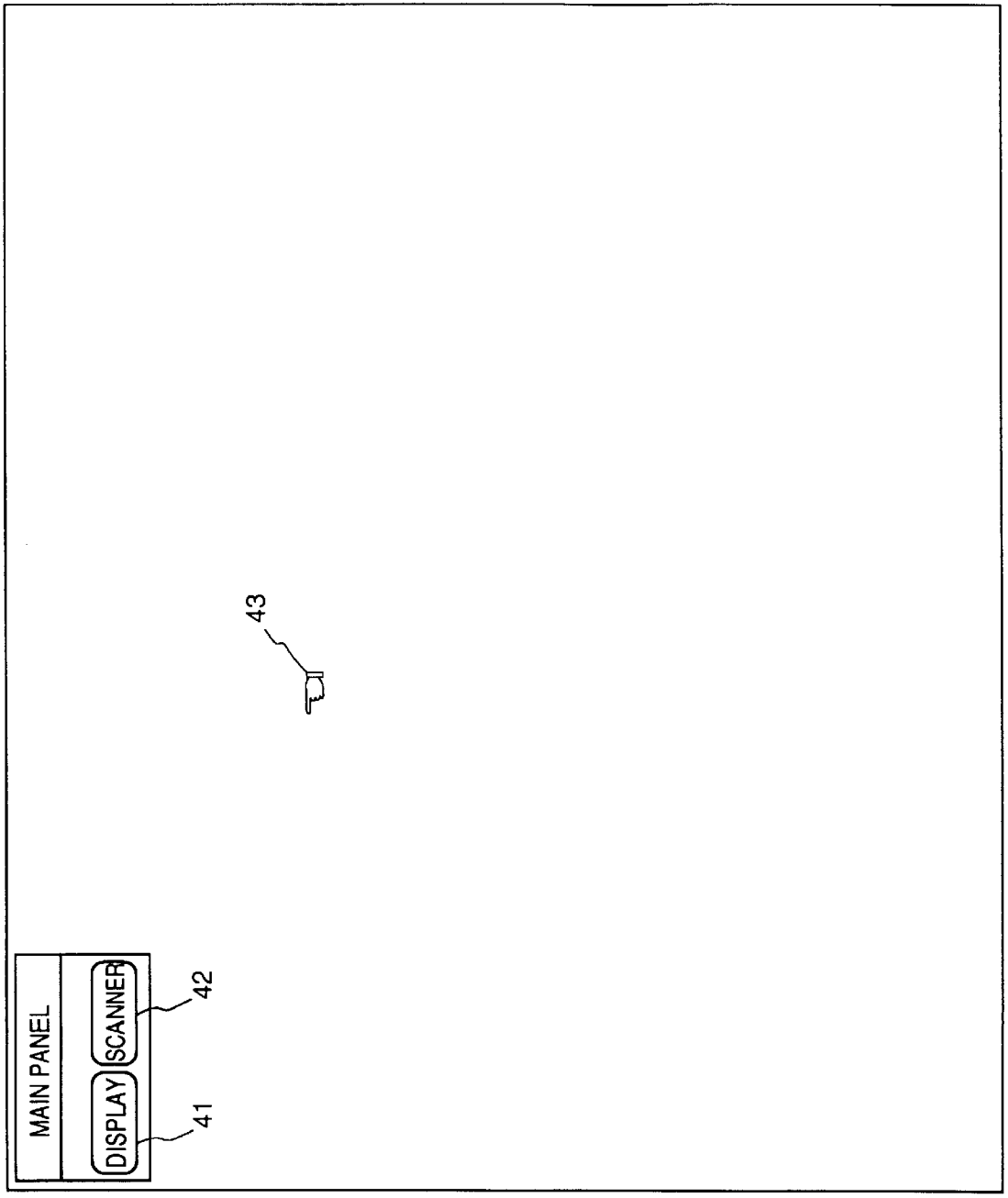
FIG. 4 is a diagram illustrating an example of display state.
Figure 5:
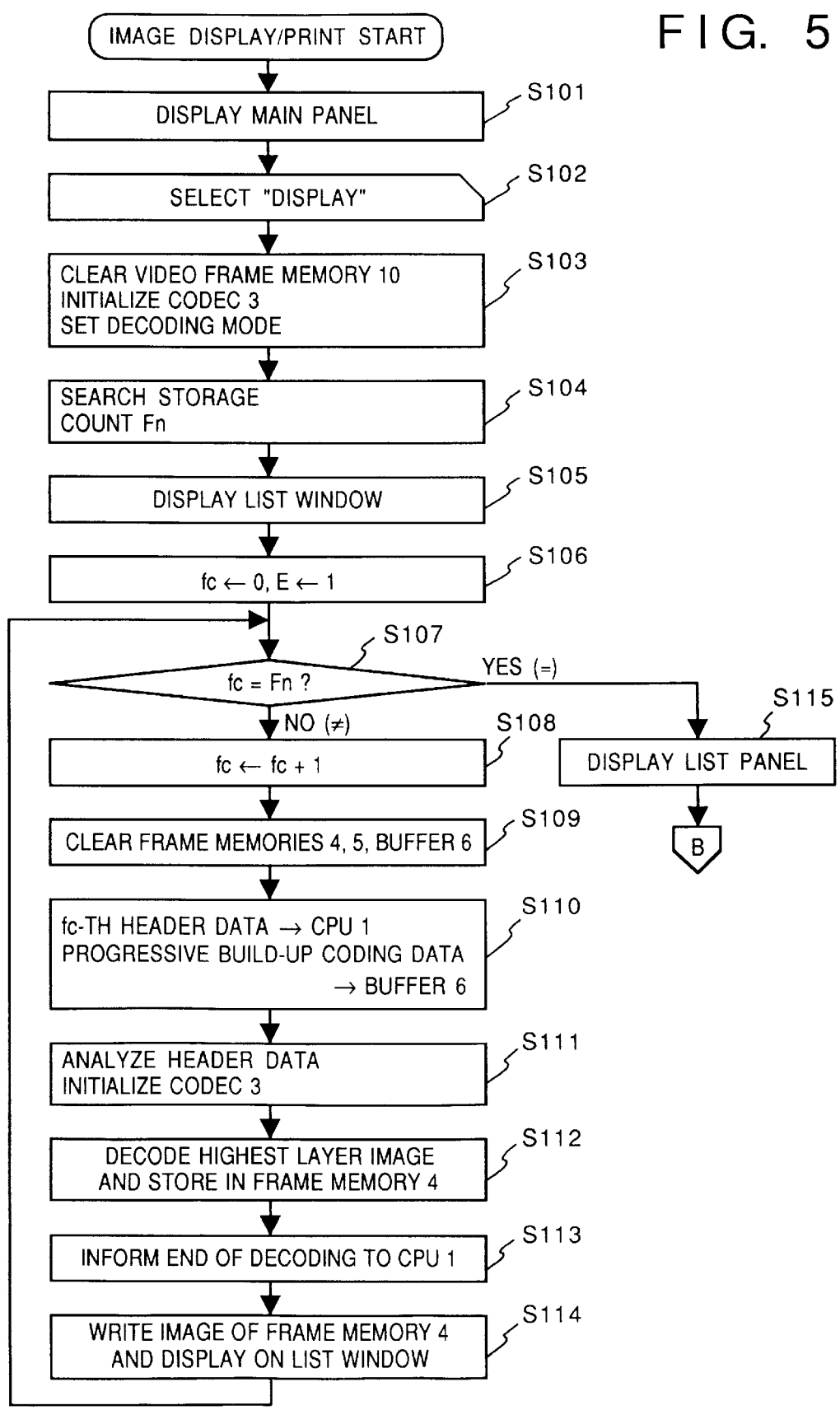
FIGS. 5–9 are flowcharts illustrating an example of a procedure of image display and printing in the image processing method according to the present invention.
Figure 6:
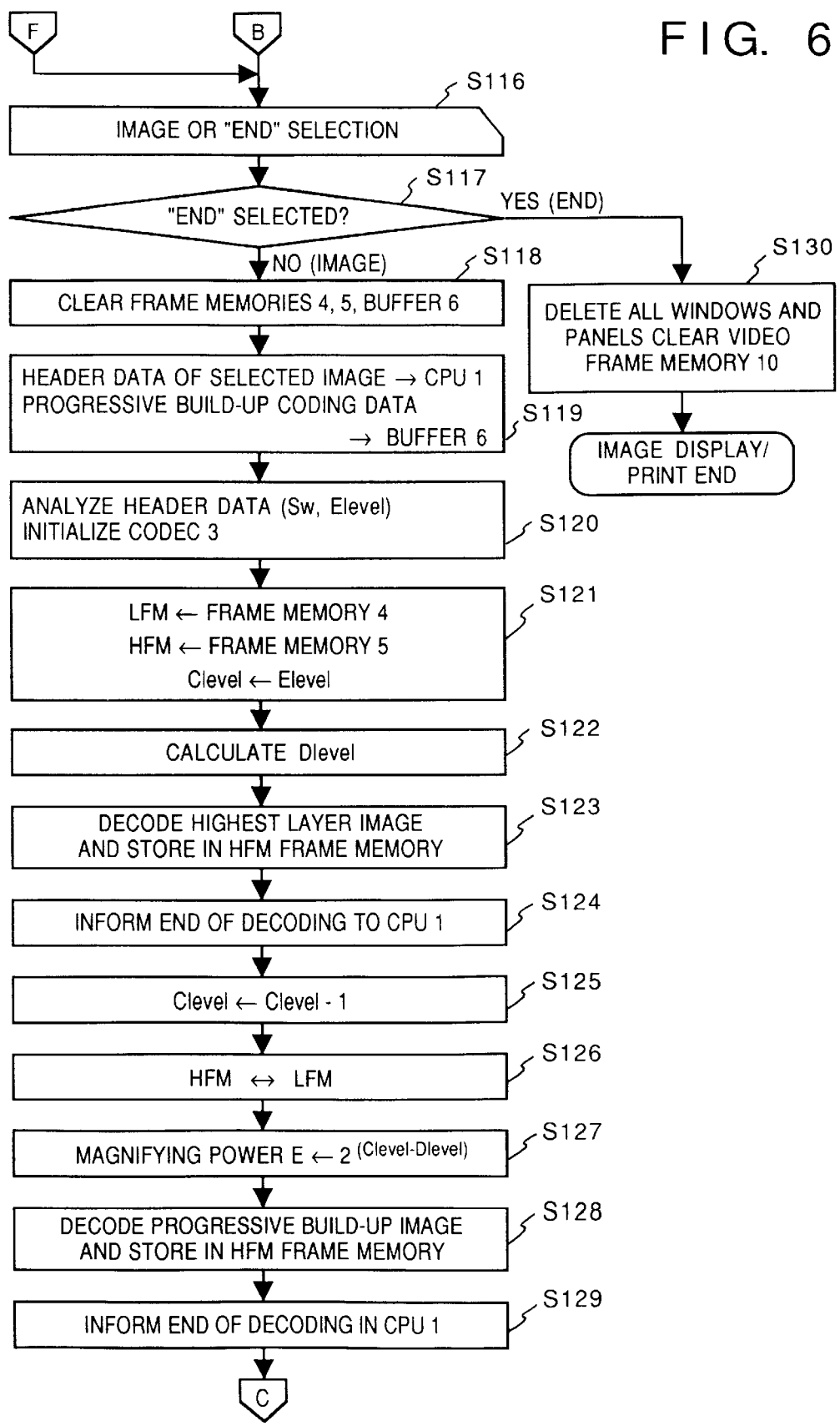
Figure 7:
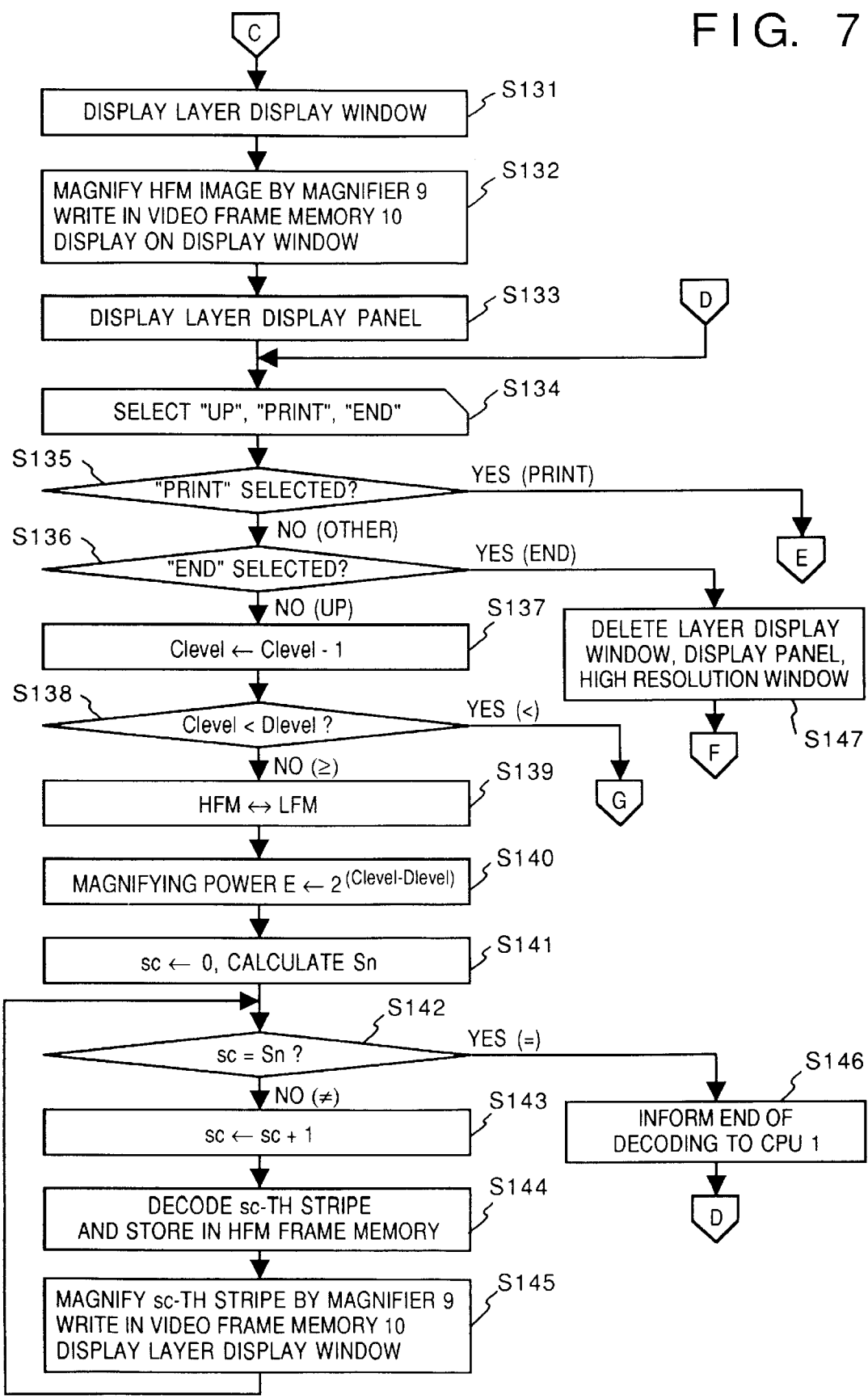
Figure 8:
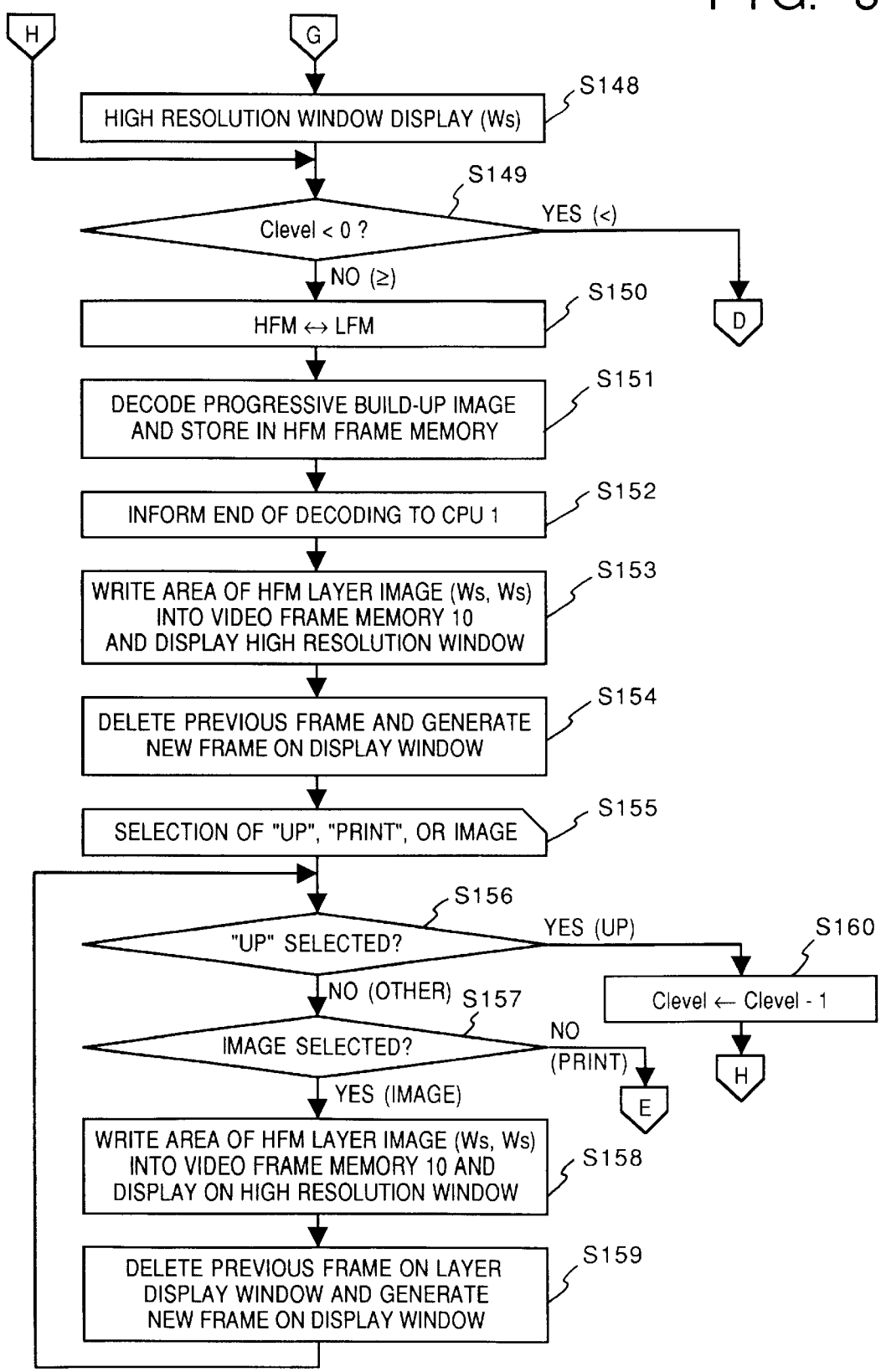
Figure 9:
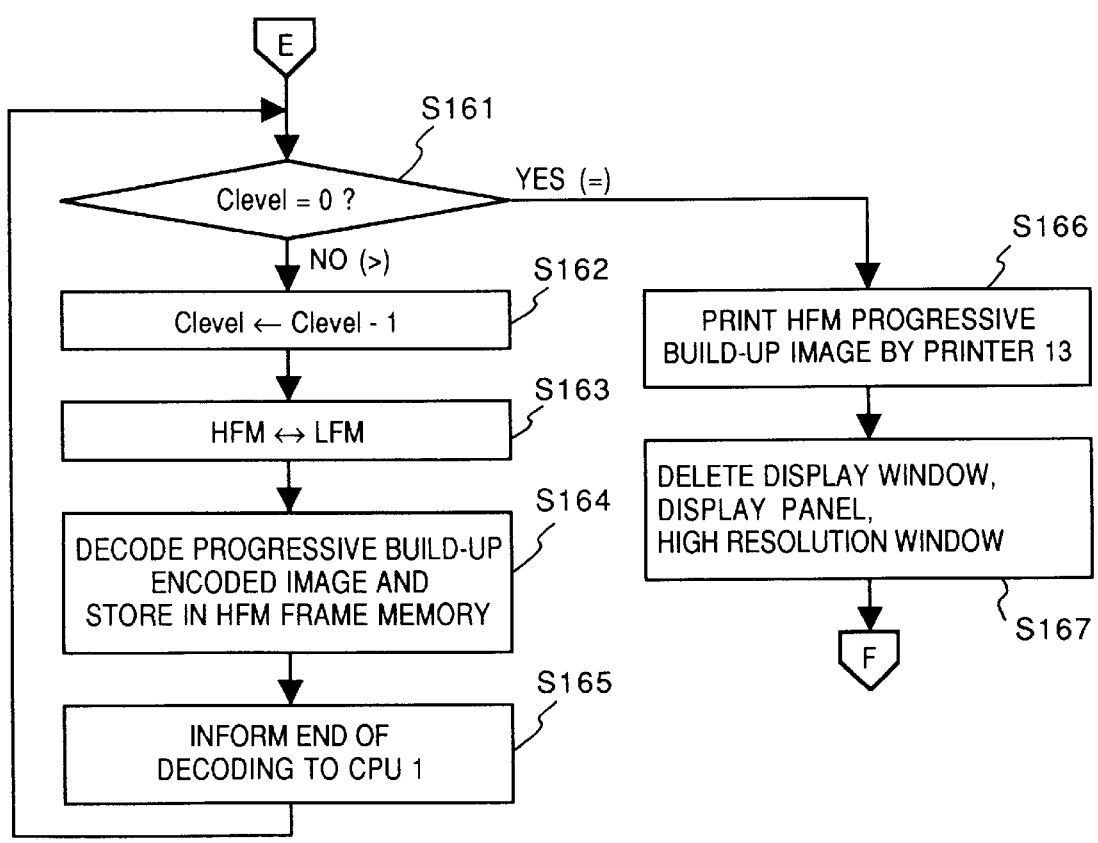

The CPU 1 instructs the graphics controller 11 to generate and display a main panel on the display 12 in graphics (S001). The display state of the display 12 is shown in FIG. 4. The main panel has a "DISPLAY" button 41 and "SCANNER" button 42. The arrow 43 in FIG. 4 is a cursor operated by the mouse 22. When a user places an original image on the scanner 8 and selects the "SCANNER" button 42 through the mouse 22, the image is encoded (S002). Subsequently, the CPU 1 sets the number of layers for encoding, the stripe width, and the image size. The number of layers is determined as a variable $E_{level}$, and set to "5" in the embodiment (S003). Furthermore, the CPU 1 initializes the CODEC 3, sets the coding mode, and clears the frame memories 4, 5, and buffer 6 (S004).

Subsequently, the CPU 1 activates the scanner 8, and starts reading the original image (S005). The scanner 8 binarizes the read image. The binarized image data is stored in the frame memories 4 via the bus 14 and CODEC 3 (S007). When the image is read, and the read image is binarized, and then all image data is stored in the frame memory 4 (S006—"END"). The scanner 8 informs of this to the CPU 1 (S008).

The CPU 1 designates the frame memory 5 by the variable HFM indicating a frame memory at a highest resolution, and the memory 4 by the variable LFM indicating a frame memory at a lowest resolution. The variable $C_{level}$ indicating the layer being processed is set to "0" (S009). Hereinafter, the frame memory at the highest resolution is referred to as "HFM", and the frame memory at the lowest resolution is referred to as "LFM".

Subsequently, the CPU 1 compares the number of layers for encoding $E_{level}$ with the variable $C_{level}$. If $E_{level} C_{level}$, the process proceeds to step S011. In the embodiment, since $E_{level}=5$ and $C_{level}=0$, the process proceeds to step S011 where the variable $C_{level}$ is added by "1" (S011). The CPU 1 exchanges the frame memories respectively indicated by the HFM and LFM (S012). That is, it is set so that the variable $C_{level}$ is "1", the HFM indicates the frame memory 4, and the LFM indicates the frame memory 5.

The CPU 1 reduces the image to ½ by using the CODEC 3, and stores the reduced image in the LFM (S013).

That is, the first layer image at the resolution of 200 dpi is stored in the frame memory 5 indicated by the LFM. When the first layer image is generated in the frame memory 5, the CODEC 3 encodes the zero layer image in the frame memory 4 indicated by the HFM with reference to the first layer image, and the encoded data is stored in the buffer 6 (S014). The CODEC 3 indicates the end of encoding to the CPU 1 when the zero layer image has been encoded (S015).

Subsequently, the CPU 1 adds "1" to the variable $C_{level}$, and the result "2" is obtained (S011). The CPU 1 exchanges the frame memories respectively indicated by HFM and LFM so that the HFM indicates the frame memory 5, and the LFM indicates the frame memory 4 (S012).

The CPU 1 reduces the image to ½ by using the CODEC 3, and stores the second layer image whose resolution is 100 dpi in the frame memory 4 indicated by LFM (S013). The CODEC 3 decodes the first layer image in the frame memory 5 indicated by the HFM with reference to the second layer image, and the encoded data is stored in the buffer 6 (S014). The CODEC 3 indicates the end of encoding to the CPU 1 when the zero layer image has been encoded (S015).

Similarly, the CPU 1 increases the variable $C_{level}$ one by one, and the image generation (S011–S013) and encoding (S014–S015) are performed until the variable $C_{level}$ becomes equal to the number of layers for encoding $E_{level}$.

When the variable $C_{level}$ becomes equal to the number of layers for encoding $E_{level}$, that is, when the fourth layer image has been encoded, the CODEC 3 encodes the fifth layer image in the frame memory 5 indicated by LFM, and stores the encoded data in the buffer 6 (S016). When the fifth layer image has been encoded, the CODEC 3 indicates the end of encoding (S017).

Subsequently, the CPU 1 generates header data defined by the JBIG algorithm from the number of layers for encoding $E_{level}$, the stripe width and the image size (S018). The CPU 1 examines the size of encoded data stored in the buffer 6, and reserves an area for the encoded data with the header data in the storage 7 (S019). The CPU 1 stores the header data at a predetermined position in the storage 7 via the bus 14, and the encoded data stored in the buffer 6 is stored in at a predetermined position in the storage 7 via the CODEC 3 and bus 14 (S020). When the storage ends, the image input/encoding ends.

<Decoding Procedure>

The image displaying/printing procedure is illustrated by the flowchart of FIGS. 5–9.

In figure, the CPU 1 instructs the graphics controller 11 to generate and display the main panel on the display 12 in graphics (S101). The display state of the display 12 is shown in FIG. 4. The user selects the "DISPLAY" button 41 from the input apparatus 2 to display the image (S102). The CPU 1 initializes the CODEC 3, sets the decoding mode, and clears the video frame memory 10 (S103).

Figure 10:
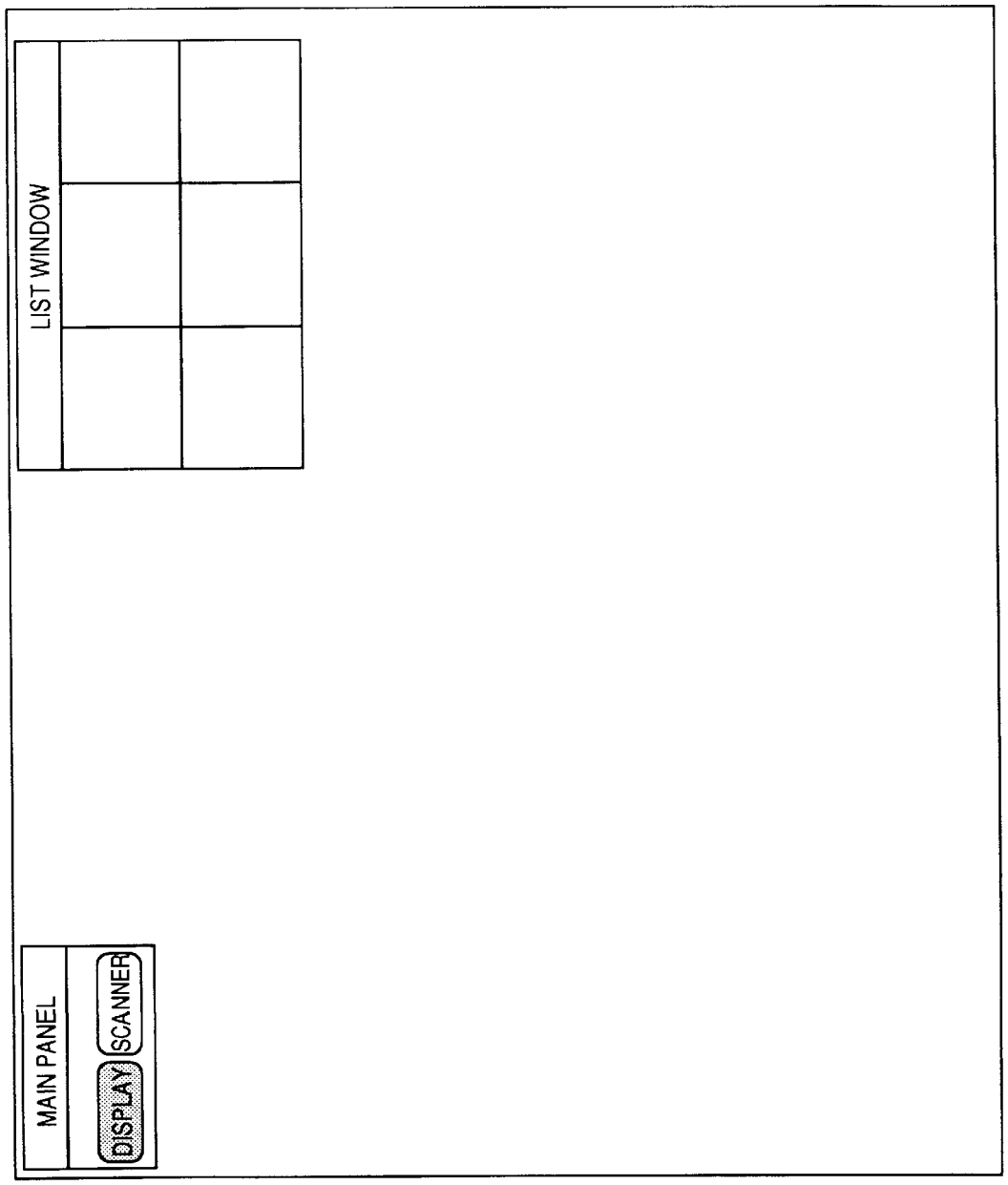
FIGS. 10–14 are diagrams illustrating examples of display state.

The CPU 1 counts the number of encoded data stored in the storage 7, that is, the number of header data Fn, and generates a header position list by listing up positions where the header data are stored in the storage 7 (S104). The CPU 1 instructs the graphics controller 11 to generate and display a window for a list on the display 12 in graphics (S105). The list window is divided into n areas. The display state of the display 12 is shown in FIG. 10. The CPU 1 sets the count variable fc to "0", and the magnifying power E is set to "1" in the magnifier 9 (S106).

Subsequently, the count variable fc is compared with the number of encoded data Fn, and the processing after step S108 is repeated until the count variable fc is equal to the number of encoded data Fn.

The CPU 1 adds "1" to the count variable fc (S108). Subsequently, the CPU 1 clears the frame memories 4, 5, and buffer 6 (S109). The header data stored at the fc-th position from the leading position of the header position list is transmitted to the CPU 1 via the bus 14, and the encoded data following the header data to the buffer 6 via the bus 14 (S110). The CPU 1 analyzes the header data to obtain information such as the stripe width and image size, and initializes the CODEC 3 with the obtained information (S111).

The CPU 1 activates the CODEC 3, decodes the encoded data read from the buffer 6, and stores the image at the highest layer ($2^n$) in the frame memory 4 (S112). In the embodiment, five layer images are generated. When the fifth layer image has been decoded, the CODEC 3 informs the CPU 1 (S113).

The CPU 1 receives this information, and writes the fifth layer image of the frame memory 4 in the predetermined position of the video frame memory 10 via the bus 14 and magnifier 9, and the controller 11 displays the image in the fc-th position of the list window (S114).

The steps S108–S114 are repeated until the count variable fc becomes the number of encoded data Fn (S107).

Figure 11:
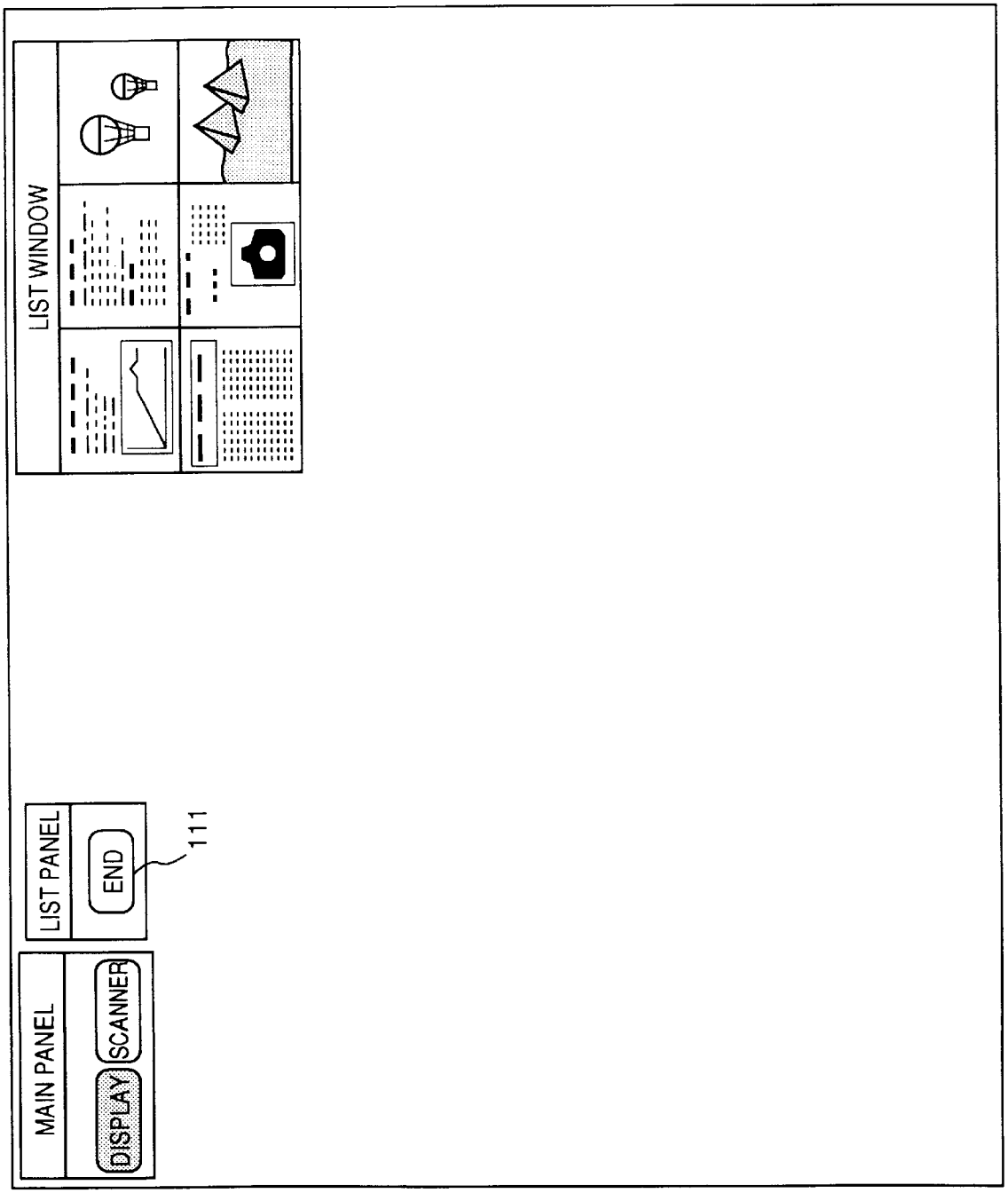

If the count variable fc becomes equal to the number of encoded data Fn (S107), it indicates that the highest layer image of all encoded data has been displayed. Accordingly, the CPU 1 instructs the controller 11 to generate and display the panel for list (list panel) in graphics on the display 12 (S115). The display state of the display 12 is shown in FIG. 11. The list panel has the "END" button 111.

The user selects either a desired image or the "END" button 111 on the list panel using the mouse 22 connected to the input apparatus 2 (S116). If the "END" button 111 is selected (S117—"END"), the list window and list panel are deleted, the video frame memory 10 is cleared (S130), and the image display/printing out ends.

When a desired image is selected (S117—"IMAGE"), the CPU 1 clears the frame memories 4, 5, and buffer 6 (S118). The position of the header data of the selected image data on the storage 7 is read out of the list, and the header data on the storage 7 is transmitted to the CPU 1, and the encoded data is transmitted to the buffer 6 via the bus 14 (S119). The CPU 1 analyzes the header data to obtain information such as the number of layers for encoding $E_{level}$, the stripe width Sw at the zero layer, and the image size, and the CODEC 3 is initialized based on the information (S120). Subsequently, $E_{level}$ is substituted by $C_{level}$, the variable LFM indicating a frame is determined as the frame memory 4, and the HFM, as the frame memory 5 (S121). Hereinafter, the resolution of the display 12 is referred to as "Rd", and the resolution at the zero layer image is referred to as "Rc". Each resolution is set in advance. The display resolution Rd is 100 dpi, and the resolution Rc of all zero layer images is 400 dpi. Note that only one scanner is used in the embodiment. Based on these resolutions, a layer $D_{level}$ where the resolution of the display and that of the image are matched is calculated (S122). The displaying layer $D_{level}$ is obtained by:

$$D_{level} = \log_2(Rc/Rd) \qquad (1)$$

The result "2" is obtained in the embodiment.

The CPU 1 activates the CODEC 3, decodes the encoded data read from the buffer 6, and stores the fifth layer image in the frame memory 5 (S123). When the fifth layer image has been decoded, the CODEC 3 informs the CPU 1 (S124).

The CPU 1 subtracts "1" from the variable $C_{level}$ (S125). Furthermore, the frame memories respectively indicated by HFM and LFM are exchanged so that HFM indicates the frame memory 4, and LFM, the frame memory 5 (S126).

The magnifying power E is obtained from $C_{level}$ and $D_{level}$ as following:

$$E = 2^{(C_{level} - D_{level})} \qquad (2)$$

Since $C_{level}$=4 and $D_{level}$=2, the obtained magnifying power E is "4", and set in the magnifier 9 via the bus 14 (S127).

The CPU 1 reads the encoded data from the buffer 6, and the CODEC 3 decodes the fourth-layer image. The CODEC 3 decodes the fourth layer image with reference to the fifth-layer image of the frame memory 5 indicated by LFM, and the decoded image is stored in the frame memory 4 (S128). The CODEC 3 indicates the end of decoding of the fourth layer image to the CPU 1 (S129).

Figure 12:
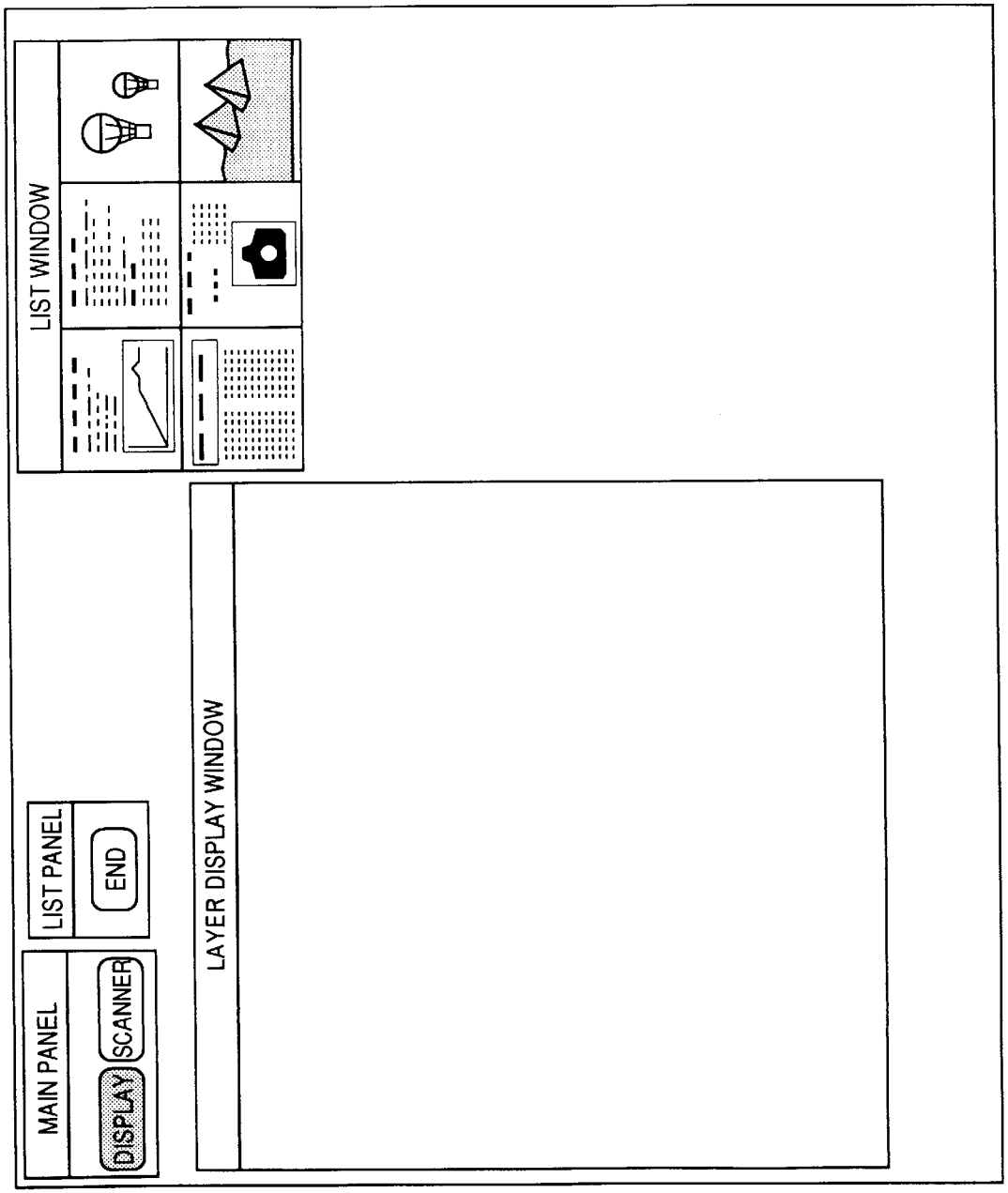

The CPU 1 instructs the graphics controller 11 to generate and display the layer display window on the display 12 (S131). The display state of the display 12 is shown in FIG. 12. The CPU 1 inputs the fourth layer image to the magnifier 9 via the CODEC 3 and bus 14, magnifies by four times in the width and length, stored the magnified image in the video frame memory 10, and displays on the display window of the display 12 (S132). The CPU 1 instructs the graphics controller 11 to generate and display the layer display panel on the display 12 in graphics (S133).

Figure 13:
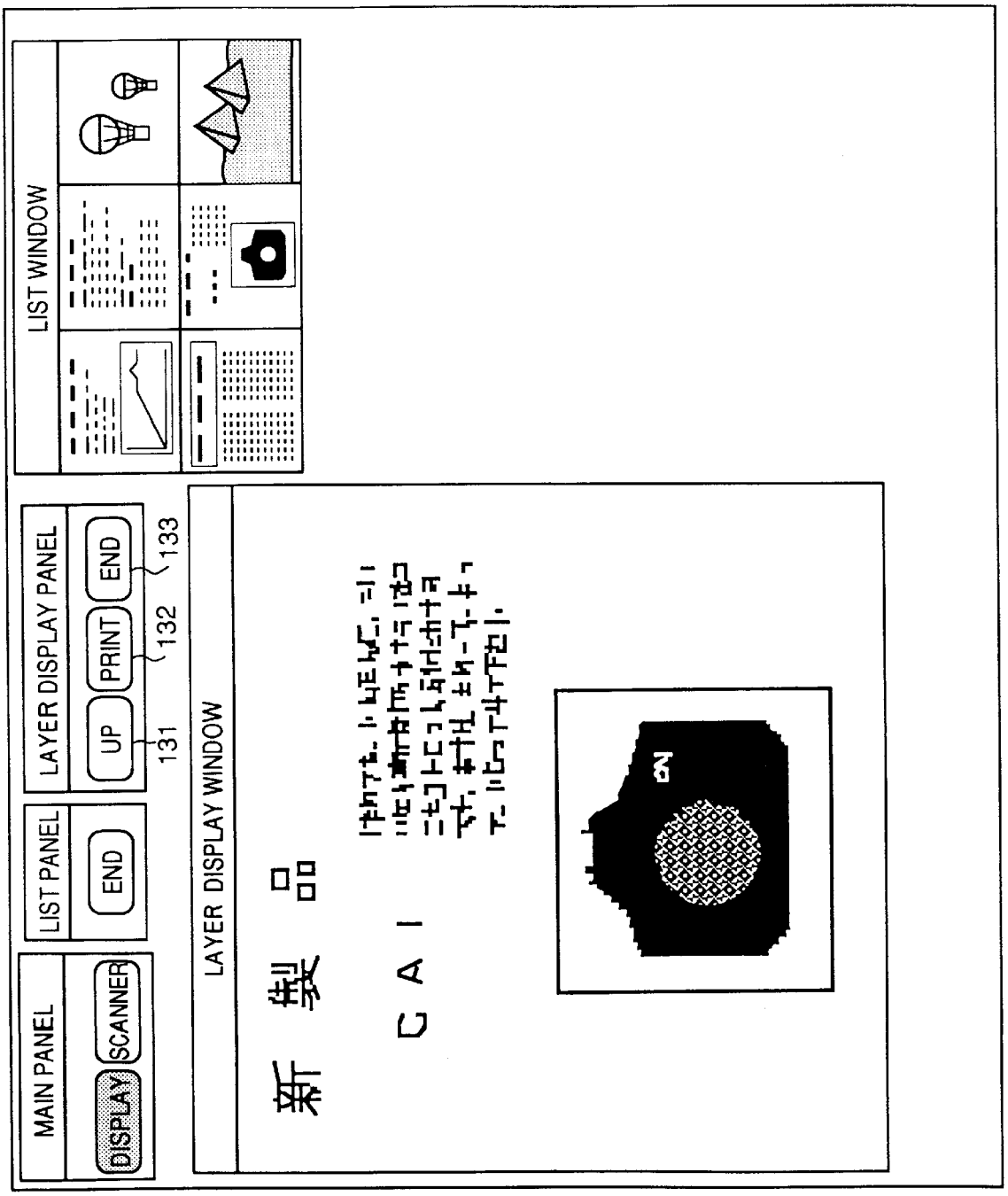

Another display state is shown in FIG. 13. The layer display panel has an "UP" button 131, "PRINT" button 132 and "END" button 133. When the user selects the "UP" button 131 on the display panel by the mouse 22 (steps S134–S136), decoding and displaying of the image at the next layer are performed. The CPU 1 subtracts "1" from the variable $C_{level}$ to obtain "3" (S137). Subsequently, $C_{level}$ is compared with $D_{level}$ to determine the following process. In the embodiment, the process proceeds to step S139.

The CPU 1 exchanges the frame memories respectively indicated by HFM and LFM so that the HFM indicates the frame memory 5, and the LFM indicates the frame memory 4 (S139). The magnifying power E=2 obtained by the equation (2) based on $C_{level}$ and $D_{level}$ is set in the magnifier 9 via the bus 14 (S140). Furthermore, the number of stripes Sn comprising the image is obtained from the number of pixels in the sub-scanning direction of the zero layer image and the stripe width Sw, and the stripe count variable sc is substituted by "0" (S141). Subsequently, the decoding and displaying of the stripes are repeated until the stripe count variable sc becomes equal to the stripe Sn (S142).

The CPU 1 adds "1" to the stripe count variable sc (S143), and the sc-th stripe of the encoded data is read out from the buffer 6 in the stripe unit, and decoded by the CODEC 3. The CODEC 3 decodes the sc-th stripe of the third layer image with reference to the fourth layer image of the frame memory 4 indicated by the LFM, and the frame memory 5 indicated by the HFM is stored in the memory 5 (S144). Subsequently, the image data of the sc-th stripe of the decoded third-layer image is inputted into the magnifier 9 via the bus 14 to magnify the image two times (since E=2). The image data from the $(Sw/2^{Dlevel} \times (sc-1)+1)$ line to the $(Sw/2^{Dlevel})$ is rewritten, and displayed on the layer display window on the display 12 (S145).

As described above, the decoding and displaying of stripes in the steps S143–S145 are repeated until the stripe count variable sc becomes equal to the stripe number Sn (S142).

When the stripe count variable sc becomes equal to the stripe number Sn (S142), the CODEC 3 indicates the end of decoding to the CPU 1 (S146). The CPU 1 waits an input from the layer display panel, and the process proceeds to the next processing.

Again, when the user selects the "UP" button of the layer display panel using the mouse 22 (S134–S136), the decoding and displaying are performed on the image at the next layer. The CPU 1 subtracts "1" from the variable $C_{level}$ and the result "2" is obtained (S137). Furthermore, the frame memories respectively indicated by the HFM and LFM are exchanged so that the HFM indicates the frame memory 4 and the LFM indicates the frame memory 5 (S139). The magnifying power E is obtained as "1" from the equation (2) (S140). The stripe count variable sc is set to "0" (S141), and "1" is added to the stripe count variable sc (S143). The CPU 1 reads the encoded data from the buffer 6 in the stripe unit, and the CODEC 3 decodes the sc-th stripe. The CODEC 3 decodes the sc-th stripe of the second layer image with reference to the third layer image of the frame memory 5 indicated by the LFM, and the decoded image is stored in the memory 5 indicated by HFM (S144). Subsequently, the image data of the sc-th stripe of the second layer image is enlarged by the magnifier 9 via the bus 14, predetermined image data in the video frame memory 10 is rewritten, and the rewritten data is displayed on the layer display window on the display 12 (S145). The decoding and displaying of the stripe (steps S143–S145) are repeated until the stripe count variable sc becomes equal to the stripe number Sn (S142).

When the stripe count variable sc becomes equal to the stripe number Sn (S142), this is informed to the CPU 1 (S146). The CPU 1 waits an input from the layer display panel, and the process proceeds th the next processing.

Furthermore, when the user selects the "UP" button of the layer display panel using the mouse 22 (S134–S136), the decoding and displaying of the image at the next layer are performed. The CPU 1 subtracts "1" from the variable $C_{level}$ (S137). Since the variable $C_{level}$ is smaller than the display layer $D_{level}$ (S138), the CPU 1 instructs the graphics controller 11 to generate and display in graphics on the display 12 at the high resolution window (S148). The size of the high resolution window is determined as "Ws" in width and length.

Furthermore, the frame memories respectively indicated by HFM and LFM are exchanged so that the HFM indicates the memory 5 and the LFM indicates the frame memory 4 (S150). The CPU 1 reads the encoded data out of the buffer 6, and the CODEC 3 decodes the data. The CODEC 3 decodes the first layer image with reference to the second layer image of the frame memory 4 indicated by LFM, and the decoded data is stored in the frame memory 5 indicated by HFM (S151). The CODEC 3 indicates the end of decoding of the first layer image to the CPU 1 (S152).

Figure 14:
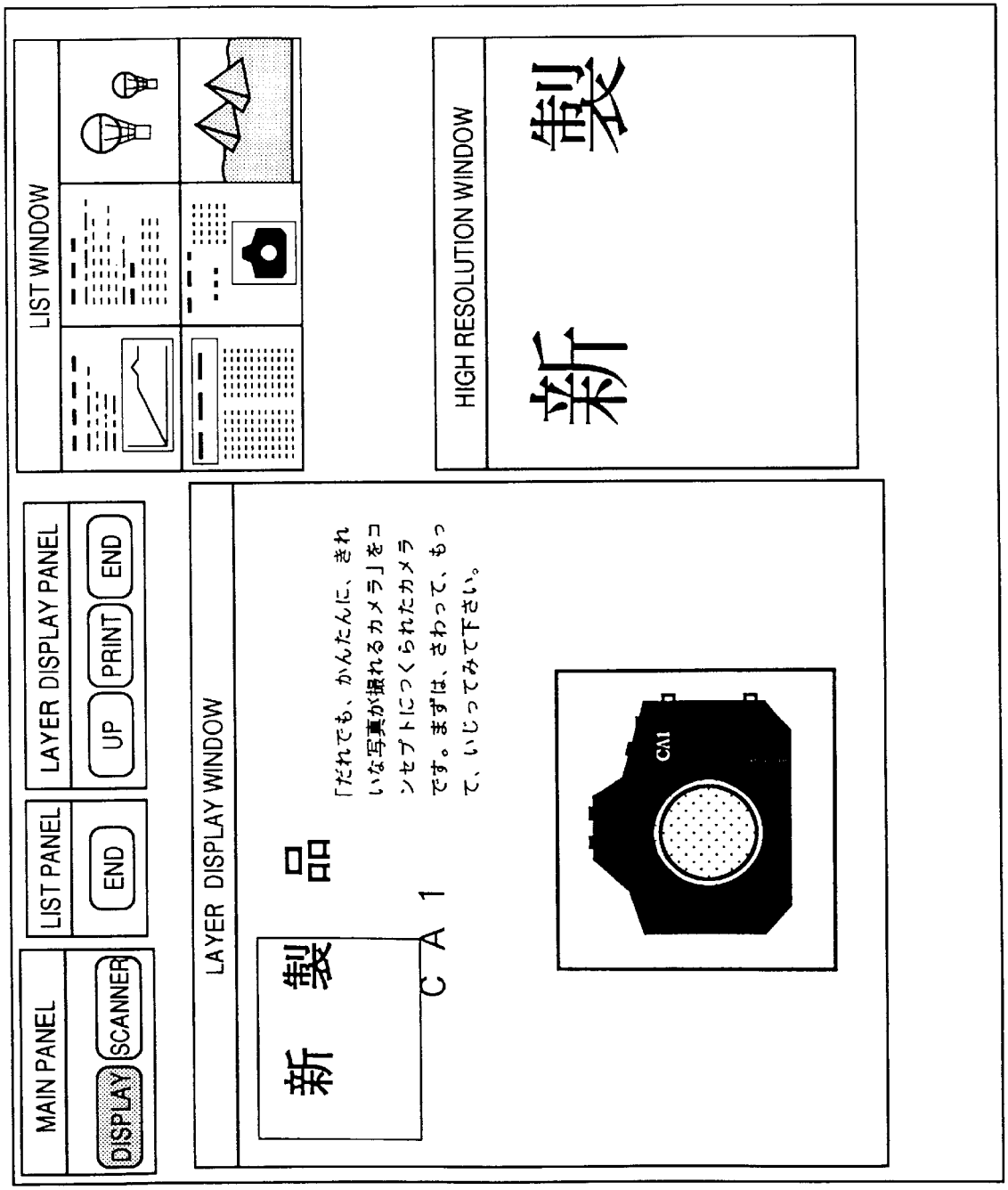

The CPU 1 reads the image data of the area of Ws×Ws whose origin is at the upper left corner of the first layer image from the frame memory 5, writes in the area corresponding to the high resolution window of the video frame memory 10 via the bus 14 and magnifier 9, and displays the data on the high resolution window of the display 12 via the graphics controller 11 (S153). When writing to the video frame memory 10 ends, the frame having the width and length of $(Ws/2^{(Dlevel-Clevel)})$ is written where the origin of the layer display window is at the upper left corner (S154). The frame is realized by inverting the pixels on the border of the area in the layer display window. The display state of the display 12 is shown in FIG. 14. The CPU 1 waits an input from the input apparatus 2, and the process proceeds to the next processing.

When the user inputs an arbitrary coordinate values (Px, Py) on the image of the layer display window by the mouse 22 (S155–S157), the CPU 1 reads the image data in the area of Ws×Ws whose origin is $((Px \times 2^{(Dlevel-Clevel)} - Ws/2), (Py \times$ $2^{(Dlevel-Clevel)}$–Ws/2)) out of the frame memory 5, and transmits the read image data, via the bus 14 and the magnifier 9, to the area of the video frame memory 10 corresponding to the high resolution window where the read image is written. The image is then displayed on the high resolution window of the display 12 via the graphics controller 11 (S158). When the writing to the video frame memory 10 ends, the pixels at the position of the previous frame are inverted to delete the previous frame, and the new frame having the (Ws/$2^{(Dlevel-Clevel)}$) width and length whose origin is at the upper left corner of (Px–Ws/$2^{(Dlevel-Clevel-1)}$) is written (S159). The CPU 1 waits for an input from the input apparatus 2, and the process proceeds to the next processing.

Furthermore, when the user selects the "UP," button of the layer display using the mouse 22 (S155, S156), the decoding and displaying are performed on the image at the next layer. The CPU 1 subtracts "1" from the variable $C_{level}$, and the result "0" is obtained (S160). The frame memories indicated by HFM and LFM are exchanged so that the HFM indicates the frame memory 4 and the LFM indicates the frame memory 5 (S150).

The CPU 1 reads the encoded data from the buffer 6, and the CODEC 3 decodes the image. The CODEC 3 decodes the zero layer image with reference to the first layer image of the frame memory 5 indicated by LFM, and the decoded image is stored in the frame memory 4 (S151). The CODEC 3 indicates the end of decoding of the zero layer image to the CPU 1 (S152).

The CPU 1 reads the image data of the area of Ws×Ws from the frame memory 5 where Ws in the width and length from the origin of the first layer image, writes in the area corresponding to the high resolution window of the video frame memory 10 via the bus 14 and magnifier 9, and displays the data on the high resolution window of the display 12 via the graphics controller 11 (S153). When writing to the video frame memory 10 ends, the previous frame is deleted by inverting the pixels at the position of the previous frame, and the frame having the width and length of Ws/$2^{(Dlevel-Clevel)}$ is written where the origin of the layer display window is at the upper left corner (S154). The CPU 1 waits an input from the input apparatus 2, and the process proceeds to the next processing.

When the user inputs an arbitrary coordinate values (Px, Py) on the image of the layer display window by the mouse 22 (S155–S157), the CPU 1 reads the image data in the area of Ws×Ws from the frame memory 4 based on the coordinate (Px×$2^{(Dlevel-Clevel)}$, Py×$2^{(Dlevel-Clevel)}$) out of the frame memory 5, and transmits the read image data via the bus 14 and the magnifier 9 to the area of the video frame memory 10 corresponding to the high resolution window where the read image is written. The image is then displayed on the high resolution window of the display 12 via the graphics controller 11 (S158). When writing to the video frame memory 10 ends, the new frame having the (Ws/$2^{(Dlevel-Clevel)}$) width and length whose origin is at the upper left corner of (Px–Ws/–$2^{(Dlevel-Clevel-1)}$, Py–Ws/$2^{(Dlevel-Clevel-1)}$) is written (S159). The CPU 1 waits for an input from the input apparatus 2, and the process proceeds to the next processing.

Furthermore, when the user selects the "END" button of the layer display panel using the mouse 22 (S134–S136), the layer display window, layer display panel and high resolution window are deleted (S147). The CPU 1 waits for an input from the input apparatus 2, and the process proceeds to the next processing.

When the user selects the "PRINT" button of the layer display panel using the mouse 22 (S134, S135), the image displayed on the layer display window is decoded to the zero layer image, and printed out from the printer 13. The procedure is described below.

The resolution of the printer 13 is determined as Rp when the "PRINT" button is selected. If the variable $C_{level}$=0 (S161), the image of the frame memory indicated by the HFM is transmitted to the printer 13 via the bus 14, and printed out from the printer 13 (S166). Subsequently, the layer display window, layer display panel, and high resolution window are deleted (S167). The CPU 1 waits for an input from the input apparatus 2, and the process proceeds to the next processing.

If the variable $C_{level}$ of the printer 13 is greater than zero ($C_{level}$>0) (S161), the CPU 1 subtracts "1" from the variable $C_{level}$ (S162). The frame memories indicated by HFM and LFM are exchanged respectively (S163). The CPU 1 reads out the encoded data from the buffer 6, and the CODEC 3 decodes the encoded data. The CODEC 3 decodes the $C_{level}$-th layer image with reference to the ($C_{level}$+1)-th layer image of the frame memory indicated by LFM, and the decoded image is stored in the frame memory indicated by the HFM (S164). The CODEC 3 indicates the end of decoding of the image to the CPU 1 (S165). If $C_{level}$=0 (S161), the image of the frame memory indicated by the HFM is outputted to the printer 13 via the bus 14, and printed out by the printer 13 (S166). If $C_{level}$>0 (S161), the decoding of the encoded data of the buffer 6 is repeated (S162–S165).

Since an image processing apparatus of the above described structure can perform display at a rough resolution, in accordance with the resolution, the size of image can be grasped at a moment, and the speed of the schematic image display can be improved.

Since an image whose resolution is greater than that of the display can be displayed, the image processing can be improved.

Furthermore, since the display is performed while the images at each layer are decoded, the capability of a machine interface is improved, and uncomfortability due to delay of displaying can be removed.

Still further, images whose resolutions at the zero layer resolution are different can be dealt by clarifying the resolution of the zero layer image. Display and printing out corresponding to the display and printer can be performed. Furthermore, the images at different resolutions are grouped to display.

[Second Embodiment]

<Structure of the Apparatus>

Figure 15:
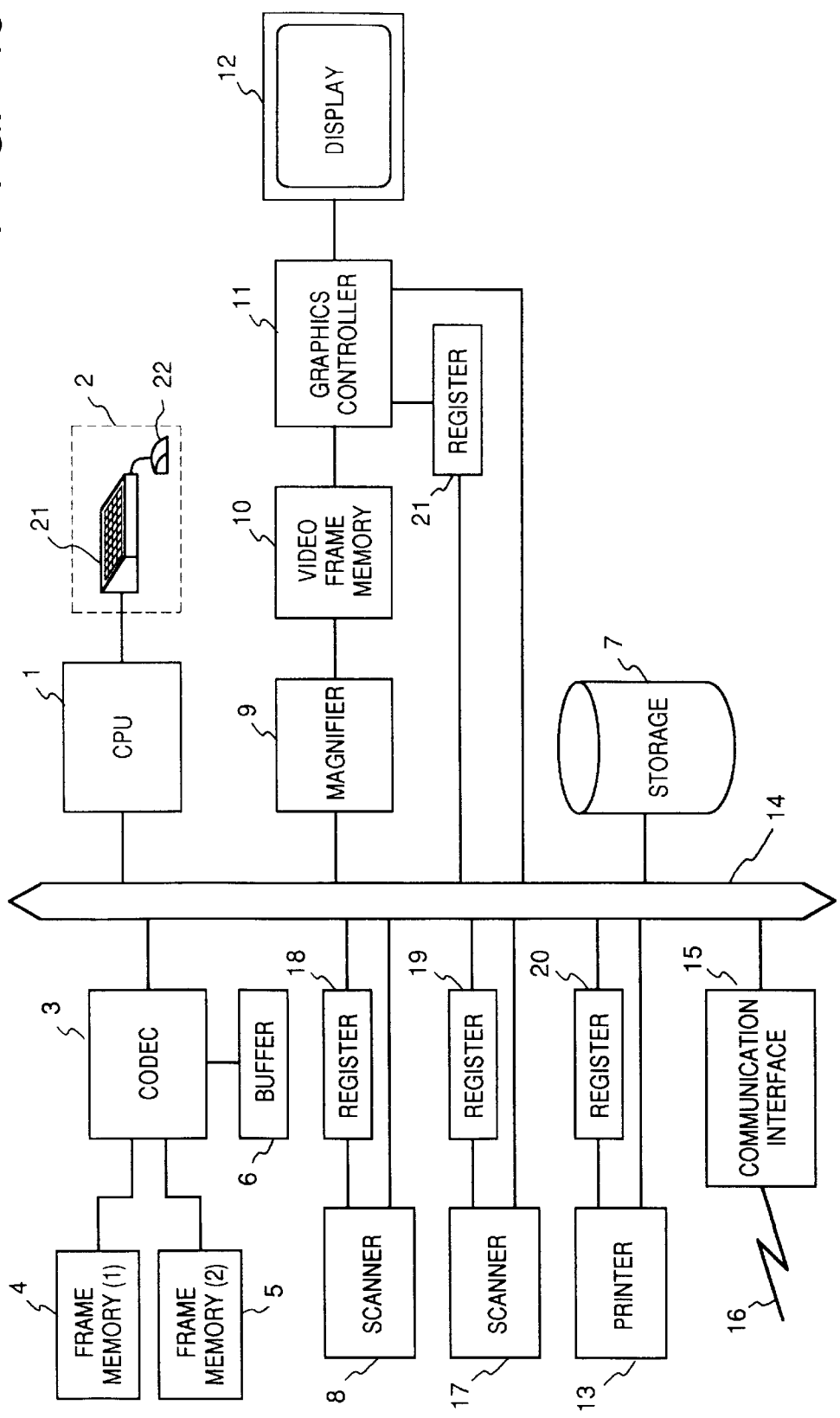
FIG. 15 is a block diagram illustrating the image processing apparatus of a second embodiment according to the present invention.

FIG. 15 is a diagram illustrating the construction of the image processing apparatus of the second embodiment. In FIG. 15, the elements which are identical to those of FIG. 1 have the same reference numerals. The scanner 17 reads image data. Note that the resolution of the scanner 17 is 600 dpi. The register 18 represents the resolution of the scanner 8, the register 19, the resolution of the scanner 17, the register 20, the resolution of the printer 13, and the register 21, the resolution of the display 12. Values are automatically set to the registers 18–21 when the power of the apparatus is turned on. That is, "400" is set to the register 18, "600", the register 19, "400", the register 20, and "100", the register 21. The values of the registers 18-21 are read out of the CPU 1 via the bus 14. The communication line 16 connects to the external communication interface 15.

Figure 16:
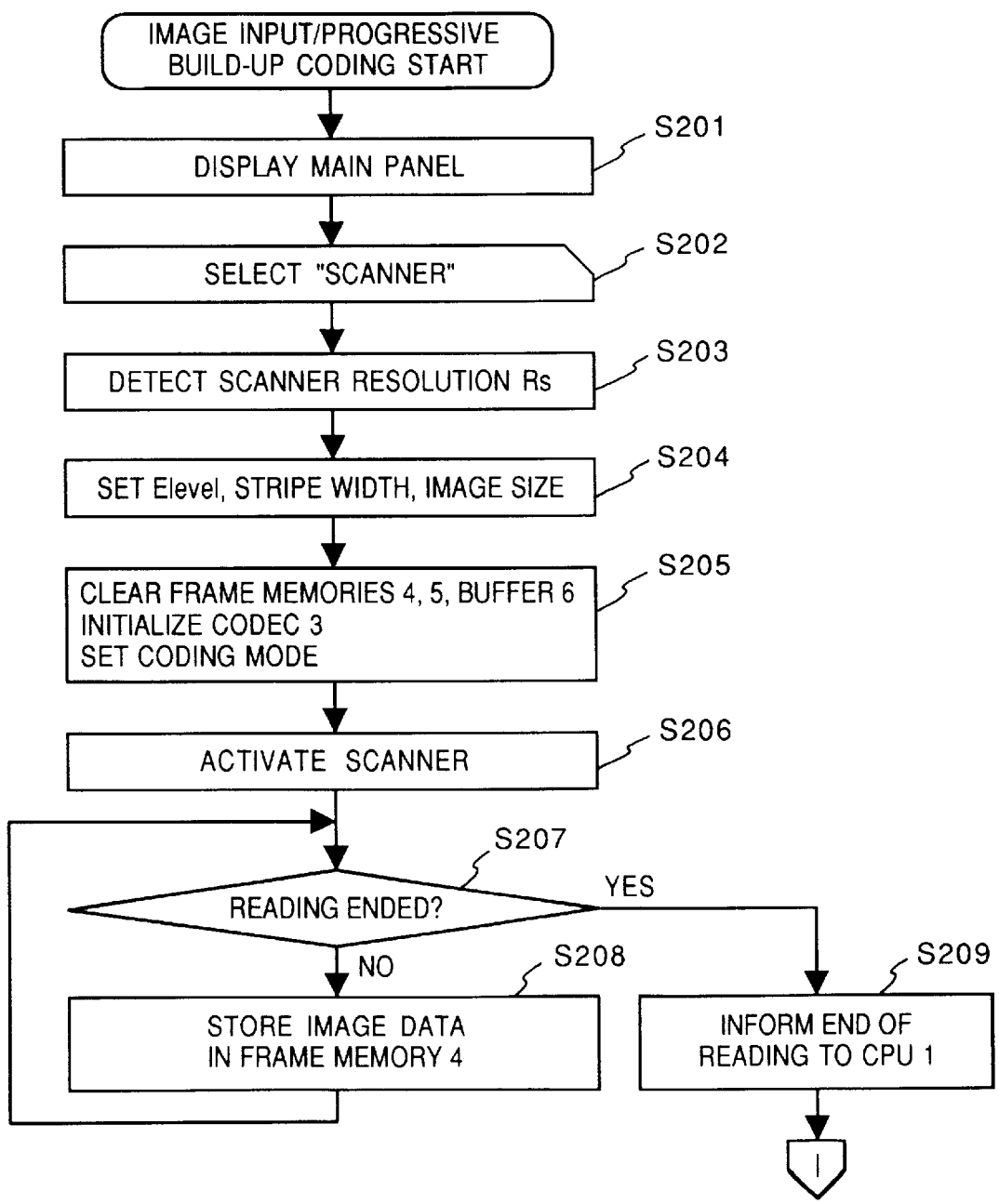
FIGS. 16 and 17 are flowcharts illustrating an example of the procedure of an image input and progressive build-up coding according to the present invention.
Figure 17:
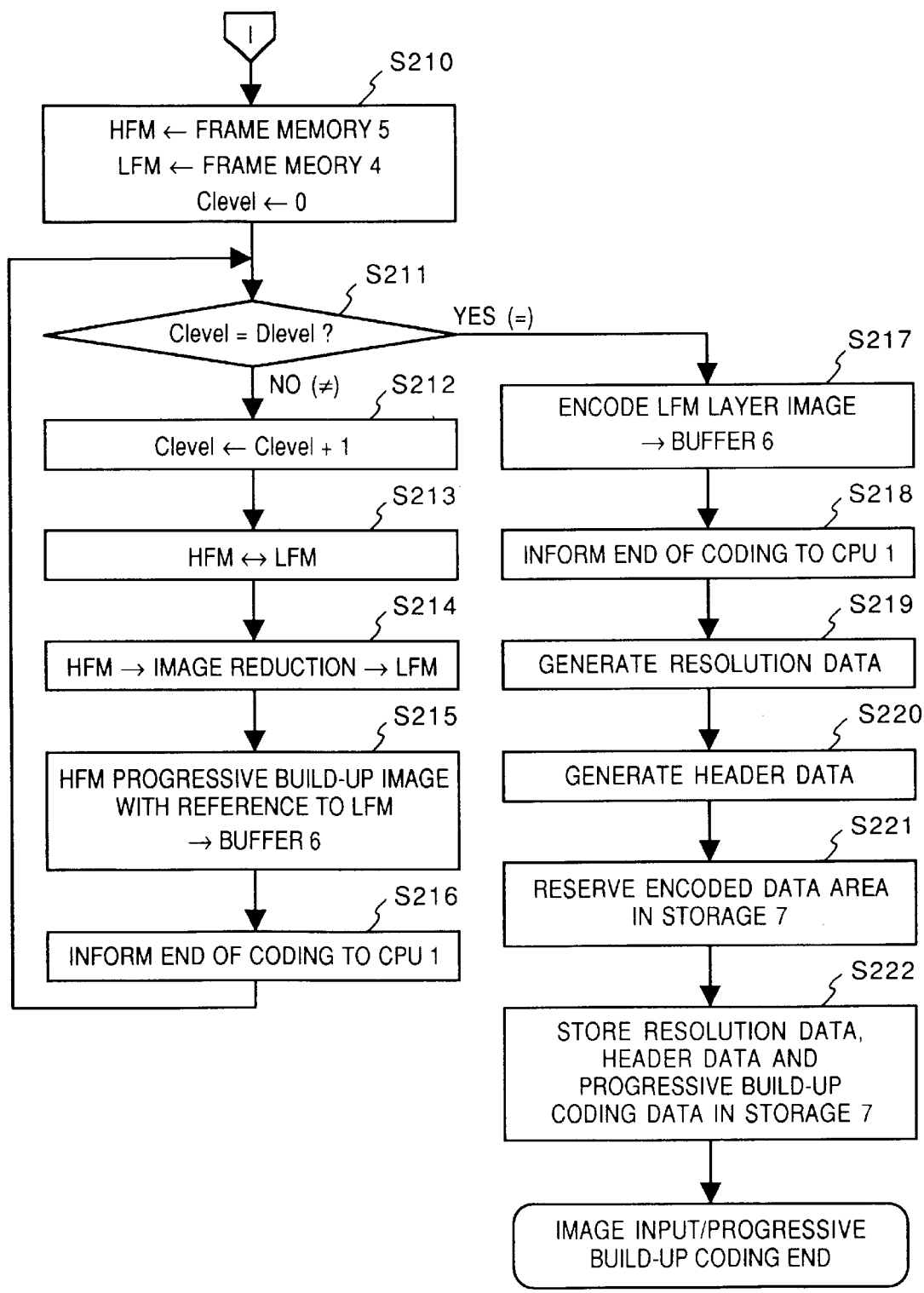

The procedure of the image input/coding is illustrated by the flowcharts of FIGS. 16 and 17.

<Encoding Procedure>

Figure 18:
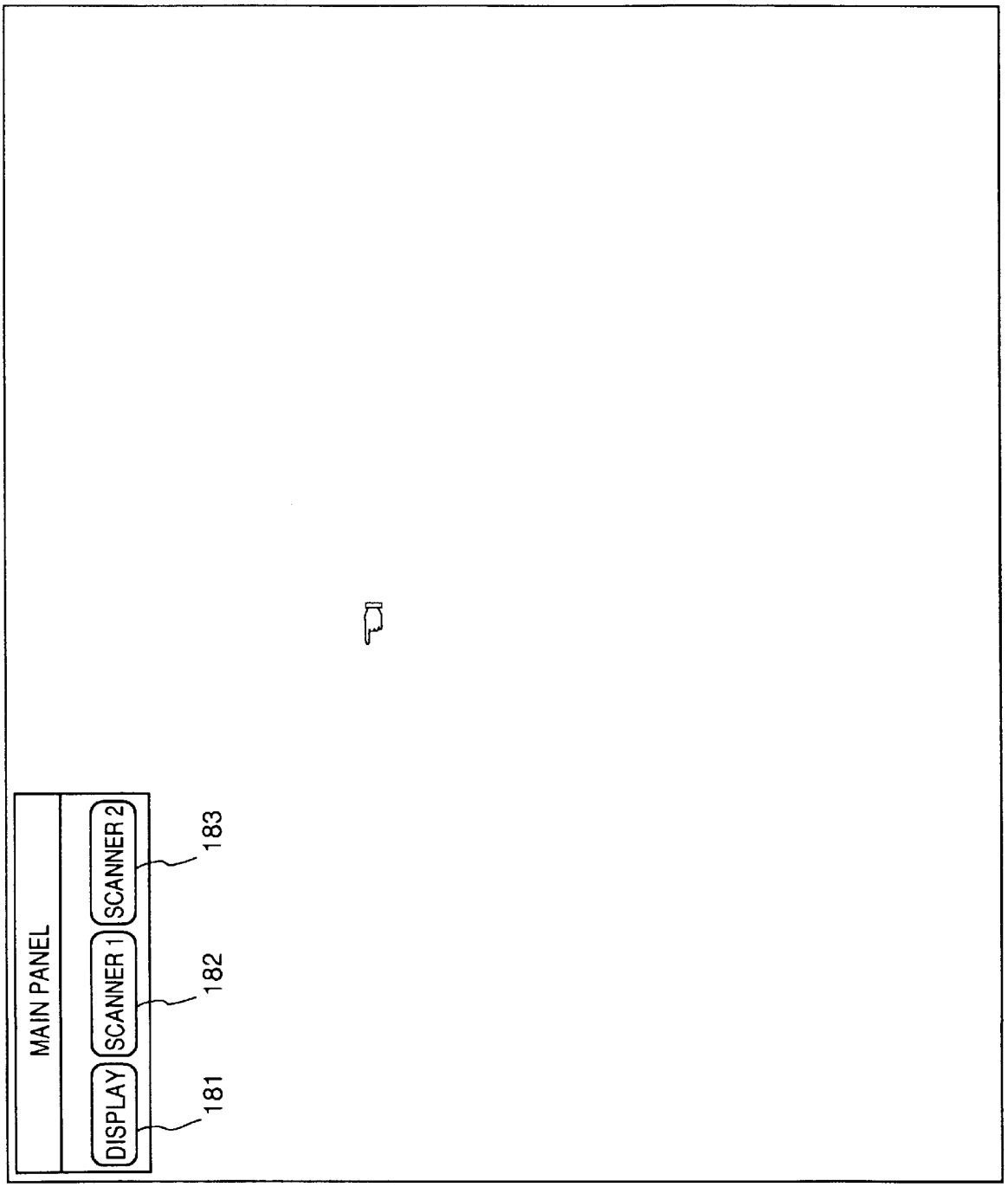
FIG. 18 is a diagram illustrating an example of display state.

The CPU 1 instructs the graphics controller 11 to generate and display the main panel on the display 12 in graphics (S201). The display state of the display 12 is shown in FIG. 18. The main panel has a "SCANNER 1" button 182, "SCANNER 2" button 183, and "DISPLAY" button 181. The user places an original image on the scanner 8, and selects the "SCANNER 1" button when the scanner 8 is used, and the "SCANNER 2" when the scanner 17 is used to start the encoding (S202).

Subsequently, the CPU 1 detects the resolution Rs of the scanner. If the "SCANNER 1" button 182 is selected, the resolution Rs is read out of the register 18, while if the "SCANNER 2" button 183 is selected, the resolution Rs is read out of the register 19 (S203).

The CPU 1 sets the number of layers for encoding, the stripe width, and the image size (S204). The number of layers is determined as a variable $E_{level}$, and set to "5" in the embodiment. Furthermore, the CPU 1 initializes the CODEC 3, sets the coding mode, and clears the frame memories 4, 5, and buffer 6 (S205).

Subsequently, the CPU 1 activates the scanner 8 if the "SCANNER 1" button 182 is selected, while the scanner 17, if the "SCANNER 2" button 183 is selected, to start reading the original image (S206). The scanner 8 or scanner 17 binarizes the read image. In this embodiment, it is supposed that the scanner 8 is selected. The binarized image data is stored in the frame memories 4 via the bus 14 and CODEC 3 (S208). When the image is read, and the read image is binarized, and then all image data is stored in the frame memory 4 (S207), and the scanner 8 informs of this (S209).

The CPU 1 designates the frame memory 5 as HFM, and the memory 4 as LFM. The variable $C_{level}$ indicating the layer being processed is set to "0" (S210).

Subsequently, the CPU 1 compares $C_{level}$ with $E_{level}$, and the steps S211–S216 are repeated until $C_{level}$ becomes equal to $E_{level}$.

The CPU 1 adds "1" to the variable $C_{level}$ (S212) The CPU 1 exchanges the frame memories respectively indicated by the HFM and LFM (S213). That is, it is set so that the variable $C_{level}$ is "1", the HFM indicates the frame memory 4, and the LFM indicates the frame memory 5. Hereinafter, the frame memory indicated by HFM is referred to as "HFM", while the frame memory indicated by LFM is referred to as "LFM". The CPU 1 reduces the image to ½ by using the CODEC 3, and stores in the frame memory 5 indicated by LFM (S214). The image whose resolution is 200 dpi, the first layer image, is stored in the frame memory 5 indicated by LFM. When the first layer image is generated, the CODEC 3 encodes the zero layer image in the frame memory 4 indicated by the HFM with reference to the first layer image, and the encoded data is stored in the buffer 6 (S215). The CODEC 3 indicates the end of encoding to the CPU 1 when the zero layer image has been encoded (S216).

Similarly, the CPU 1 adds "1" to the variable $C_{level}$ (S212), exchanges the frame memories indicated by HFM and LFM (S213), reduces the image of HFM to ½ by using the CODEC 3, and stored in the LFM (S214). The CODEC 3 encodes the image of HFM with reference to the image of LFM, and stores the encoded data in the buffer 6 (S215). When the encoding of the image has been ended, the CODEC 3 informs the CPU 1 (S216). The image generation and encoding (S212–S216) are repeated until the variable $C_{level}$ becomes equal to the number of layers for encoding $E_{level}$ (S211).

When the variable $C_{level}$ becomes equal to the number of layers for encoding $E_{level}$ (S211), that is, when the fourth layer image has been encoded, the CODEC 3 encodes the fifth layer image in the frame memory 5 indicated by LFM, and stores the encoded data in the buffer 6 (S217). When the fifth layer image has been encoded, the CODEC 3 indicates the end of encoding (S218).

Since the encoding of the image has ended (S218), the CPU 1 generates resolution data (S219). This is two-byte data having a fixed length representing the resolution of scanner used to input an image. The CPU further generates the header data defined by the JBIG algorithm from the number of layers for encoding $E_{level}$, the strip width, and the image size (S220). The CPU 1 examines the size of encoded data amount stored in the buffer 6, and reserves an area for the header data with additional two bytes in the storage 7 (S221). The CPU 1 sequentially stores the resolution data and header data at a predetermined position in the storage 7 via the bus 14. Subsequently, the CPU 1 stores the encoded data stored in the buffer 6 in at a predetermined position in the storage 7 via the CODEC 3 and bus 14 (S222). When the storage ends, the image input/encoding ends.

<Decoding Procedure>

The data encoded in the above described procedure is decoded as following.

The image displaying/printing procedure is illustrated by the flowchart of FIGS. 19–23.

The CPU 1 instructs the graphics controller 11 to generate and display the main panel on the display 12 in graphics (S301). The display state of the display 12 is shown in FIG. 18. The user selects the "DISPLAY" button 181 from the input apparatus 2 to display the image (S302).

Subsequently, the CPU 1 reads the resolution Rd of the display 12 from the register 21 via the bus 14 (S303).

The CPU 1 initializes the CODEC 3, and sets the decoding mode, and then clears the video frame memory 10 (S304). The CPU 1 counts the number of encoded data stored in the storage 7, that is, the number of encoded data Fn, and generates a header position list by listing up positions where the header data are stored in the storage 7 (S305). The position list is stored in the memory included in the CPU 1. The CPU 1 instructs the graphics controller 11 to generate and display a window for list on the display 12 in graphics (S306). The CPU 1 sets the encoded data count variable fc to "0", and the magnifying power E is set to "1" in the magnifier 9 (S307).

Subsequently, the count variable fc is compared with the number of encoded data Fn (S308), and the steps S308–S315 are repeated until the count variable fc is equal to the number of encoded data Fn.

The CPU 1 adds "1" to the count variable fc (S309). Subsequently, the CPU 1 clears the frame memories 4, 5, and buffer 6 (S310). The CPU 1 reads the position of the fc-th resolution data from the leading portion of the list, and the resolution data and header data stored in the storage 7, and transmits the encoding data following to the header data to the buffer 6 via the bus 14 (S311). The CPU 1 analyzes the header data to obtain the information such as the stripe width and image size, and initializes the CODEC 3 by the obtained information (S312). The CPU 1 activates the CODEC 3, reads the encoded data from the buffer, decodes the encoded data, and stores the image at the highest layer (n) in the frame memory 4 (S313). In the embodiment, the image has five layers. When the fifth layer image has been decoded, the CODEC 3 informs of this to the CPU 1 (S314).

The CPU 1 receives this information, and writes the fifth layer image of the frame memory 4 in the predetermined position of the video frame memory 10 via the bus 14 and magnifier 9, and the controller 11 displays the image at the fc-th position of the list window (S315).

If the count variable fc becomes the encoded data Fn (S308), it indicates that the highest layer image of all encoded data has been displayed. Accordingly, the CPU 1 instructs the controller 11 to generate and display the panel for list (list panel) in graphics on the display 12 (S316).

The user selects either a desired image or the "END" button on the list panel using the mouse 22 (S317). If the "END" button is selected (S318), the list window and list panel are deleted, the video frame memory 10 is cleared (S319), and the image display and printing out end.

When a desired image is selected (S318), the CPU 1 clears the frame memories 4, 5, and buffer 6 (S320). The CPU 1 reads the position in the storage 7 of the resolution data of the selected image data from the position list, and then reads the resolution data and header data from the above position, and transmits the encoded data following the header data to the buffer 6 via the bus 14 (S321). The CPU 1 analyzes the header data to obtain the information such as the number of layers for encoding $E_{level}$, the stripe width Sw at the zero layer, and the image size, and the CODEC 3 is initialized based on the information (S322). Subsequently, $E_{level}$ is substituted by $C_{level}$, the variable LFM is determined as the frame memory 4, and the HFM, as the frame memory 5 (S323).

The CPU 1 reads out the resolution Rc of the zero layer image of the encoded data from the resolution data (S324). The image read by the scanner 8 is 400 dpi, and the image read by the scanner 17 is 600 dpi. Suppose that an encoding layer where the display and the resolution of an image are matched is determined as a display layer $D_{level}$ (S325). The displaying layer $D_{level}$ is obtained by:

$$D_{level}=[\log_2(Rc/Rd)] \quad (3)$$

(hereinafter, [ ] indicates round up) That is, the result is "2" when read by the scanner 8, while the result is "3" by the scanner 7 (S325).

The CPU 1 activates the CODEC 3, decodes the encoded data read from the buffer 6, and stores the fifth layer image in the frame memory 5 indicated by HFM (S326). When the fifth layer image has been decoded, the CODEC 3 informs of this to the CPU 1 (S327). The CPU 1 subtracts "1" from the variable $C_{level}$ (S328). Furthermore, the frame memories respectively indicated by HFM and LFM are exchanged so that HFM indicates the frame memory 4, and LFM, the frame memory 5 (S329). The magnifying power E is obtained from the equation (2). The obtained magnifying power E "4" is set in the magnifier 9 via the bus 14 (S330). The CPU 1 reads the encoded data from the buffer 6. The CODEC 3 decodes the fourth layer image with reference to the fifth layer image of the frame memory 5 indicated by LFM, and the decoded image is stored in the frame memory 4 (S331). The CODEC 3 indicates the end of decoding of the fourth layer image to the CPU 1 (S332).

The CPU 1 instructs the graphics controller 11 to generate and display the layer display window on the display 12 (S333). The CPU 1 inputs the fourth layer image to the magnifier 9 via the CODEC 3 and bus 14 where the fourth layer image is magnified four times in the width and length. The magnified image is stored in the video frame memory 10, and displayed on the display window of the display 12 (S334). The CPU 1 instructs the graphics controller 11 to generate and display the layer display panel on the display 12 in graphics (S335).

When the user selects the "UP" button on the layer display panel using the mouse 22 (steps S336–S338), decoding and displaying of the image at the next layer are performed. The CPU 1 subtracts "1" from the variable $C_{level}$, and the result "3" is obtained (S339) Furthermore, the frame memories respectively indicated by HFM and LFM are exchanged, and the HFM indicates the frame memory 5, and the LFM indicates the frame memory 4 (S341). The magnifying power E=2 obtained by the equation (2) based on $C_{level}$ and $D_{level}$ is set in the magnifier 9 via the bus 14 (S342). Furthermore, the number of stripes Sn comprising a progressive build-up image is obtained from the number of pixels in the sub-scanning direction of the zero layer image and the stripe width Sw, and the stripe count variable sc is set to "0" (S343).

Subsequently, sc and Sn are compared (S344), and the decoding and displaying of the stripes are repeated until the stripe count variable Sc becomes equal to the stripe Sn (S344).

The CPU 1 adds "1" to the stripe count variable sc (S345), and the encoded data is read out from the buffer 6 in the stripe unit and decoded by the CODEC 3. The CODEC 3 decodes the image data of the sc-th stripe of the third layer image with reference to the fourth layer image of the frame memory 4 indicated by the LFM, and the frame memory 5 indicated by the HFM is stored in the memory 5 (S346). Subsequently, the image data of the sc-th stripe of the decoded third layer image is inputted into the magnifier 9 via the bus 14 to magnify the image twice as large. The image data from the $(Sw/2^{Dlevel} \times (sc-1)+1)$ line to the $(Sw/2^{Dlevel})$ is rewritten by the decoded data, and displayed on the layer display window on the display 12 (S347). The decoding and displaying of stripes are repeated until the stripe count variable sc becomes equal to the number of stripes Sn (S344).

When the stripe count variable sc becomes equal to the stripe number Sn (S344), the CODEC 3 informs of the end of decoding to the CPU 1 (S348). The CPU 1 waits an input from the layer display panel, and the process proceeds th the next processing.

Again, when the user selects the "UP" button of the layer display panel using the mouse 22 (S336–S338), the decoding and displaying are performed on the image at the next layer. The CPU 1 subtracts "1" from the variable $C_{level}$ and the result "2" is obtained (S339).

Furthermore, the frame memories respectively indicated by HFM and LFM are exchanged so that the HFM indicates the frame memory 4 and the LFM indicates the frame memory 5 (S341). The magnifying power E is obtained as "1" from the equation (2) (S342). The number of stripes Sn is obtained and the stripe count variable sc is substituted by "1" (S343). The CUP 1 adds "1" to the stripe count variable sc (S345), reads the encoded data from the buffer 6 in the stripe unit, and the CODEC 3 decodes the stripe. The CODEC 3 decodes the stripe of the second layer image with reference to the third layer image of the frame memory 5 indicated by the LFM, and the decoded image is stored in the memory 5 indicated by HFM (S346). Subsequently, the image data of the sc-th stripe of the second layer image is enlarged by the magnifier 9 via the bus 14, rewritten as predetermined image data in the video frame memory 10, and displayed on the layer display window on the display 12 (S347). The decoding and displaying of the stripe are repeated.

When the stripe count variable sc becomes equal to the number of stripes Sn (S344), this is informed to the CPU 1 (S348). The CPU 1 waits an input from the layer display panel, and the process proceeds to the next processing.

Furthermore, when the user selects the "UP" button of the layer display panel using the mouse 22 (S336–S338), the decoding and displaying of the image at the next layer are performed. The CPU 1 subtracts "1" from the variable $C_{level}$, and the result "1" is obtained (S339). Since the variable $C_{level}$ is smaller than the display layer $D_{level}$ (S340), the CPU 1 instructs the graphics controller 11 to generate and display the high resolution window whose size is Ws×Ws on the display 12 (S350).

Furthermore, the frame memories respectively indicated by HFM and LFM are exchanged so that the HFM indicates the memory 5 and the LFM indicates the frame memory 4 (S352). The CPU 1 reads the encoded data out of the buffer 6, and the CODEC 3 decodes the read data. The CODEC 3 decodes the first layer image with reference to the second layer image of the frame memory 4 indicated by LFM, and the decoded data is stored in the frame memory 5 indicated by HFM (S353). The CODEC 3 indicates the end of decoding of the first layer image to the CPU 1 (S354).

The CPU 1 reads the image data of the area Ws×Ws where Ws from the origin in the width and length directions of the first layer image from the frame memory 5, writes in the area corresponding to the high resolution window of the video frame memory 10 via the bus 14 and magnifier 9, and displays the data on the high resolution window of the display 12 via the graphics controller 11 (S355). When writing to the video frame memory 10 ends, the frame having the width and length of $(Ws/2^{(Dlevel-Clevel)})$ is written where the origin of the coordinate is at the upper left corner of the layer display window (S356). The frame is realized by inverting the pixels on the border of the area in the layer display window. The CPU 1 waits an input from the input apparatus 2, and the process proceeds to the next processing.

When the user inputs an arbitrary coordinate values (Px, Py) on the image of the layer display window using the mouse 22 (S357–S359), the CPU 1 reads the image data in the area of Ws×Ws whose origin is $((Px \times 2^{(Dlevel-Clevel)}-Ws/2), (Py \times 2^{(Dlevel-Clevel)}-Ws/2))$ out of the frame memory 5, and transmits the read image data via the bus 14 and the magnifier 9 to the area of the video frame memory 10 corresponding to the high resolution window where the read image is written. The image is then displayed on the high resolution window of the display 12 via the graphics controller 11 (S360). When the writing to the video frame memory 10 ends, the pixels at the position of the previous frame are inverted to delete the previous frame, and the new frame having the $(Ws/2^{(Dlevel-Clevel)})$ width and length whose origin is $(Px-Ws/2^{(Dlevel-Clevel-1)}, Py-Ws/2^{(Dlevel-Clevel-1)})$ at the upper left corner of the layer display window (S361). The CPU 1 waits for an input from the input apparatus 2, and the process proceeds to the next processing.

Furthermore, when the user selects the "UP" button of the layer display panel using the mouse 22 (S357–S359), decoding and displaying are performed on the image at the next layer. The CPU 1 subtracts "1" from the variable $C_{level}$, and the result "0" is obtained (S362). The frame memories respectively indicated by HFM and LFM are exchanged so that the HFM indicates the frame memory 4 and the LFM indicates the frame memory 5 (S352).

The CPU 1 reads the encoded data from the buffer 6, and the CODEC 3 decodes the image. The CODEC 3 decodes the zero layer image with reference to the first layer image of the frame memory 5 indicated by LFM, and the decoded image is stored in the frame memory 4 (S353). The CODEC 3 indicates the end of decoding of the zero layer image to the CPU 1 (S354).

The CPU 1 reads the image data of the area Ws×Ws where Ws in the width and length from the origin on the first layer image from the frame memory 5, writes in the area corresponding to the high resolution window of the video frame memory 10 via the bus 14 and magnifier 9, and displays the data on the high resolution window of the display 12 via the graphics controller 11 (S355). When writing to the video frame memory 10 ends, the previous frame is deleted by inverting the pixels at the position of the previous frame, and the frame having the width and length of $(Ws/2^{(Dlevel-Clevel)})$ is written where the origin of the layer display window is at the upper left corner (S357). The CPU 1 waits an input from the input apparatus 2, and the process proceeds to the next processing.

When the user inputs an arbitrary coordinate values (Px, Py) on the image of the layer display window using the mouse 22 (S357–S359), the CPU 1 reads the image data in the area of Ws×Ws from the frame memory 4 based on the coordinate $(Px \times 2^{(Dlevel-Clevel)}, Py \times 2^{(Dlevel-Clevel)})$ out of the frame memory 4, and transmits the read image data via the bus 14 and the magnifier 9 to the area of the video frame memory 10 corresponding to the high resolution window where the read image is written. The image is then displayed on the high resolution window of the display 12 via the graphics controller 11 (S360). When the writing to the video frame memory 10 ends, the new frame having the $(Ws/2^{(Dlevel-Clevel)})$ width and length whose origin is at the upper left corner of $(Px-Ws/2^{(Dlevel-Clevel-1)}, Py-Ws/2^{(Dlevel-Clevel-1)})$ is written (S361). The CPU 1 waits for an input from the input apparatus 2, and the process proceeds to the next processing.

Furthermore, when the user selects the "END" button of the layer display panel using the mouse 22 (S336–S338), the layer display window and the layer display panel are deleted (S349). The CPU 1 waits for an input from the input apparatus 2, and the process proceeds to the next processing.

When the user selects the "PRINT" button of the layer display panel using the mouse 22 (S357–S359), the image displayed on the layer display window is decoded to the zero layer image, and the decoded image is printed out from the printer 13. The procedure is described below.

The resolution Rp of the printer 13 is read out of the register 20 when the "PRINT" button is selected (S363). The resolution Rc of the zero layer image of the encoded data from the resolution data is attained in advance (S324). That is, 400 dpi for the scanner 8, and 600 dpi for the scanner 17. The resolution Rp of the printer 13 is 400 dpi. The print out layer variable $P_{level}$ can be obtained by:

$$P_{level}=[Rc/Rp]-1 \qquad (4)$$

That is, the print out layer $P_{level}$ is "0" in case of the scanner 8, and "1" in case of the scanner 17.

If $C_{level}=P_{level}$ (S365), the image of the frame memory indicated by HFM is transmitted to the printer 13 via the bus 14, and printed out (S370). The layer display window, layer display panel and high resolution window are deleted (S371). Subsequently, the CPU 1 waits for an input from the input apparatus 2, and the process proceeds to the next processing.

If the variable $C_{level}$ of the printer 13 is greater than $P_{level}$ ($C_{level}>P_{level}$) (S365), the CPU subtracts "1" from the variable $C_{level}$ (S366). The frame memories indicated by HFM and LFM are exchanged respectively (S367). The CPU 1 reads out the encoded data from the buffer 6, and the CODEC 3 decodes the encoded data. The CODEC 3 decodes the ($C_{level}$)-th image with reference to the ($C_{level}$+1)-th image of the frame memory indicated by LFM, and the decoded image is stored in the frame memory indicated by the HFM (S368). The CODEC 3 indicates the end of decoding of the ($C_{level}$)-th layer image to the CPU 1 (S369). If $C_{level}=P_{level}$, the image of the frame memory indicated by the HFM is outputted to the printer 13 via the bus 14, and printed out by the printer 13 (S370). If $C_{level} > P_{level}$ (S365), the decoding of the encoded data of the buffer 6 is repeated (S336–S369)

The data is decoded in the above-described procedure, and the image can be displayed on the display in accordance with the resolution of the display. Similarly, the image can be printed out in accordance with the resolution of the printer.

The CPU 1 reads the resolution data, header data and encoded data from the external apparatus via the communication line 16 and communication interface 15 to store in the storage 7 or transmit to the external apparatus.

Since the image processing apparatus with the above described structure can display an image of any resolution on the display having a low resolution, the image size can be grasped at a moment, and the speed of displaying the outline can be increased.

Furthermore, an image whose resolution is higher than that of the display can be displayed, the image processing is improved.

Furthermore, since the display is performed while the image at each layer is decoded, a machine interface is improved, and uncomfortability due to the delay of display can be removed.

Still further, images whose zero layer resolutions are different can be dealt by clarifying the resolution of the zero layer image. Display and printing preferable to the display and printer can be performed. In addition, images at different resolutions can be grouped to display.

Furthermore, in the embodiment, the structure of the apparatus becomes flexible by providing the resolutions of scanner (image input apparatus), printer and display (output apparatus) in the register.

In addition to the above-described structures, the following modifications can be performed.

The input/output apparatus of an image is not limited to a printer, scanner and display, and the number of each unit is also not limited. The format of progressive build-up image and the method of storage are not limited to the above-described format and method. For example, the CPU can manage the format and method or the header information can include those.

Analysis of the header data can be performed by the CODEC 3.

The JBIG algorithm is used for encoding in the embodiments, however, it can be replaced by any algorithm capable of encoding image at different resolutions.

The structure of the frame memory is not limited to the above-described structure, for it can be a memory directly connecting to the bus or a memory belonging to the CPU.

The number of layers at the encoding processing is not limited to the embodiments, for it can be applied to the case where the number alters based on the image.

Display at the encoding processing can be performed in the stripe unit.

The magnifying power can be set by multiplying the magnifying power E by (Rd/Rd1) from the resolution Rd1= Rc/$2^{Dlevel}$ (75 dpi when read by the scanner 17) in the display layer $D_{level}$ where the resolution of display and that of image and the resolution Rd of display.

The structure of the window and panels are not limited to the above-described structure, and the means for displaying an image is also not limited.

Updating of display in the progressive build-up display is performed in the stripe unit, however, the unit is not limited to the stripe. For example, it can be a plurality of lines (e.g., two lines) and pixel unit or pixel block (e.g., 2×2).

The resolution data can be a variable code or code representing a type of printer.

[Third Embodiment]

As a third embodiment, an image processing apparatus capable of encoding and synthesizing images is described.

<Structure of the Apparatus>

Figure 24:
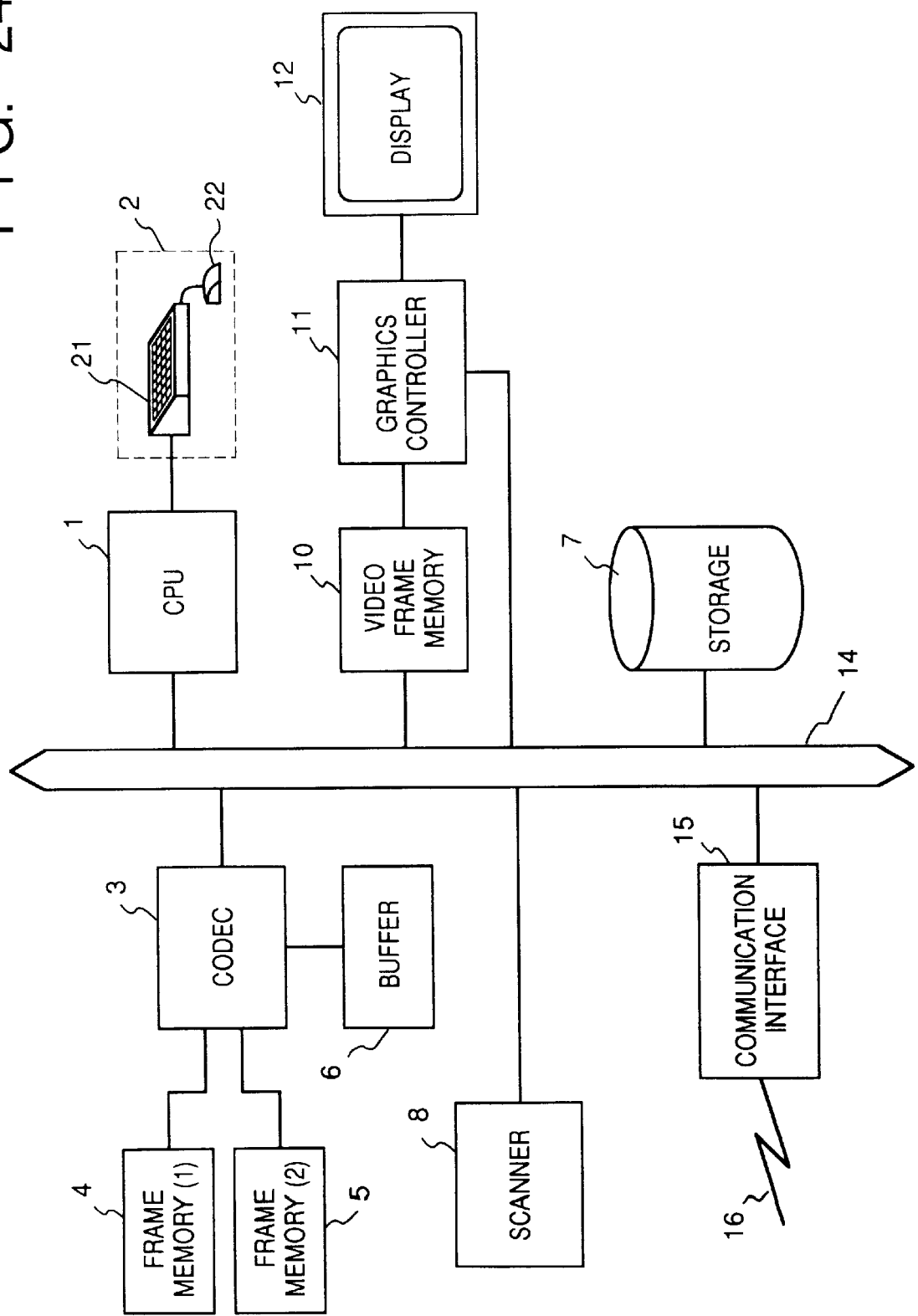
FIG. 24 is a block diagram illustrating the image processing apparatus of a third embodiment according to the present invention.
Figure 25:
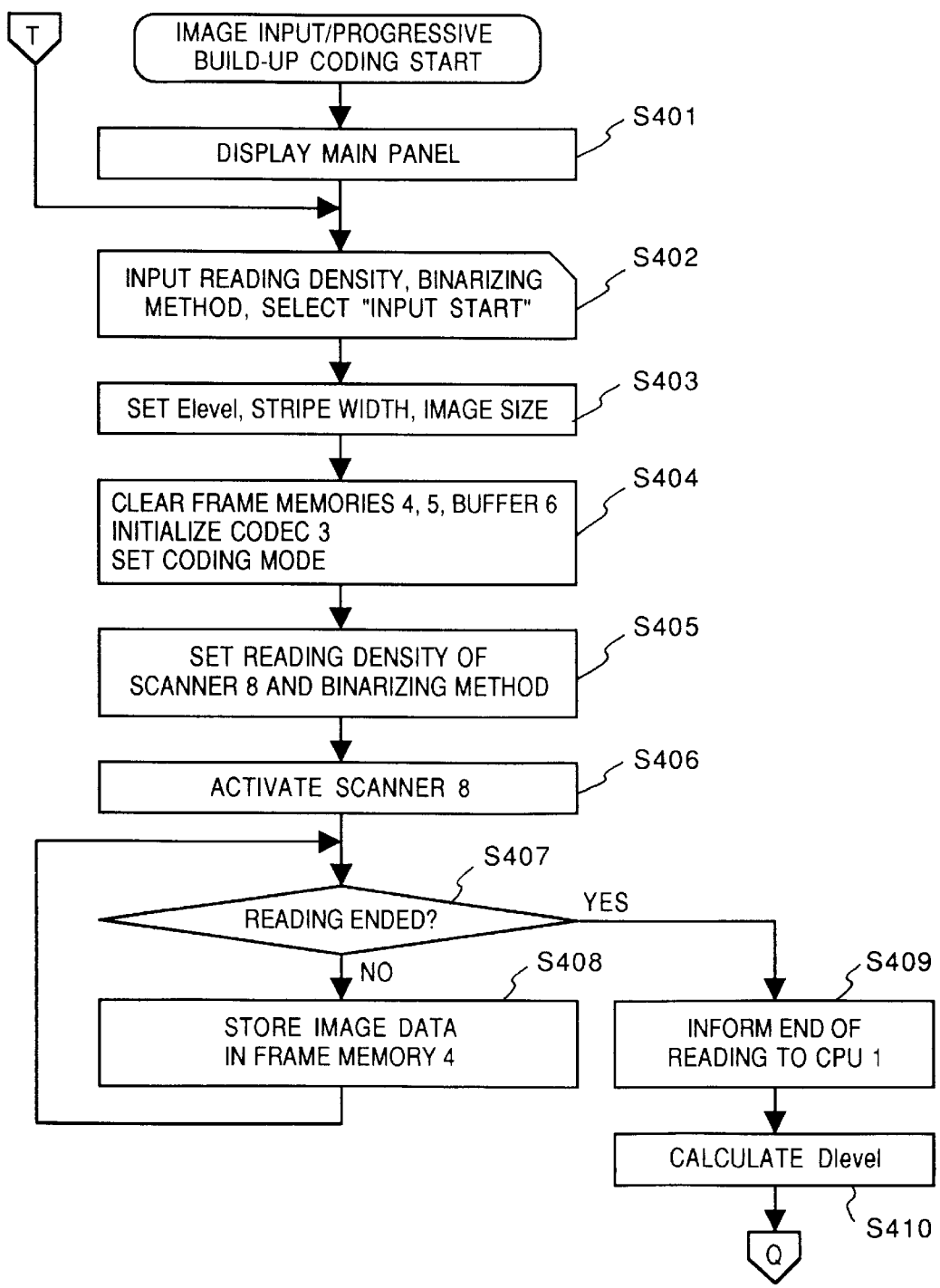
FIGS. 25–28 are flowcharts illustrating an example of the procedure of an image input and progressive build-up coding according to the present invention.
Figure 26:
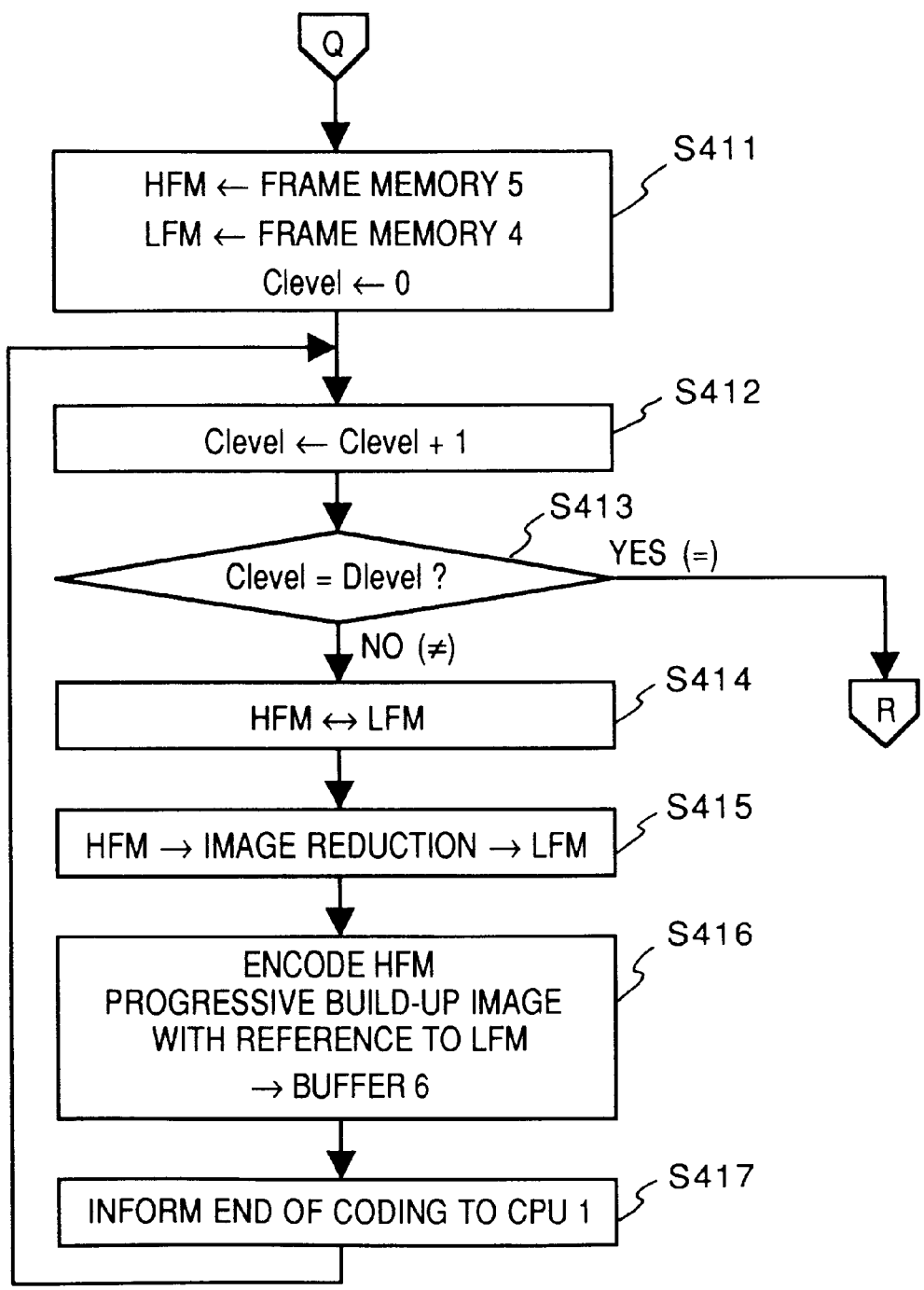
Figure 27:
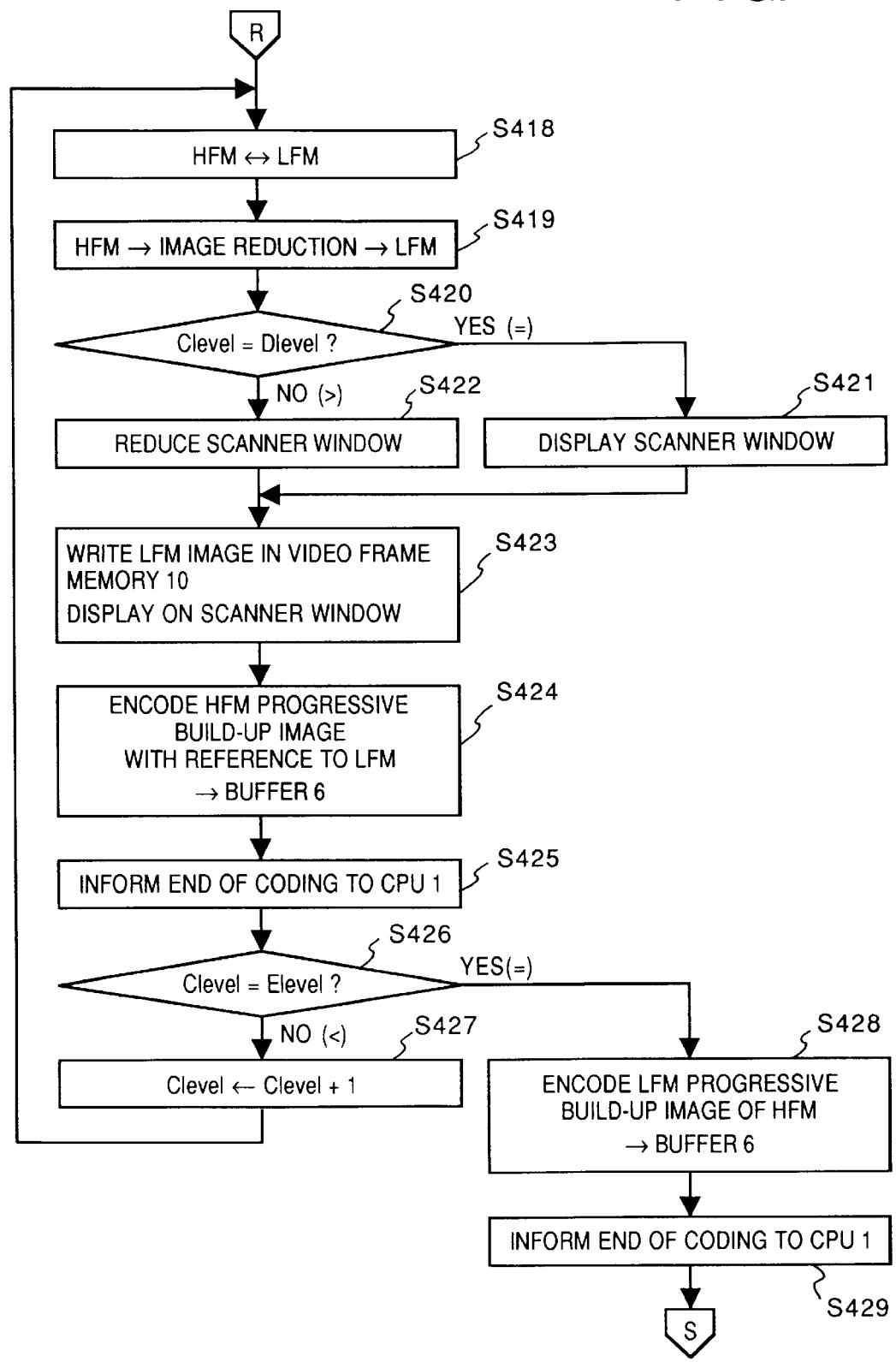
Figure 28:
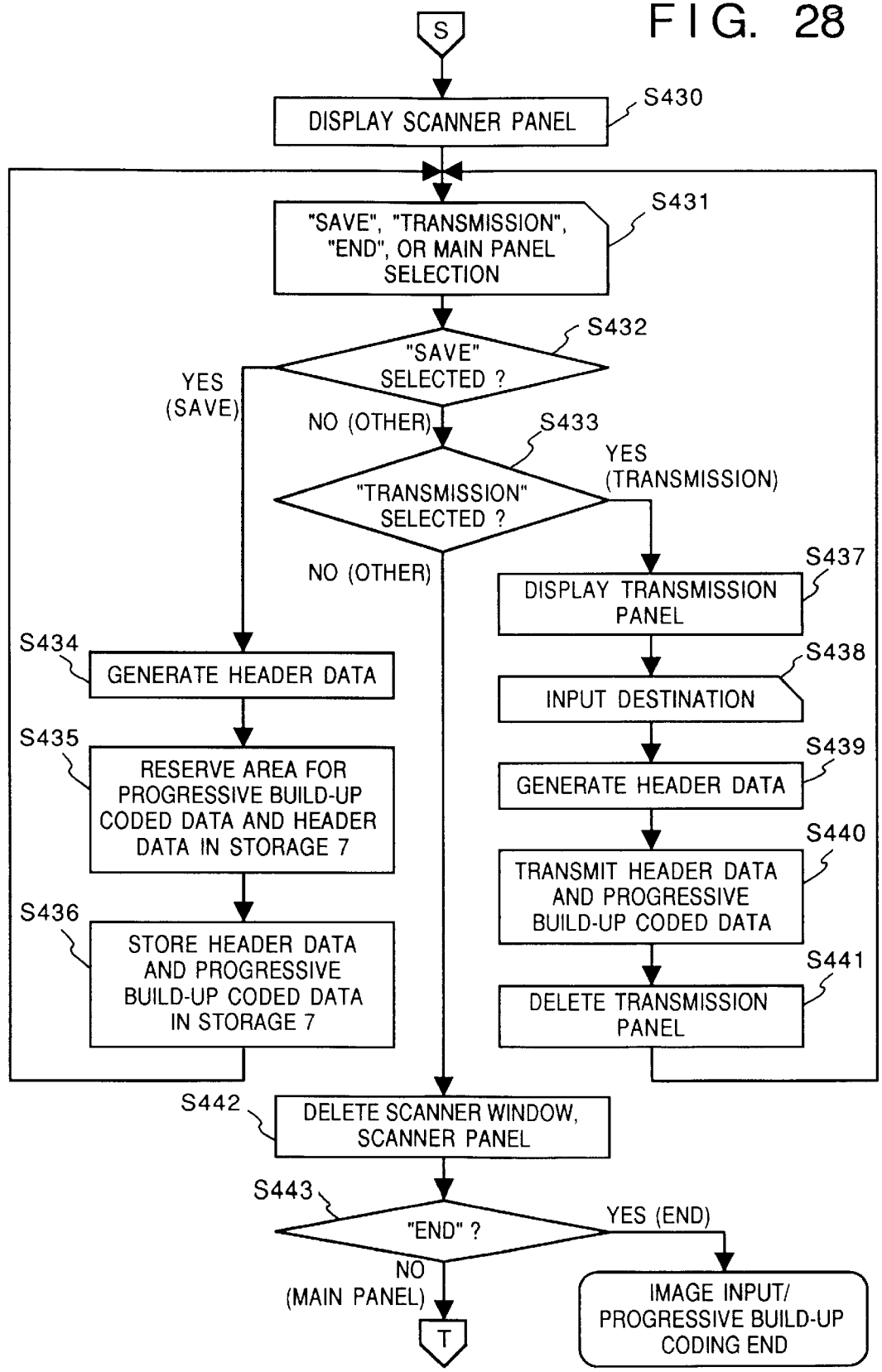

FIG. 24 illustrates the feature of the present invention. In FIG. 24, the CPU 1 controls an entire apparatus. The input apparatus 2 includes a keyboard 21 and a mouse 22 to input commands from a user.

CODEC 3 encodes images. To simplify the description, JBIG algorithm is taken as an example. Frame memories 4 and 5 store the generated images. Buffer 6 stores the progressive build-up coded data. Storage 7 is comprised of, e.g., a magnetic apparatus to store the encoded data and header data. Scanner 8 reads image data. Note that the resolution of the scanner 8 is 400 dpi.

Graphics controller 11 generates graphics by control instructions from the CPU 1, and displays the image in the video frame memory 10 by generating windows, the panel for image input, a complementary display of the image in the video frame memory, and the cursor operated by the mouse 22. Note that the resolution of the display 12 is 100 dpi.

The communication line 16 connects to a communication interface 15 to the outside. The bus 14 connects to the communication interface 15 and communication line 16, and transmits/receives the header data, encoded data, image data and control instruction.

The resolutions of the scanner 8 and display 12 are automatically set in the CPU 1 respectively when the power of the apparatus is turned on. In the embodiment, the resolution is set as 400 dpi to the scanner 8, and 100 dpi, the display 12.

<Encoding Procedure>

The image input/encoding procedure according to the apparatus with the above structure is shown in the flowcharts in FIGS. 25–28.

Figure 29:
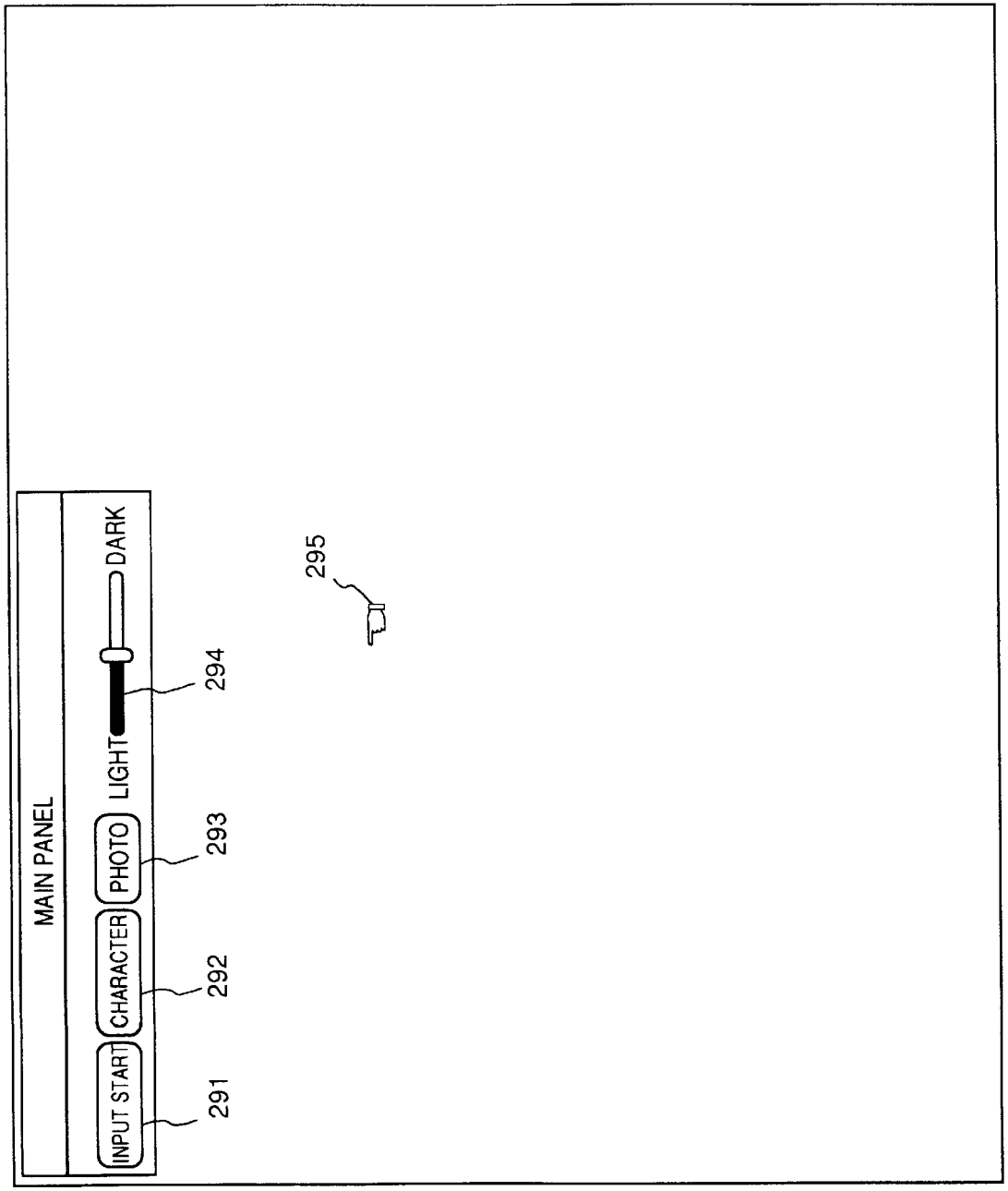
FIGS. 29–32 are diagrams illustrating an example of display state.

The CPU 1 instructs the graphics controller 11 to generate and display a main panel in graphics on the display 12 (S401). The display state of the display 12 is shown in FIG. 29. The main panel has an "INPUT START" button 291, "CHARACTER" button 292 for selecting a binarizing method, "PHOTO" button 293, and density adjustment slider button 294. The arrow 295 in FIG. 29 is a cursor operated by the mouse 22. When a user places an original image on the scanner 8, inputs a selection of binarizing method, selects the "INPUT START" button, the image is encoded (S402).

The CPU 1 sets the number of layers for encoding, the width of stripe, size of image, and the like (S403). The number of layers is determined as a variable $E_{level}$, and set to "5" in the embodiment. The image size is supposed as (Sx, Sy). Furthermore, the CPU 1 initializes the CODEC 3, sets the coding mode, and clears the frame memories 4, 5, and buffer 6 (S404).

Subsequently, the CPU 1 sets the reading density and binarizing method (S405), and starts reading the original image (S406). The scanner 8 converts the read multi-layer image to the designated density, and binarizes by the binarizing method so as to simply binarize by a fixed threshold if the "CHARACTER" button is selected in FIG. 6, or by the dither method if the "PHOTO" button is selected. The binarized image data is stored in the frame memories 4 via the bus 14 and CODEC 3 (S408). When the image is read, the read image is binarized, and then all image data is stored in the frame memory 4 (S407), and the scanner 8 informs of the end of reading (S409).

Suppose that the resolution of display is Rd, and that of the scanner 8 is Rs. These resolutions are known since they are set when the power is turned on.

Suppose that an encoding layer where the resolution if the display and that of the image are matched is determined as a display layer Dlevel.

The display layer $D_{level}$ is obtained by the following equation (5):

$$D_{level} = \log_2(Rs/Rd) \qquad (5)$$

The result is "2" in this case (S410).

The CPU 1 designates the frame memory 5 as a high resolution frame (hereinafter, referred to as "HFM"), the frame memory 4 as a low resolution frame (hereinafter, referred to as "LFM"), and the variable $C_{level}$ as "0" (S411).

The CPU 1 adds "1" to the variable $C_{level}$ (S412) Subsequently, the variable $C_{level}$ and the display layer $D_{level}$ are compared (S413), and the steps S413–S417 are repeated until $C_{level}$ and $D_{level}$ are matched.

The CPU 1 exchanges the frame memories respectively indicated by the HFM and LFM (S414). That is, it is set so that the variable $C_{level}$ is "1", the HFM indicates the frame memory 4, and the LFM indicates the frame memory 5.

The CPU 1 reduces the image to ½ by using the CODEC 3, and stores the reduced image in the LFM (S415). That is, the first layer image at the resolution of 200 dpi is stored in the frame memory 5 indicated by the LFM. When the first layer image is generated in the frame memory 5, the CODEC 3 encodes the zero layer image in the frame memory 4 indicated by HFM with reference to the first layer image indicated by LFM, and the encoded data is stored in the buffer 6 (S416). The CODEC 3 indicates the end of encoding to the CPU 1 when the zero layer image has been encoded (S417).

Subsequently, the CPU 1 adds "1" to the variable $C_{level}$, and the result "2" is obtained (S412). The resolution of the second layer image obtained by reduction is 100 dpi. Since $C_{level}$ becomes equal to $D_{level}$ (S413), the CPU 1 exchanges the frame memories respectively indicated by HFM and LFM so that the HFM indicates the frame memory 5 and the LFM indicates the frame memory 4 (S418). The CPU 1 reduces the image to ½ by using the CODEC 3, and stores the reduced image, the second layer image at the resolution of 100 dpi in the frame memory 4 indicated by the LFM (S419).

Figure 30:
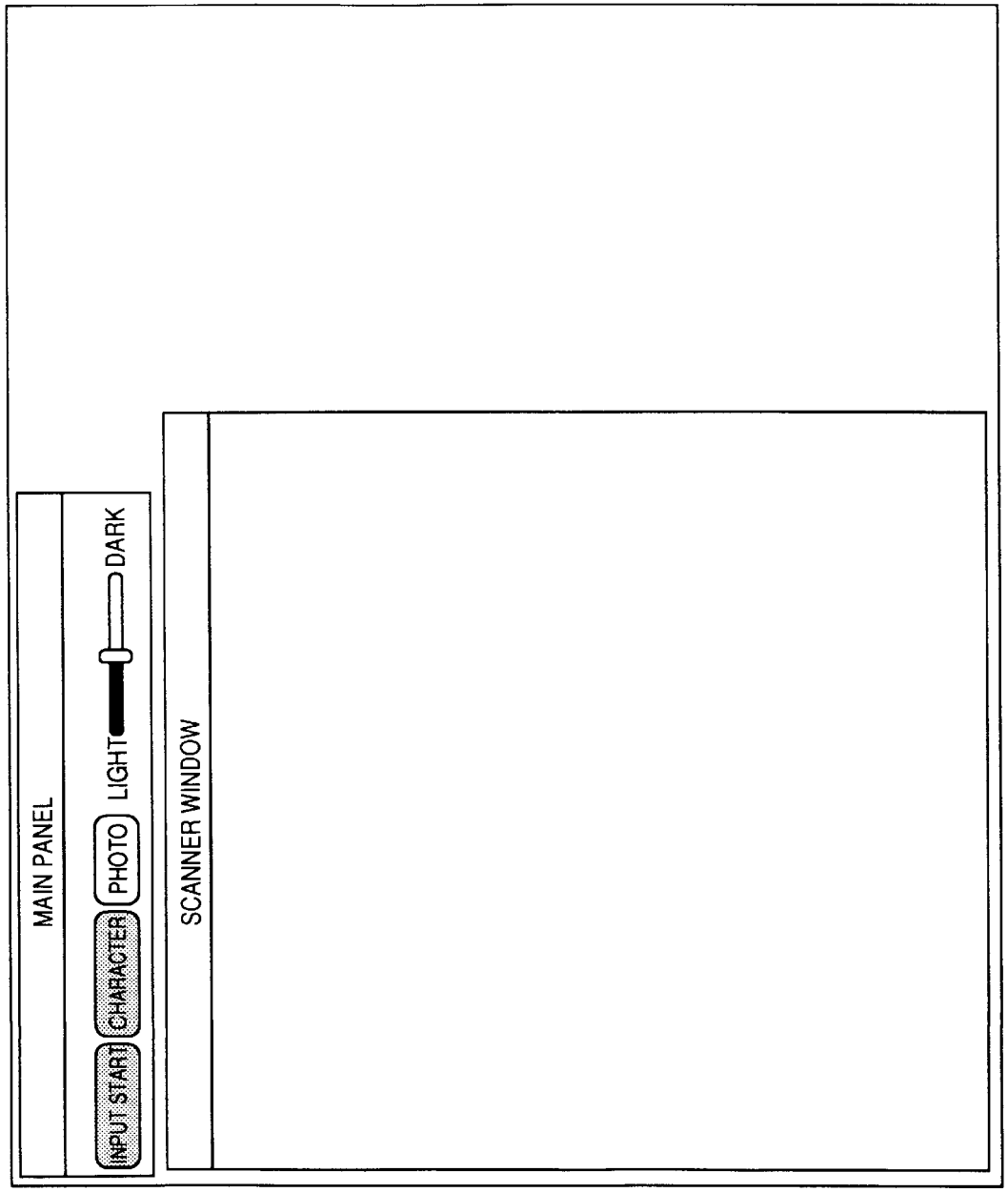

If the second layer image is generated in the frame memory 4, it means that the variable $C_{level}$ is equal to the number of layers for encoding $E_{level}$ (S420), the CPU 1 instructs the graphics controller 11 to generate and display the scanner window on the display 12 in graphics (S421). The display state of the display 12 is shown in FIG. 30. The size of the scanner window (Wx, Wy) is obtained by:

$$Wx = Sx/2^{Dlevel}$$

$$Wy = Sy/2^{Dlevel}$$

The CPU 1 stores the second layer image of the frame memory 4 in the video frame memory 10 via the CODEC 3 and the bus 14, and the image is displayed in the scanner window on the display 12 (S423).

The CODEC 3 encodes the first layer image in the frame memory 5 indicated by the HFM with reference to the second layer image of the frame memory 4 indicated by the HFM, and the encoded data is stored in the buffer 6 (S424). The CODEC 3 indicates the end of encoding to the CPU 1 when the first layer image of the frame memory 5 has been encoded (S425).

Subsequently, the variable $C_{level}$ is compared with the number of layers $D_{level}$ (S426). If they are not equal, the steps S418–S427 are repeated. The CPU 1 adds "1" to the variable $C_{level}$, and the result "3" is obtained (S427). The CPU 1 exchanges the frame memories respectively indicated by HFM and LFM so that the HFM indicates the frame memory 5 and the LFM indicates the frame memory 4 (S418). The CPU 1 reduces the image to ½ by using the CODEC 3, and stores the reduced image, the third layer image at the resolution of 50 dpi in the frame memory 5 indicated by the LFM (S419).

If the third layer image is generated in the frame memory 5, the CPU 1 instructs the graphics controller 11 to reduce the size (Wx, Wy) of the scanner window to ½ (S422). The CPU 1 stores the third layer image of the frame memory 5 in the video frame memory 10 via the CODEC 3 and the bus 14, and the image is displayed in the scanner window on the display 12 (S423).

The CODEC 3 encodes the second layer image in the frame memory 4 indicated by the HFM with reference to the third layer image of the frame memory 5 indicated by the LFM, and the encoded data is stored in the buffer 6 (S424). The CODEC 3 indicates the end of encoding to the CPU 1 when the first layer image of the frame memory 4 has been encoded (S425).

Similarly, the CPU 1 adds "1" to the variable $C_{level}$, and the result "4" is obtained (S427). The CPU 1 exchanges the frame memories respectively indicated by HFM and LFM so that the HFM indicates the frame memory 5 and the LFM indicates the frame memory 4 (S418). The CPU 1 reduces the image of HFM to ½ by using the CODEC 3, and stores the reduced image, the fourth layer image, at the resolution of 25 dpi in the frame memory 4 indicated by the LFM (S419). If the fourth layer image is generated in the frame memory 4, the CPU 1 instructs the graphics controller 11 to reduce the size (Wx, Wy) of the scanner window to ½ (S422). The CPU 1 stores the fourth layer image in the video frame memory 10 via the CODEC 3 bus 14, and the image is displayed on the scanner window of the display 12 (S423).

The CODEC 3 encodes the third layer image in the frame memory 5 indicated by HFM with reference to the fourth layer image of the frame memory 4 indicated by HFM, and the encoded data is stored in the buffer 6 (S424). The CODEC 3 indicates the end of encoding to the CPU 1 when the third layer image of the frame memory 5 has been encoded (S425).

Furthermore, the CPU 1 adds "1" to the variable $C_{level}$, and the result "5" is obtained (S427). The CPU 1 exchanges the frame memories respectively indicated by HFM and LFM so that the HFM indicates the frame memory 4 and the LFM indicates the frame memory 5 (S418). The CPU 1 reduces the image to ½ by using the CODEC 3, and stores the reduced image, the fifth layer image at the resolution of 12.5 dpi in the frame memory 5 indicated by the LFM (S419). The CPU 1 instructs the graphics controller 11 to reduce the size (Wx, Wy) of the scanner window to ½ (S422). When the fifth layer image is generated in the frame memory 5, the CPU 1 stores the fifth layer image of the frame memory 5 in the video frame memory 10 via the CODEC 3 and bus 14, and the image is displayed on the scanner window of the display 12 (S423).

The CODEC 3 encodes the fourth layer image in the frame memory 4 indicated by the HFM with reference to the fifth layer image of the frame memory 5 indicated by the HFM, and the encoded data is stored in the buffer 6 (S424).

Since the variable $C_{level}$ becomes equal to the number of layers for encoding $E_{level}$ (S426), that is, when the fourth layer image has been encoded, the CODEC 3 encodes the fifth layer image in the frame memory 5 indicated by LFM, and stores the encoded data in the buffer 6 (S428). When the fifth layer image has been encoded, the CODEC 3 indicates the end of encoding (S429).

Figure 31:
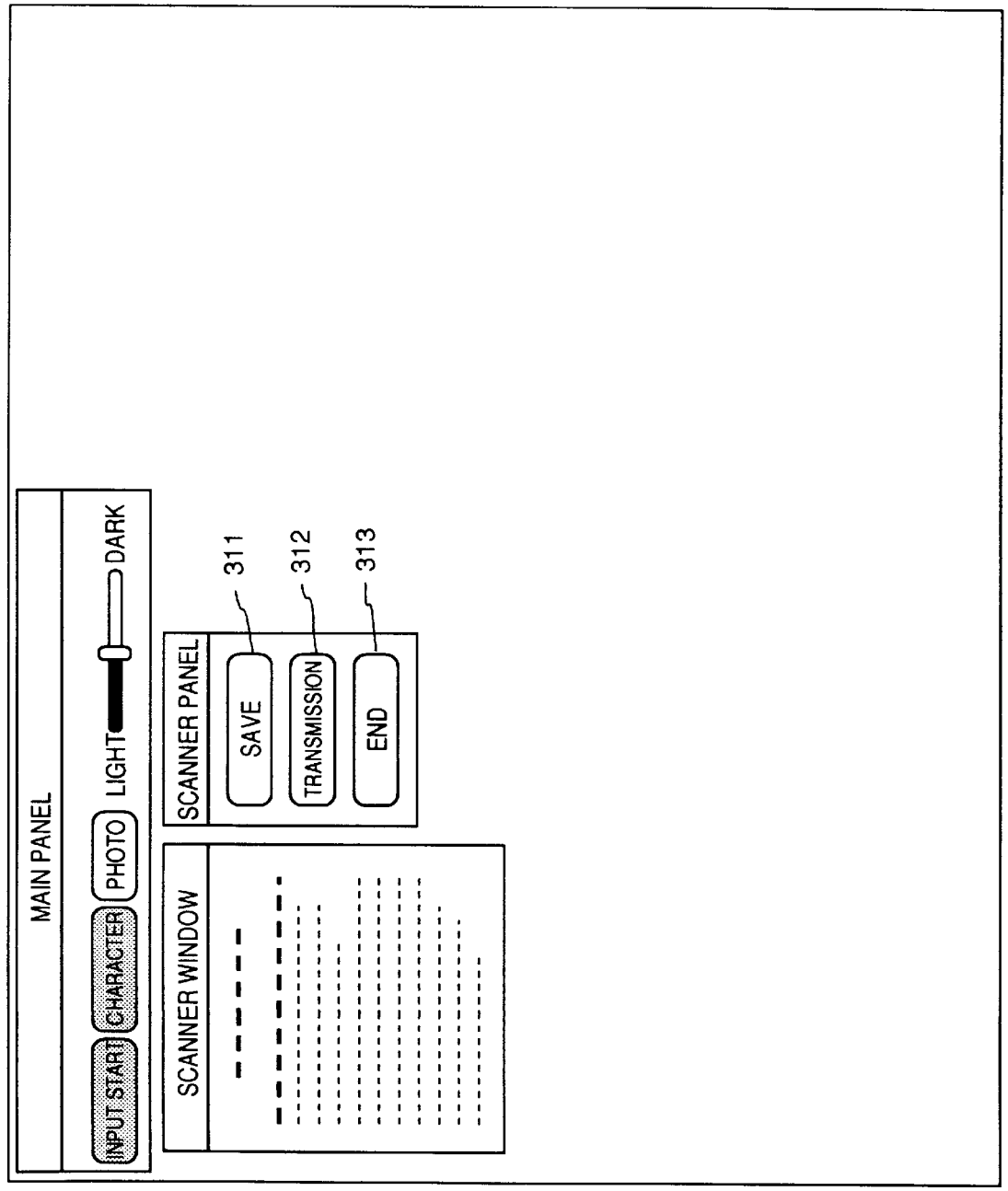

Since the encoding of the image has ended (S429), the CPU 1 instructs the graphics controller 11 to generate and display a scanner panel on the display 12 in graphics (S430). The display state of the display 12 is shown in FIG. 31. The image input panel has a "SAVE" button 311, "TRANSMISSION" button 312, and "END" button 313. The user confirms the fifth layer image displayed on the display 12, and determines if the encoded data is saved or transmitted, the process is ended, or the reading is performed again through each button on the main panel (S431).

If the input from the input apparatus 2 selects the "SAVE' button (S431–S432), header data defined by the JBIG algorithm based on the predetermined number of encoding layers and image size (Sx, Sy) (S434). The CPU 1 examines the size of the encoded data stored in the buffer 6, and reserves the area of the encoded image with the header data (S435). The CPU 1 stores the generated header data at a predetermined position of the area of the storage 7 via the bus 14, and the encoded data stored in the buffer 6 at a predetermined position of the storage 7 via the CODEC 3 and bus 14 (S436).

Figure 32:
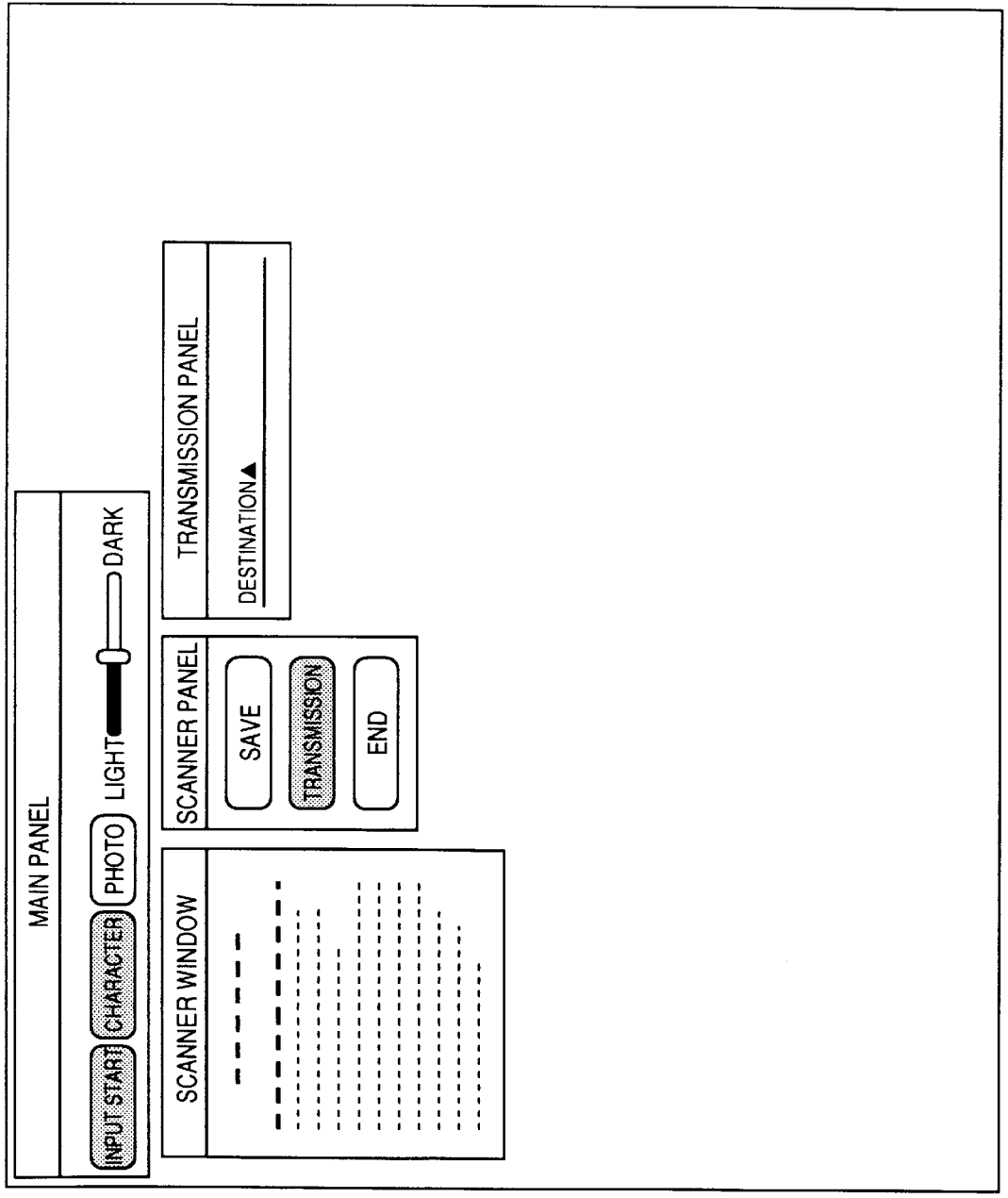

If the input from the input apparatus 2 selects the "TRANSMISSION" button (S431–S433), the CPU 1 instructs the graphics controller 11 to generate and display a transmission panel on the display 12 in graphics (S437). The display state of the display 12 is shown in FIG. 32. The user inputs a destination from the input apparatus 2 (S438). Header data defined by the JBIG algorithm is generated from the number of layers for encoding $E_{level}$, and image size (S439). The CPU 1 transmits the header data to the communication interface 15 via the bus 14, and further transmits to the other party via the communication line 16. Subsequently, in the similar manner, the encoding data stored in the buffer 6 is transmitted to the communication interface 15 via the bus 14, and to the other party via the communication line 16 (S440). When ended, the transmission panel is deleted (S441).

If the input from the input apparatus 2 is other than the "SAVE" button and "TRANSMISSION" button (S437, S433), the CPU 1 instructs the graphics controller 11 to delete the scanner window and scanner panel (S442).

If the input is the "END" button (S443), the image input/encoding processing ends.

If the input is an input from the main panel (S443), the process returns to the step S402.

In accordance with the above procedure, in the image processing apparatus of the present invention, a user can confirm an image display of the image at each layer while encoding is performed. When the image data is read by a scanner, the binarizing means can be switched between simple binarizing processing and halftone processing, or the under color removal can be performed. Thus, the burden of the user is reduced and the image processing is improved.

Since the image processing apparatus with the above described structure can display an image of any resolution on the display having a low resolution, the image size can be grasped at a moment.

[Fourth Embodiment]

As a fourth embodiment, an image processing apparatus capable of encoding image data which is similar to the third embodiment is described.

<Structure of the Apparatus>

Figure 33:
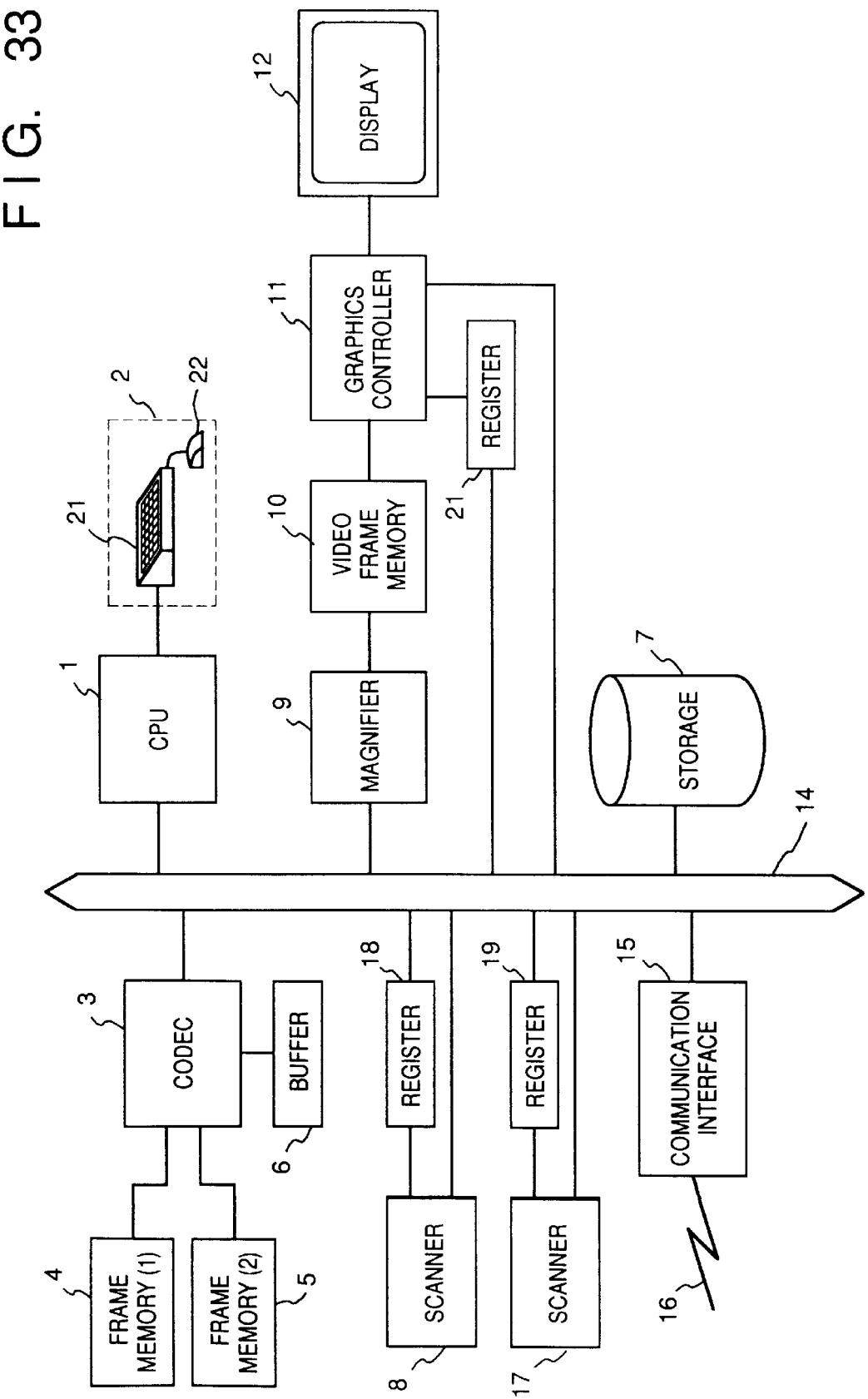
FIG. 33 is a block diagram illustrating the image processing apparatus of a fourth embodiment according to the present invention.
Figure 34:
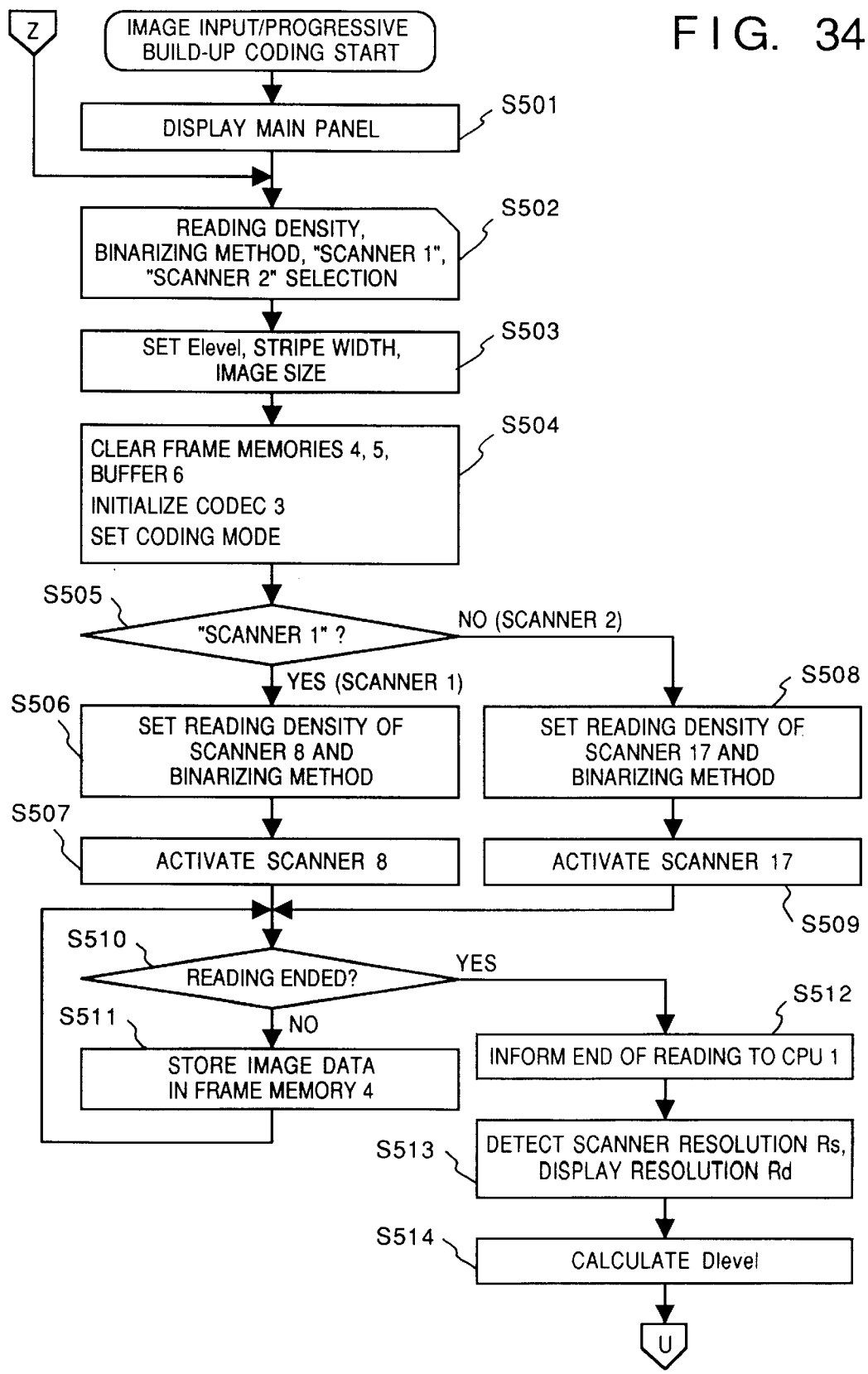
FIGS. 34–38 are flowcharts illustrating an example of the procedure of an image input and progressive build-up coding according to the present invention.
Figure 35:
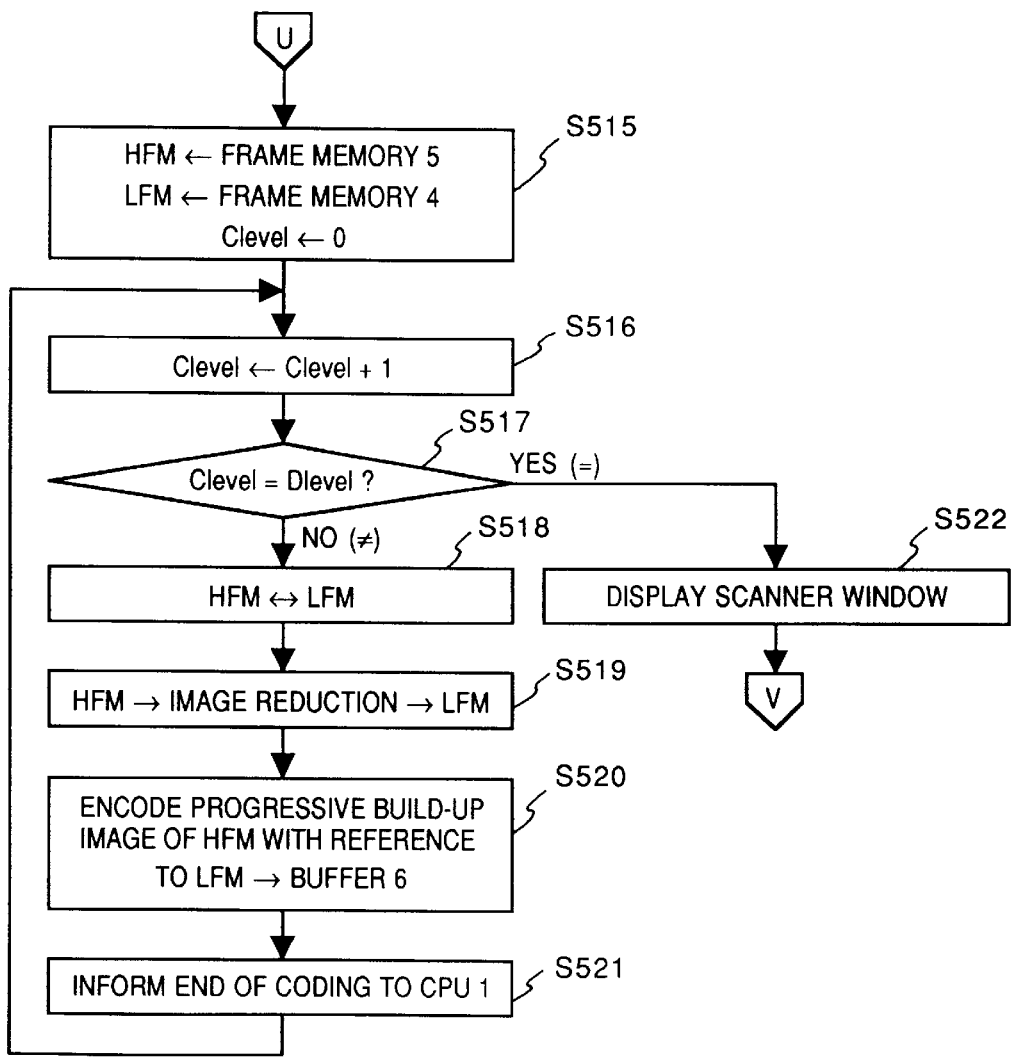
Figure 36:
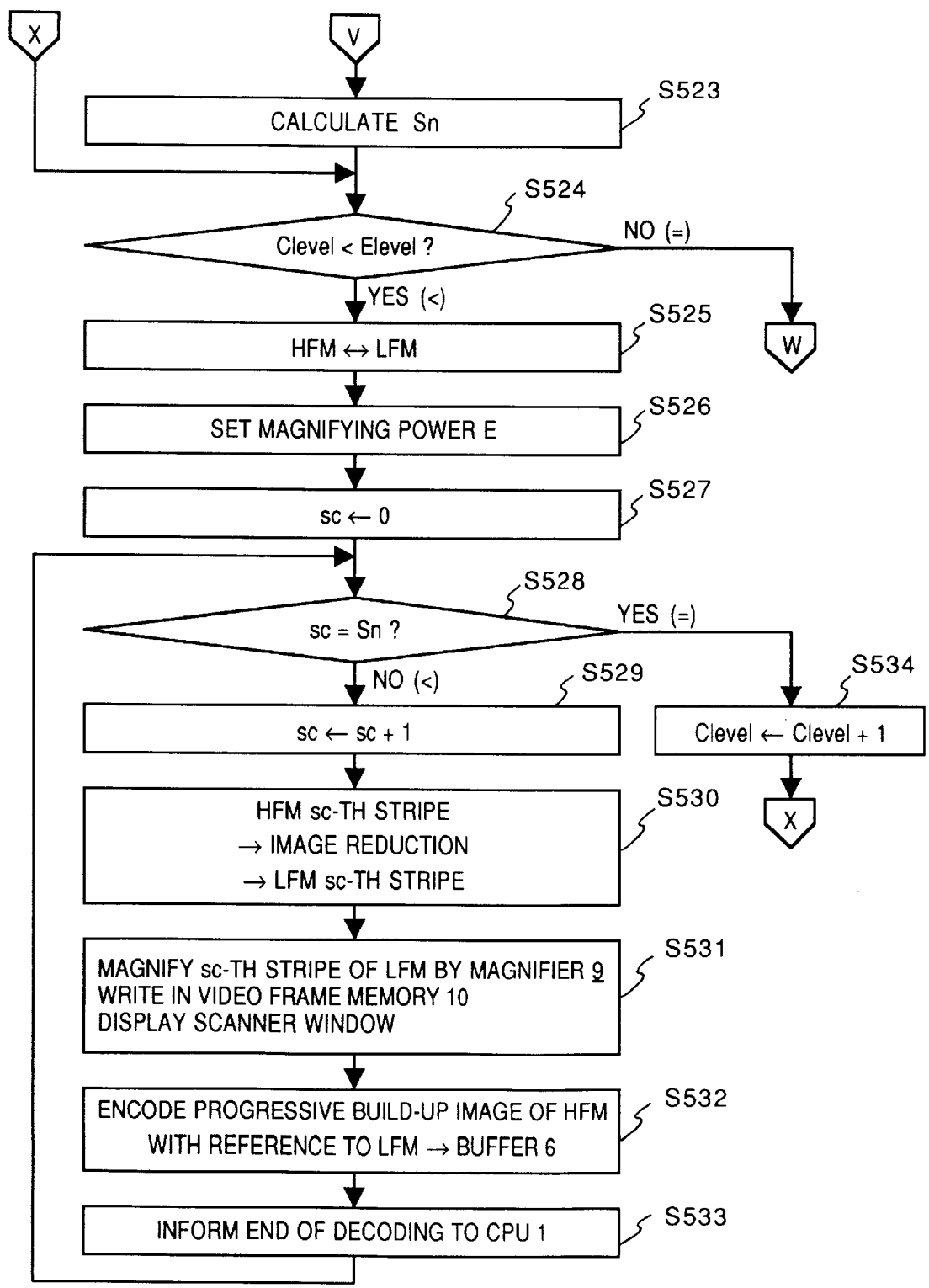
Figure 37:
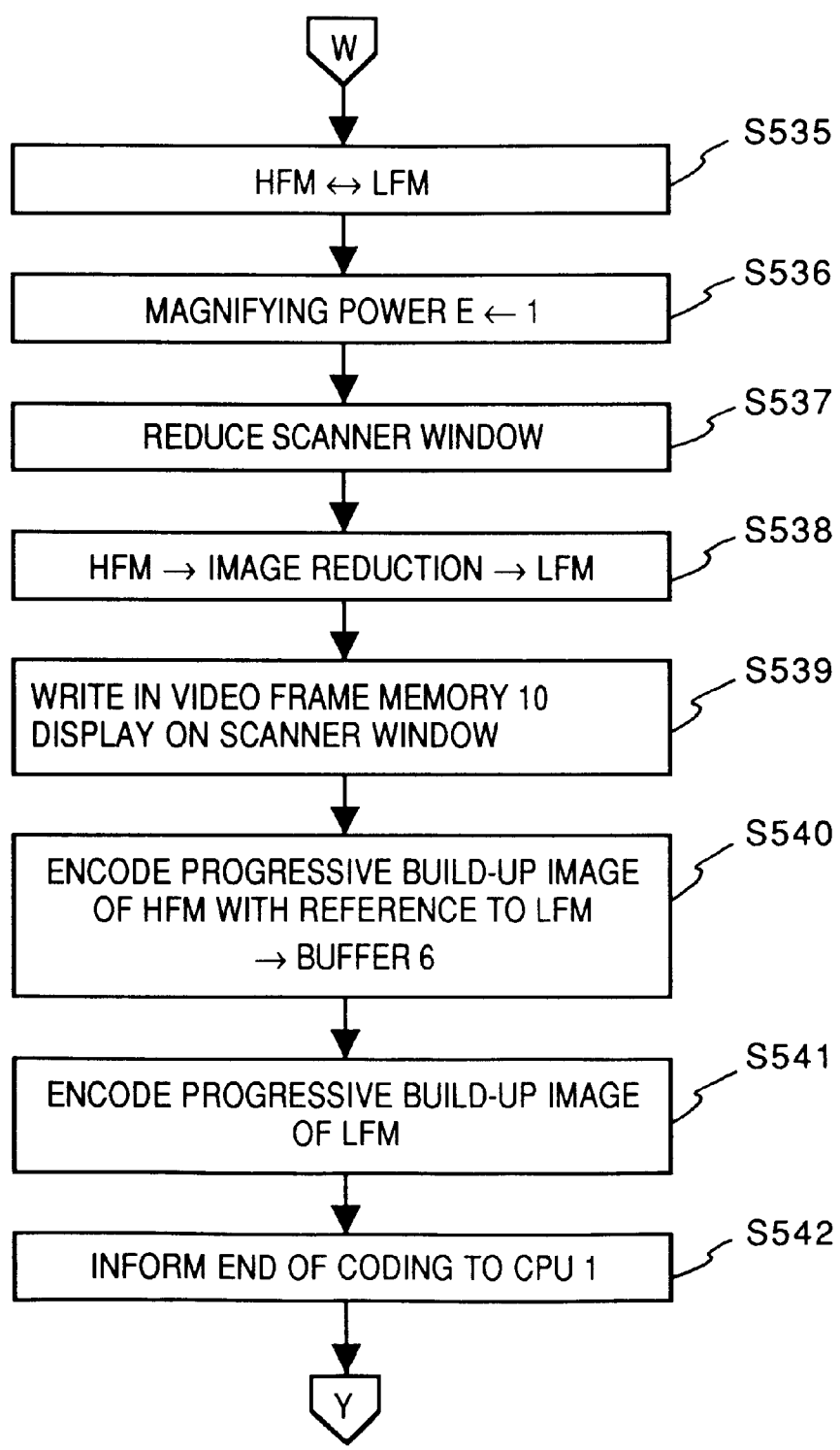
Figure 38:
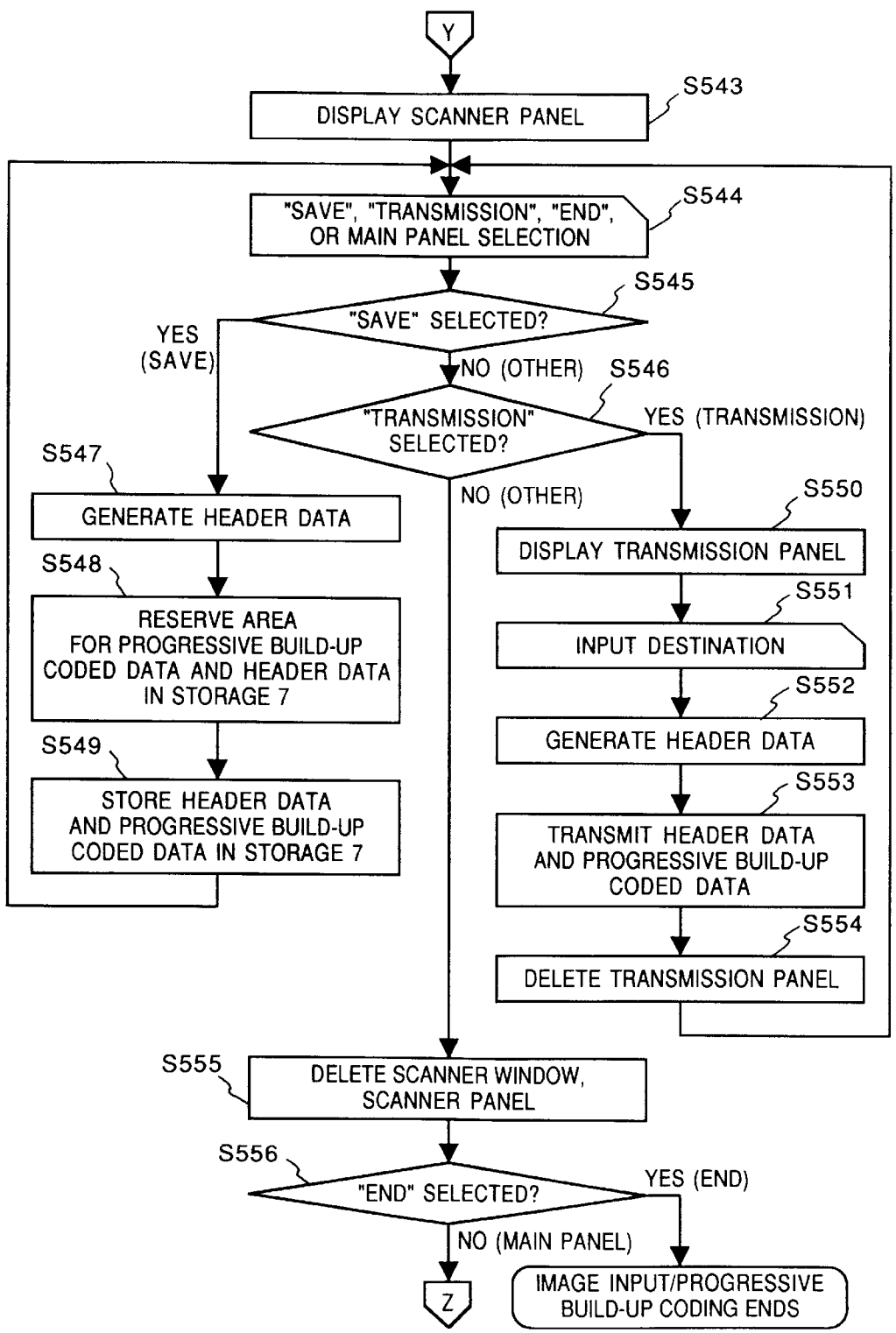

FIG. 33 is a diagram illustrating an application of the present invention. The reference numerals which are the same as those identified in FIG. 24 have the same functions respectively. The magnifier 9 magnifies input image data at a predetermined magnifying power. The scanner 17 reads image data. Note that the resolution of the scanner 17 is 600 dpi. The register 18 represents the resolution of the scanner 8, the register 19, the resolution of the scanner 17, and the register 21, the resolution of the display 11. Values are automatically set to the registers 18, 19, 21 when the power of the apparatus is turned on. That is, "400" is set to the register 18, "600", the register 19, and "100", the register 21. The registers 18, 19, 21 are read out of the CPU 1 via the bus 14.

<Encoding Procedure>

The image input/progressive build-up encoding procedure according to the apparatus with the above structure is shown in the flowcharts in FIGS. 34–38.

Figure 39:
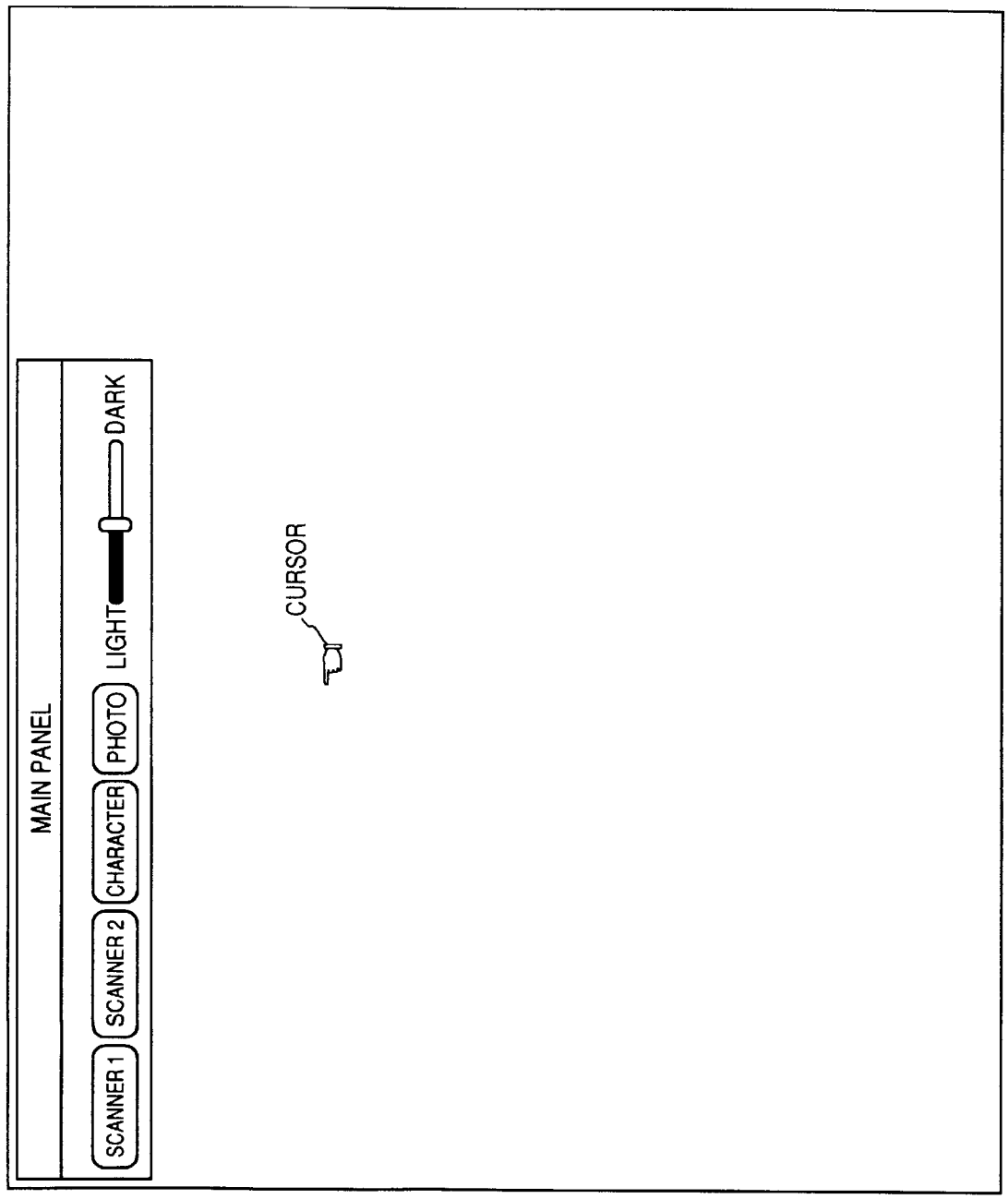
FIG. 39 is a diagram illustrating an example of display state.
Figure 40:
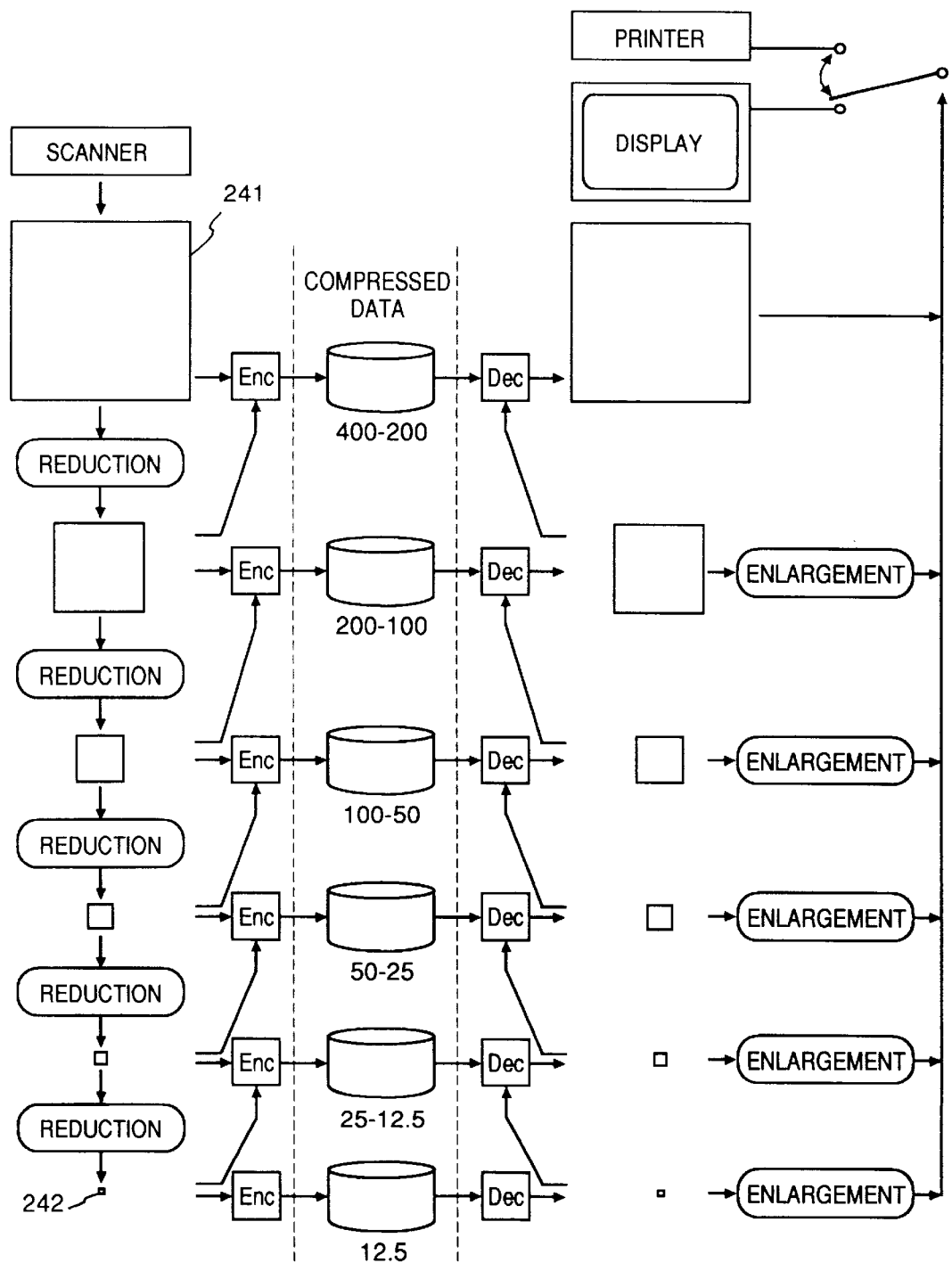
FIG. 40 is a diagram of the progressive build-up coding.

The CPU 1 instructs the graphics controller 11 to generate and display a main panel in graphics on the display 12 (S501). The display state of the display 12 is shown in FIG. 39. The main panel has an "SCANNER 1" button 391, "SCANNER 2" button 392, "CHARACTER" button for selecting a binarizing method, "PHOTO" button, and density adjustment slider button.

The user places an original image on the scanner 8 or scanner 17, and inputs a reading density and selection of binarizing method from the input apparatus to start the encoding (S502). In this case, the user selects the "SCANNER 1" button when the scanner 8 is used, while the "SCANNER 2", when the scanner 17 is used.

The CPU 1 sets the number of layers for encoding $E_{level}$, the stripe width Sw, the image size (Sx, Sy), and the like (S503). The number of layers $E_{level}$ is set to "5" in the embodiment. Furthermore, the CPU 1 initializes the CODEC 3, sets the coding mode, and clears the frame memories 4, 5, and buffer 6 (S504).

Subsequently, if the "SCANNER 1" button is selected (S505), the CPU 1 sets the reading density and binarizing method in the scanner 8 (S506), and starts reading the original image (S507). If the "SCANNER 2" is selected (S505), the CPU 1 sets the reading density and binarizing method in the scanner 8 (S508), and starts reading the original image (S509).

The scanner 8 or scanner 17 converts the read multi-layer image to a designated density, and simply binarizes by a fixed threshold if the "CHARACTER" button is selected, or by the dither method if the "PHOTO" button is selected (S511). The binarized image data is stored in the frame memories 4 via the bus 14 and CODEC 3 (S511). When the image is read, the read image is binarized, and then all image data is stored in the frame memory 4 (S510), and the scanner 8 informs of the end of reading to the CPU 1 (S512).

Suppose that the resolution of display is Rd, and that of the scanner is Rs. The CPU 1 reads the display resolution Rd from the register 21, and the scanner resolution Rs from the register 18 if the "SCANNER 1" button is selected, while from the register 19 if the "SCANNER 2" is selected via the bus 14 (S513). In the embodiment, the resolution of the scanner 8 is 400 dpi, and that of the scanner 17 is 600 dpi. The display layer $D_{level}$ representing a layer where the resolution of the display and that of the image are matched is obtained by the following equation (6):

$$D_{level}=[\log_2(Rs/Rd)] \qquad (6)$$

(hereinafter, [ ] indicates round up)

That is, the result is "2" when read by the scanner 8, while the result is "3" by the scanner 17. Hereinafter, the case of being read by the scanner 8 is described.

The CPU 1 designates the frame memory 5 as HFM, the frame memory 4 as LFM, and the variable $C_{level}$ as "0" (S515).

The CPU 1 adds "1" to the variable $C_{level}$ (S516) Subsequently, the variable $C_{level}$ and the display layer $D_{level}$ are compared (S517), and the steps S516–S521 are repeated until $C_{level}$ becomes equal to $D_{level}$.

The CPU 1 exchanges the frame memories respectively indicated by the HFM and LFM (S518). That is, it is set so that the variable $C_{level}$ is "1", the HFM indicates the frame memory 4, and the LFM indicates the frame memory 5.

The CPU 1 reduces the image to ½ by using the CODEC 3, and stores the reduced image in the LFM (S519). That is, the first layer image is stored in the frame memory 5 indicated by the LFM. When the first layer image is generated in the frame memory 5, the CODEC 3 encodes the zero layer image in the frame memory 4 indicated by the HFM with reference to the first layer image of the frame memory 5 indicated by the LFM, and the encoded data is stored in the buffer 6 (S520). The CODEC 3 indicates the end of encoding to the CPU 1 when the zero layer image has been encoded (S521).

Subsequently, the CPU 1 adds "1" to the variable $C_{level}$", and the result "2" is obtained (S516). Since $C_{level}$ becomes equal to $D_{level}$ when the image is inputted by the scanner 8 (S517), the CPU 1 instructs the graphics controller 11 to generate and display the scanner window on the display in graphics (S522).

Subsequently, the CPU 1 calculates the number of stripes Sn comprising an image (S523). The number of stripes Sn is obtained by the image size Sy in the sub-scanning direction and the stripe width Sw of the zero layer image as following:

$$Sn = Sy/Sw \qquad (7)$$

The CPU 1 exchanges the frame memories respectively indicated by HFM and LFM so that the HFM indicates the frame memory 5 and the LFM indicates the frame memory 4 (S525). The magnifying power E is set in the magnifier 9 (S526). The magnifying power E is obtained from Clevel and $D_{level}$ as following:

$$E = 2^{(Clevel-Dlevel)} \qquad (8)$$

The magnifying power E is "1" in this case. The stripe count variable sc is substituted by "0" (S527).

The CPU 1 compares the stripe count variable sc and the number of stripes Sn (S528), and the steps of S528–S533 are repeated until sc and Sn are matched.

The CPU 1 adds "1" to the stripe count variable sc (S529), and reads the image data of sc-th stripe in the frame memory 5 indicated by HFM and peripheral image data needed for reduction. The read image data is reduced to ½ by using the CODEC 3, and the image of the sc-th stripe at 100 dpi, the second layer image, is stored at the position of the sc-th stripe of the frame memory 4 indicated by LFM (S530). When the second layer image of the sc-th stripe is generated in the frame memory 4, the CPU 1 writes the image data from the $(Sw/2^{Dlevel} \times (sc-1)+1)$ line to the $(Sw/2^{Dlevel})$ on the scanner window of the video frame memory 10 and displays on the display 12 via the CODEC 3, bus 14 and magnifier 9 (S531).

The CODEC 3 decodes the second layer image of the sc-th stripe with reference to the third layer image of the frame memory 4 indicated by the LFM, and the encoded data is stored in the buffer 6 (S532). When the second layer image of the sc-th stripe has been encoded, the CODEC 3 informs of this to the CPU 1 (S533). Subsequently, the generation of the image in the stripe unit (S530), the display (S531) and the encoding (S532) are repeated until the stripe count variable sc becomes equal to the number of stripes Sn (S528).

Similarly, the CPU 1 adds "1" to the variable $C_{level}$, and the result "4" is obtained (S534).

The CPU 1 exchanges the frame memories respectively indicated by HFM and LFM so that the HFM indicates the frame memory 5 and the LFM indicates the frame memory 4 (S525). The magnifying power E is obtained by the equation (8), and the result "4" is set in the magnifier 9 (S526).

The stripe count variable sc is substituted by "0" (S527). The CPU 1 adds "1" to the stripe count variable sc (S529), and reads the image data of the sc-th stripe in the frame memory 5 indicated by HFM and the peripheral image data needed for reduction and encoding. The read image data is reduced to ½ by using the CODEC 3, and the image of the sc-th stripe the fourth layer image is stored at the position of the sc-th stripe of the frame memory 4 indicated by LFM (S530). When the fourth layer image of the sc-th stripe is generated in the frame memory 4, the CPU 1 inputs the fourth layer image of the sc-th stripe to the magnifier 9 via the CODEC 3 and bus 14, magnifies four times, rewrites the image data from the $(Sw/2^{Dlevel} \times (sc-1)+1)$ line to the $(Sw/2^{Dlevel})$ on the scanner window of the video frame memory 10, and updates the display on the display 12 (S531).

The CODEC 3 decodes the third layer image of the sc-th stripe of the frame memory 5 indicated by HFM with reference to the fourth layer image of the frame memory 4 indicated by the LFM, and stored the encoded data in the buffer 6 (S532). When the third layer image of the sc-th stripe has been encoded, the CODEC 3 informs of this to the CPU 1 (S533). Subsequently, the generation of the image in the stripe unit (S530), the display (S531) and the encoding (S532) are repeated until the stripe count variable sc becomes equal to the number of stripes Sn (S528).

Furthermore, the CPU 1 adds "1" to the variable $C_{level}$, and the result "5" is obtained (S534).

Since the number of layers $E_{level}$ for encoding and the variable $C_{level}$ indicating the layer being in process become equal (S524), the CPU 1 exchanges the frame memories respectively indicated by HFM and LFM so that the HFM indicates the frame memory 4 and the LFM indicates the frame memory 5 (S535). The magnifying power E=1 is set in the magnifier 9 (S536). The CPU 1 instructs the graphics controller 11 to reduce the scanner window on the display 12 to the size of the fifth layer image (S537).

The CPU 1 reduces the fourth layer image of the HFM to ½ by the CODEC 3, and stores in the fifth layer image in the LFM (S538). When the fifth layer image is generated in the frame memory 5, the CPU 1 stores the fifth layer image in the video frame memory 10 via the CODEC 10 and bus 14, and displays the image on the scanner window (S539).

The CODEC 3 encodes the fourth layer image in the frame memory 4 indicated by the HFM with reference to the fifth layer image in the frame memory 5 indicated by LFM, and the encoded data is stored in the buffer 6 (S540).

When the fourth layer image has been encoded, the CODEC 3 encodes the fifth layer image of the LFM, and the encoded data is stored in the buffer 6 (S541). The CODEC 3 indicates the end of encoding to the CPU 1 when the fifth layer image has been encoded (S542).

Similarly, when read by the scanner 17, LFM and HFM are exchanged (S518) until $C_{level}$ becomes equal to $D_{level}$ (S517). The CODEC 3 generates the layer image by ½ reduction (S519), encodes the layer image of HFM with reference to the layer image of LFM, and stored the generated encoded image in the buffer 6 (S520).

When $C_{level}$ becomes equal to $D_{level}$ (S517), the scanner window is generated and displayed (S522), and the number of stripes Sn is obtained (S523). The LFM and HFM are exchanged (S525) until $C_{level}$ becomes equal to $E_{level}$ (S524), and the magnifying power E is obtained by the equation (8) and set in the magnifier 9 (S526). The stripe count variable sc is initialized (S530), the layer image of the generated stripe is enlarged by the magnifier 9, the display on the scanner window is updated (S531), the layer image of HFM is encoded with reference to the layer image of LFM, and the generated encoded data is stored in the buffer 6 (S532).

When $C_{level}$ becomes equal to $E_{level}$ (S524), the frame memories respectively indicated by HFM and LFM are exchanged (S535), the magnifying power E is set as "1" in the magnifier 9 (S536), and the scanner window is reduced to the size of the fifth layer image (S537).

The CPU 1 reduces the fourth layer image of HFM to ½ by using the CODEC 3, stores the fifth layer image of LFM (S538), and displays on the scanner window (S539). The CODEC 3 encodes the fourth layer image of HFM with reference to the fifth layer image of LFM, and stores the generated encoded data in the buffer 6 (S540). When the fourth layer image has been encoded, the CODEC 3 encodes he fifth layer image of the LFM, and the encoded data is stored in the buffer 6 (S541). The CODEC 3 indicates the end of encoding to the CPU 1 when the fifth layer image has been encoded (S542).

Since the encoding of the image to be encoded has ended (S542), the CPU 1 instructs the graphics controller 11 to generate and display a scanner panel on the display 12 in graphics (S543). The image input panel has the "SAVE" button, "TRANSMISSION" button, and "END" button. The user confirms the fifth layer image displayed on the display 12, and determines if the encoded data is saved or transmitted or canceled, or reading is performed again by scanning the buttons on the main panel (S544).

If the input from the input apparatus 2 selects the "SAVE' button (S544–S545), header data defined by the JBIG algorithm based on the predetermined number of encoding layers $E_{level}$, stripe width Sw, and image size (Sx, Sy) is generated (S547). The CPU 1 examines the size of the encoded data stored in the buffer 6, and reserves the area of the encoded image with the header data (S548). The CPU 1 stores the generated header data at a predetermined position of the area of the storage 7 via the bus 14, and the encoded data stored in the buffer 6 at a predetermined position of the storage 7 via the CODEC 3 and bus 14 (S549).

If the input from the input apparatus 2 selects the "TRANSMISSION" button (S544–S546), the CPU 1 instructs the graphics controller 11 to generate and display a transmission panel on the display 12 in graphics (S550). The user inputs a destination from the input apparatus 2 (S551). Header data defined by the JBIG algorithm is generated from the number of layers for encoding $E_{level}$, stripe width Sw and image size (Sx, Sy). The CPU 1 transmits the header data to the communication interface 15 via the bus 14, and further transmits to the other party via the communication line 16. Subsequently, the encoding data stored in the buffer 6 is transmitted to the other party in the similar manner. When ended, the transmission panel is deleted (S554).

If the input from the input apparatus 2 is other than the "SAVE" button and "TRANSMISSION" button (S544–S546), the CPU 1 instructs the graphics controller 11 to delete the scanner window and/or scanner panel (S555).

If the input is the "END" button (S556), the image input/encoding processing ends.

If the input is an input from the main panel (S556), the process returns to the step S502.

In accordance with the above procedure, the image processing apparatus of the present invention can confirm an image display at each layer while encoding is performed. When image data is read by the scanner, the adjustment such that the binarizing means can be switched between simple binarizing processing and halftone processing, or the under color removal is performed can be realized, thus the burden of the users is reduced and the image processing is improved.

Furthermore, since the display at a rough resolution can be performed in accordance with a resolution of selected, the size of image can be grasped at a moment.

The structure as described above can further have the following variations.

For example, the image input/output apparatus is not limited to the scanners and displays, and the number is also not limited. Furthermore, the CODEC can generate the header data.

The progressive build-up encoding is not limited to the JBIG algorithm, and it can be replaced by anything capable of encoding images whose resolutions are different.

The structure of the frame memory is not limited to the above embodiments, for it can be arranged so as to be directly connected to the bus or the frame memory can be replaced by a memory belong to the CPU.

The number of layers at encoding process is not limited to five layers. The number of layers can be varied for each image.

A new magnifying power E can be set by magnifying the magnifying power E by (Rd/Rd1) from the resolution Rd1= $Rc/2^{Dlevel}$ where the display and the resolution of an image are matched (in case of the scanner 17, the resolution is 75 dpi) and the resolution Rd of display.

The structures of the window and panel are not limited to those in the embodiments, and the means for displaying images are also not limited.

Updating of the display is performed in each stripe unit, however, the unit is not limited to the embodiment. For example, the unit can be an entire image, a single line, a plurality lines (e.g., two lines), 2×2 pixel block, or a single pixel.

Furthermore, the resolution of the image input apparatus at encoding can be added to the header information.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which decodes data obtained by encoding image data where an original image is reduced at a plurality of predetermined layers, comprising:

encoded data input means for inputting encoded data;

decoding means for decoding the encoded data inputted by said input means at each layer; and display means for displaying an image on the basis of the image data decoded by said decoding means layer by layer, wherein said display means has a predetermined resolution, and when the predetermined resolution is lower than a resolution of image data decoded at a layer of interest, a partial image based on the image data decoded at the layer of interest is displayed, and an image based on image data decoded at a layer that has a resolution lower than the predetermined resolution is also displayed, and when the predetermined resolution is higher than the resolution of the image data decoded by said decoding means, an image based on the image data is entirely displayed, preserving the resolution of the decoded image.

2. The image processing apparatus according to claim 1, further comprising decoding instruction means for instructing to decode the encoded data at each layer, and wherein said decoding means decodes the encoded data at every layer in accordance with the instruction.

3. The image processing apparatus according to claim 1, further comprising:

print instruction means for instructing printing; and printing means for printing an image, and when wherein said print instruction means instructs printing, said decoding means decodes the encoded data of each layer to obtain and print the original image.

4. The image processing apparatus according to claim 1, wherein when the predetermined resolution of said display means is higher than the resolution of the decoded image, the decoded image is enlarged and displayed in accordance with the predetermined resolution.

5. The image processing apparatus according to claim 1, wherein the resolution of said display means is stored in the register.

6. The image processing method according to claim 1, wherein said display step uses a display having a predetermined resolution, and when the predetermined resolution is lower than the resolution of the decoded image, the decoded image is partially displayed in accordance with the predetermined resolution.

7. An image processing apparatus which decodes data obtained by encoding image data where an original image is reduced at a plurality of predetermined layers, comprising:

list display means for displaying an image list by decoding the data in an encoded layer where the original image is reduced at a predetermined layer;

button display means for displaying a displaying instruction button to instruct displaying of the image at a next layer, and a printing instruction button to instruct decoding and printing of the original image;

image selection means for selecting a desired image out of the reduced images displayed by said list display means;

button selection means for selecting a desired button from the buttons displayed by said button display means;

image display means for displaying decoded data;

printing means, having a predetermined resolution, for printing decoded images; and control means for controlling said image display means to display the selected image selected by said image selection means in a resolution of the next layer when the displaying instruction button is selected by said button selection means, and controlling said printing means to print the selected image having a predetermined resolution when the printing instruction button is selected by said button selection means.

8. the image processing apparatus according to claim 7, wherein said image display means displays the image to be displayed in the frame in a predetermined size.

9. An image processing method which decodes data obtained by encoding image data where an original image is reduced at a plurality of predetermined layers, comprising:

an encoded data input step of inputting encoded data;

a decoding step of decoding the encoded data inputted in said input step for each layer; and a display step of displaying an image on the basis of the image data decoded in said decoding step layer by layer on display means, wherein said display means has a predetermined resolution, and when the predetermined resolution is lower than a resolution of image data decoded at a layer of interest, a partial image based on the image data decoded at the layer of interest is displayed, and an image based on image data decoded at a layer that has a resolution lower than the predetermined resolution is also displayed, and when the predetermined resolution is higher than the resolution of the image data decoded in said decoding step, an image based on the image data is entirely displayed, preserving the resolution of the decoded image.

10. The image processing method according to claim 9, further comprising decoding instruction step for instructing to decode the encoded data each layer, and wherein said decoding step includes decoding the encoded data every layer in accordance with the instruction.

11. The image processing method according to claim 9, further comprising:

a print instruction step for instructing a printing; and a printing step for a printing an image, and wherein when said print instruction step instructs printing, said decoding step decodes the encoded data of each layer to obtain and print the original image.

12. The image processing apparatus according to claim 9, wherein said display step uses a display having a predetermined resolution, and when the predetermined resolution is higher than the resolution of the decoded image, the decoded image is enlarged and displayed in accordance with the predetermined resolution.

13. The image processing method according to claim 12 or 6, wherein the resolution of the display is stored in the register.

14. An image processing method which decodes data obtained by encoding image data where an original image is reduced at a plurality of predetermined layers, comprising:

a list display step for displaying an image list by decoding the data in an encoded layer where the original image is reduced at a predetermined layer;

a button display step for displaying a displaying instruction button to instruct displaying of the image at a next layer, and a printing instruction button to instruct decoding and printing of the original image;

an image selection step for selecting a desired image out of the reduced images displayed in said list display step;

a button selection step for selecting a desired button from the buttons displayed in said button display step; and an output step of displaying the selected image selected at said image selection step in a resolution of the next layer when the displaying instruction button is selected at said button selection step, and printing the selected image having a predetermined resolution when the printing instruction button is selected at said button selection step.

15. The image processing method according to claim 14, wherein said image display step includes displaying the image to be displayed in the frame in a predetermined size.

16. An image processing apparatus comprising:

input means for inputting encoded image data encoded at multiple layers by progressive built-up coding;

decoding means for decoding the encoded data inputted by said input means, and generating image data for a layer;

first storage means for storing the image data decoded by said decoding means;

second storage means for storing the image data decoded by said decoding means based on the image data stored in said first storage means;

display means, having a predetermined resolution, for displaying an image on the basis of the image data decoded by said decoding means; and control means for controlling said display means so as to display an image on the basis of the image data stored in said first and second means based on a resolution of the image data decoded by said decoding means and the resolution of said display means, wherein when the predetermined resolution is lower than a resolution of image data decoded at a layer of interest, a partial image based on the image data decoded at the layer of interest is displayed, and an image based on image data decoded at a layer that has a resolution lower than the predetermined resolution is also displayed, and when the predetermined resolution is higher than the resolution of the image data decoded by said decoding means, an image based on the image data is entirely displayed, preserving the resolution of the decoded image.

17. The image processing apparatus according to claim 16, wherein said control means has magnifying means for magnifying the image data stored in said second storage means and synthesizing means for synthesizing the image data stored in said first storage means and the image data magnified by said magnifying means.

18. The image processing apparatus according to claim 17, wherein said control means has designating means for designating a part of the image data stored in said second storage.

19. The image processing apparatus according to claim 16, wherein said first storage means and second storage means are alternatively used in accordance with a layer to be decoded by said decoding means.

20. The image processing apparatus according to claim 16, further comprising:

means for storing the resolutions of said image data; and
means for storing the resolution of said output means.

21. An image processing method comprising the steps of:

inputting encoded image data encoded at multiple layers by progressive built-up coding;

generating the image data at a first layer by decoding the encoded image data;

storing the decoded image data at the first layer into first memory;

generating image data at a second layer next to the first layer by decoding the encoded image data based on the image data stored in the first memory:

storing image data decoded at the second layer in second memory; and controlling display means having a predetermined resolution to display an image on the basis of the image data stored in the first memory and the second memory based on a resolution of the image data in each layer and the resolution of the display means, wherein when the predetermined resolution is lower than a resolution of image data decoded at a layer of interest, a partial image based on the image data decoded at the layer of interest is displayed, and an image based on image data decoded at a layer that has a resolution lower than the predetermined resolution is also displayed, and when the predetermined resolution is higher than the resolution of the image data decoded in said decoding step, an image based on the image data is entirely displayed, preserving the resolution of the decoded image.

22. A computer readable storage medium storing a computer program which decodes data obtained by encoding image data where an original image is reduced at a plurality of predetermined layers, said program comprising the processing steps of:

inputting encoded data;

decoding the encoded data inputted in said inputting step at each layer; and displaying an image on the basis of the image data decoded in said decoding step layer by layer on display means, wherein said display means has a predetermined resolution, and when the predetermined resolution is lower than a resolution of image data decoded at a layer of interest, a partial image based on the image data decoded at the layer of interest is displayed, and an image based on image data decoded at a layer that has a resolution lower than the predetermined resolution is also displayed, and when the predetermined resolution is higher than the resolution of the image data decoded in said decoding atep, an image based on the image data is entirely displayed, preserving the resolution of the decoded image.

23. A computer readable storage medium storing a computer program which decodes data obtained by encoding image data where an original image is reduced at a plurality of predetermined layers, said program comprising:

a list display processing step of displaying an image list by decoding the data in an encoded layer where the original image is reduced at a predetermined layer;

a button display processing step of displaying a displaying instruction button to instruct displaying of the image at a next layer, and a printing instruction button to instruct decoding and printing of the original image;

an image selection processing step of selecting a desired image out of the reduced images displayed in said list display step; and an output processing step of displaying the selected image selected at said image selection step in a resolution of the next layer when the displaying instruction button is selected, and printing the selected image having a predetermined resolution when the printing instruction button is selected.

24. A computer readable storage medium storing a computer program, said program comprising the processing steps of:

inputting encoded image data encoded at multiple layers by progressive built-up coding;

generating the image data at a first layer by decoding the encoded image data;

storing the decoded image data at the first layer into a first memory;

generating the image data at a second layer next to the first layer by decoding the encoded image data based on the image data stored in the first memory;

storing image data decoded at the second layer into a second memory; and controlling display means having a predetermined resolution to display an image on the basis of the image data stored in the first memory and the second memory based on resolution of the image data in each layer and the resolution of the display means, wherein when the predetermined resolution is lower than a resolution of image data decoded at a layer of interest, a partial image based on the image data decoded at the layer of interest is displayed, and an image based on image data decoded at a layer that has a resolution lower than the predetermined resolution is also displayed, and when the predetermined resolution is higher than the resolution of the image data decoded in said decoding step, an image based on the image data is entirely displayed, preserving the resolution of the decoded image.

* * * * *

UNITED STATES PATENT AND TRADEMARK OFFICE
CERTIFICATE OF CORRECTION

PATENT NO. : 6,026,192
DATED : February 15, 2000
INVENTOR(S) : MITSURU MAEDA

Page 1 of 5

It is certified that error appears in the above-identified patent and that said Letters Patent is hereby corrected as shown below:

ON THE TITLE PAGE:

[57] ABSTRACT

Line 9, "display" should read --the display--; and
Line 14, "to be" should be deleted.

Figure 19:
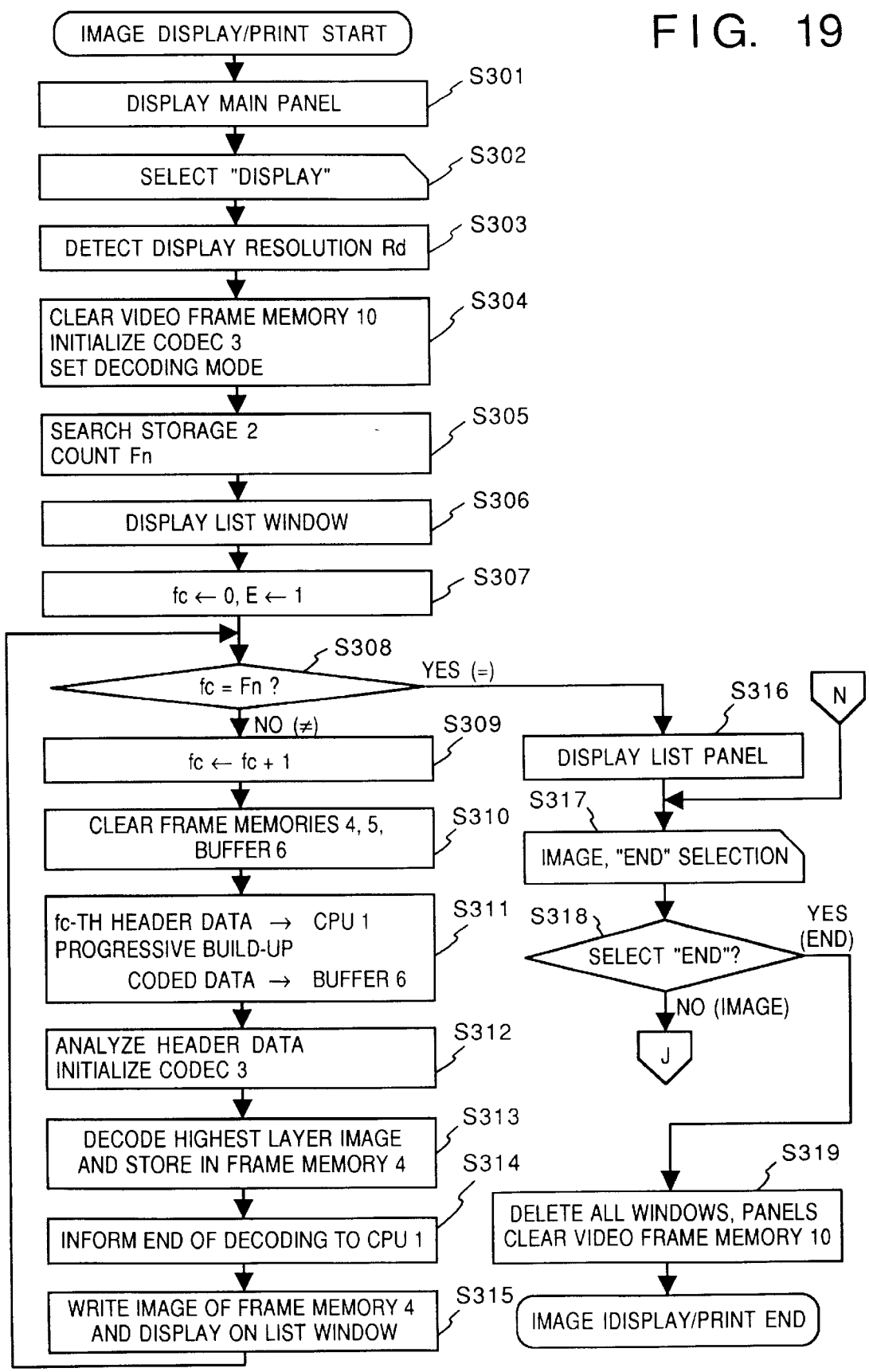
FIGS. 19–23 are flowcharts illustrating an example of the procedure of image display and printing in the image processing method according to the present invention.
Figure 20:
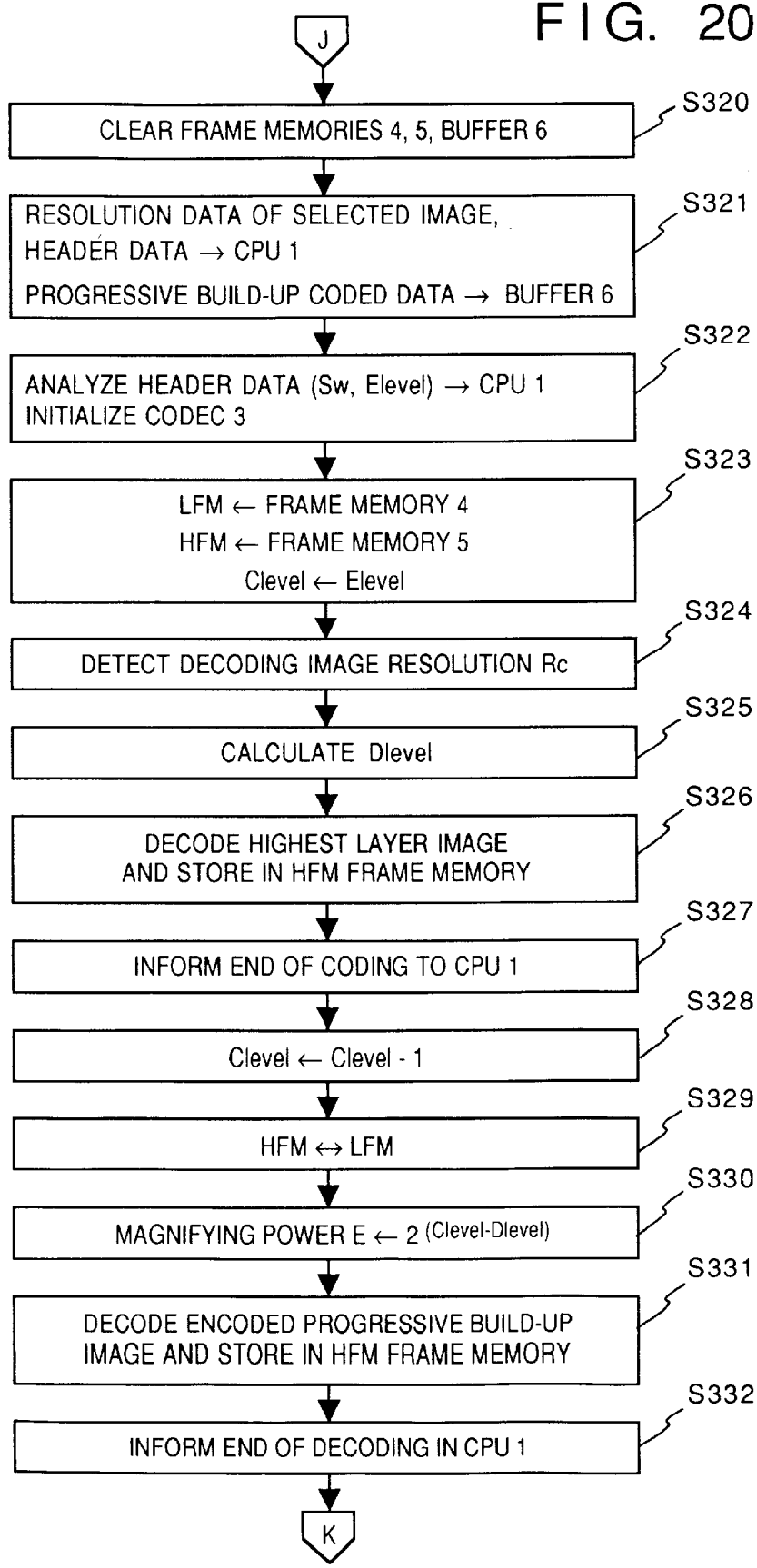
Figure 21:
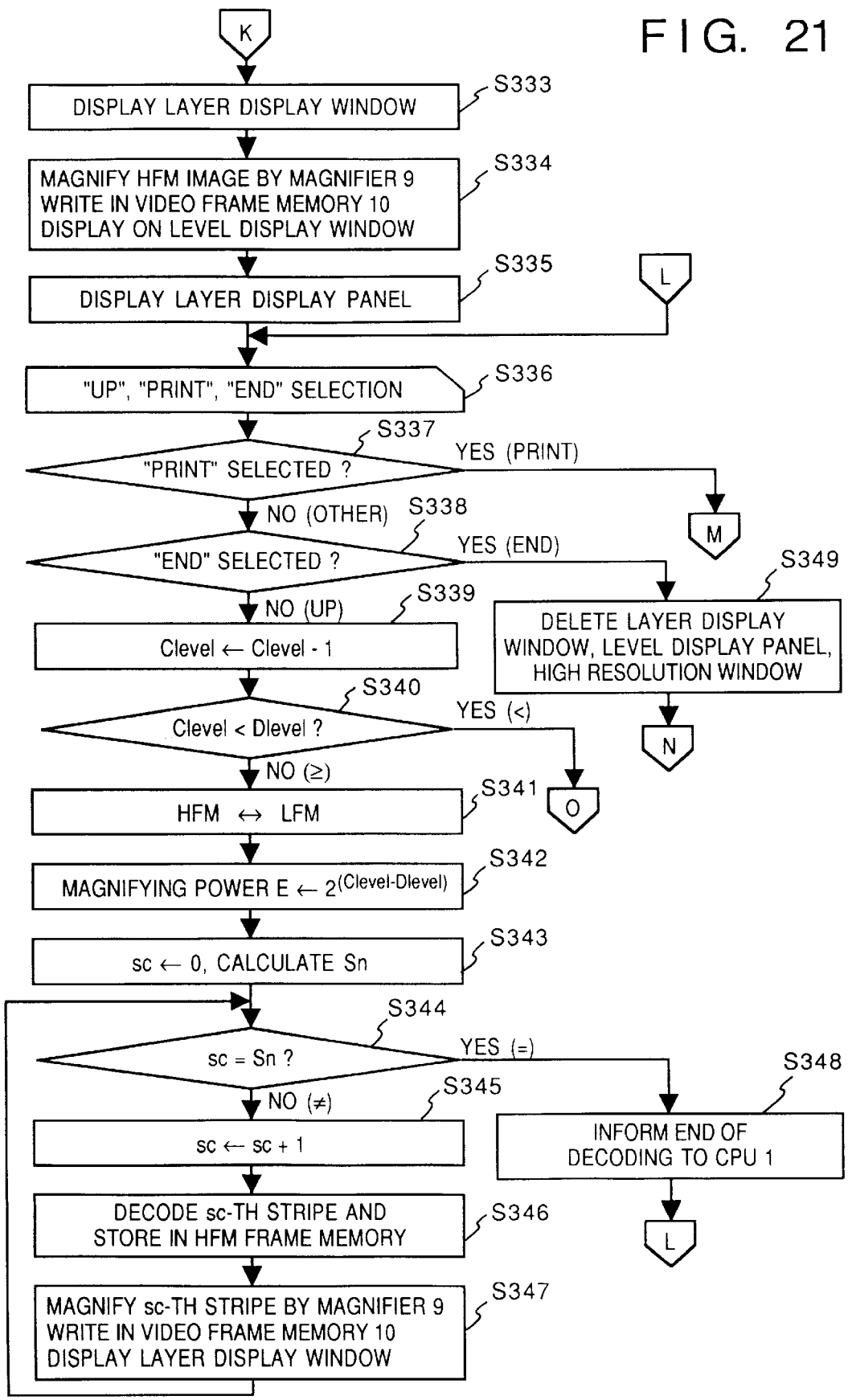
Figure 22:
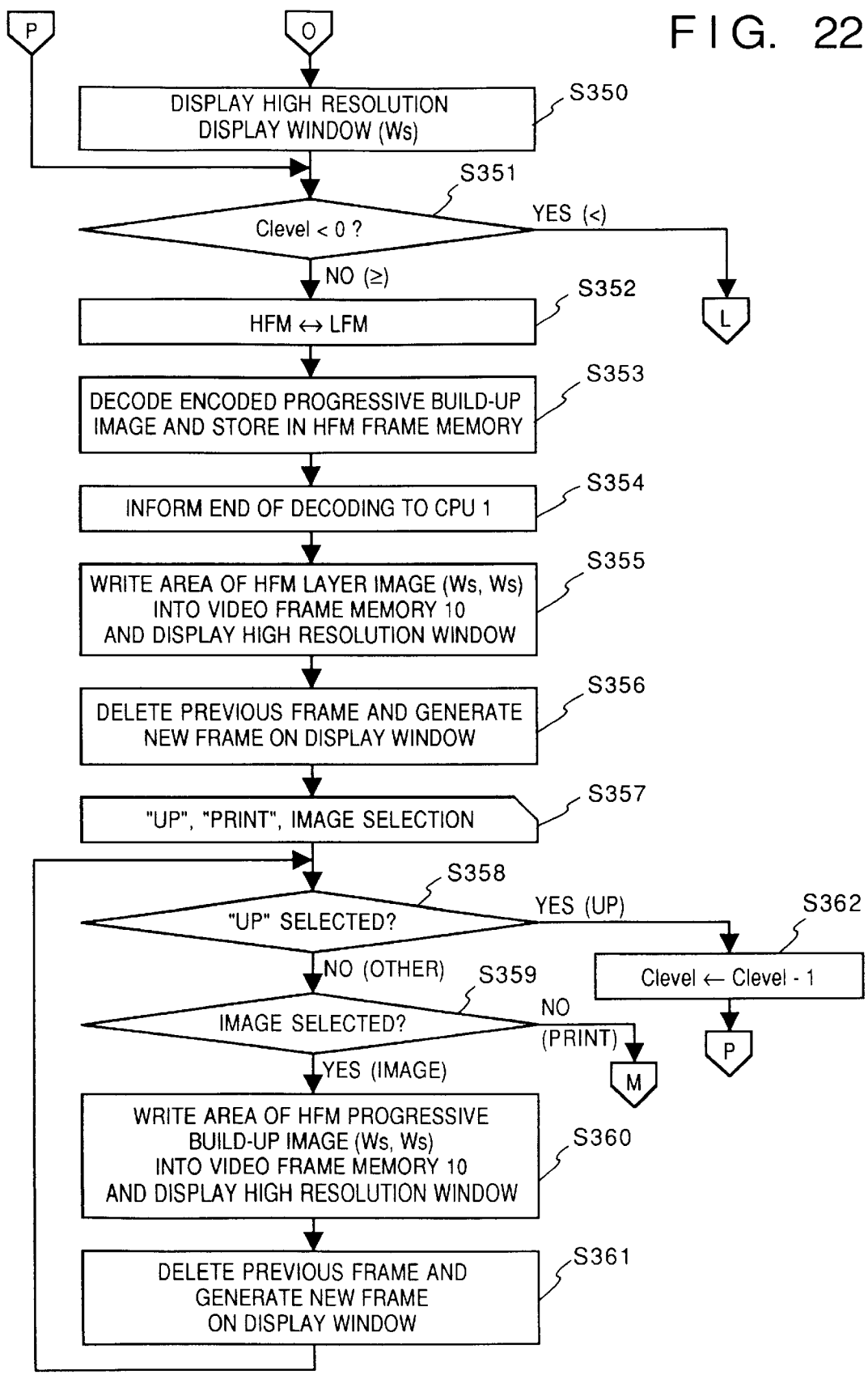
Figure 23:
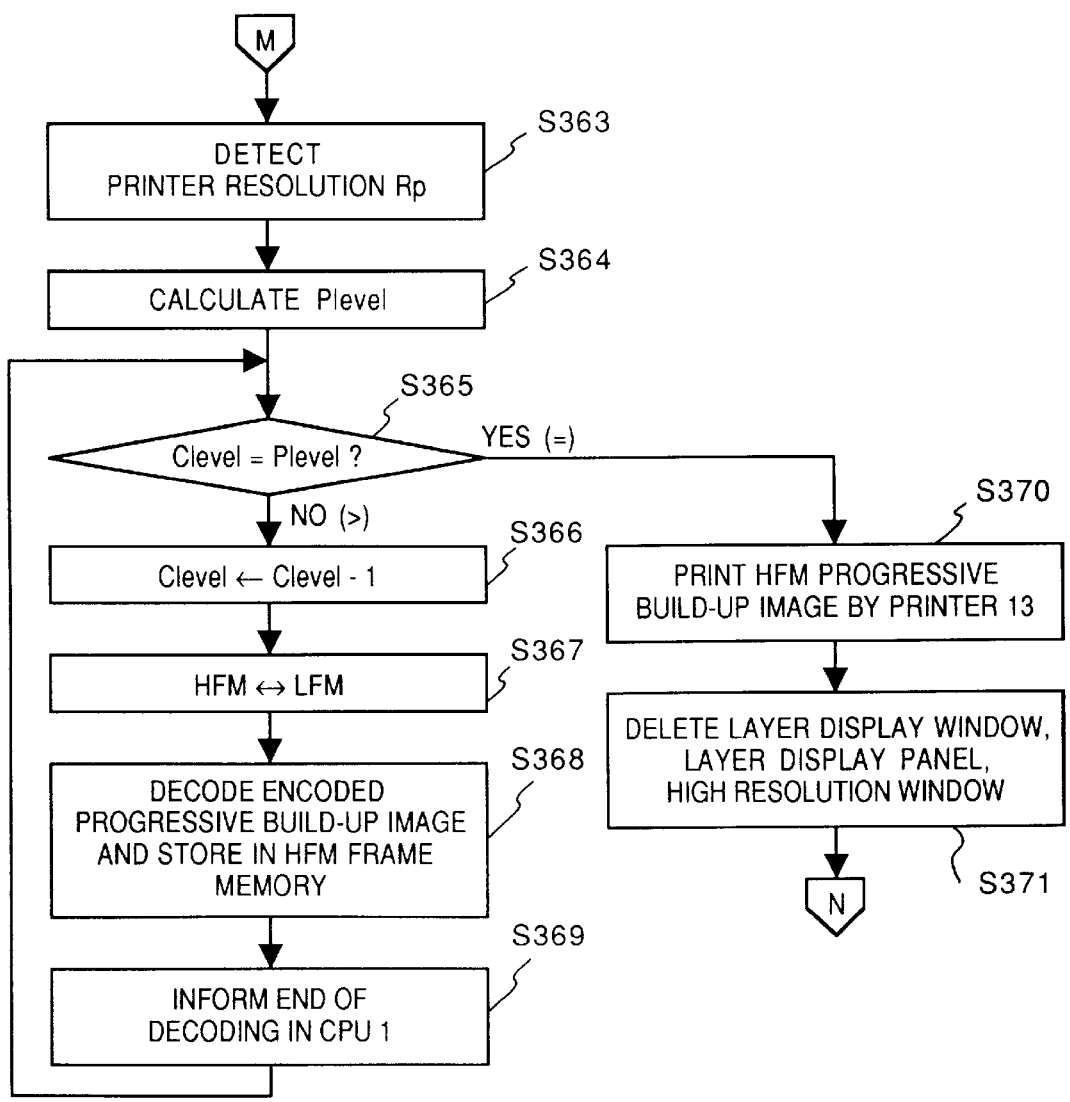

IN THE DRAWINGS:

Sheet 17 of 40, FIG. 17, "MEORY" should read --MEMORY--; and
Sheet 19 of 40, FIG. 19, "IDISPLAY" should read --DISPLAY--.

COLUMN 1:

Line 29, "(an" should read --(a--.

COLUMN 4:

Line 38, "of" should be deleted;
Line 49, "$E_{level} C_{level}$," should read --$E_{level} \neq C_{level}$,--;
Line 59, "(S013)." --no line break--; and
Line 60, "¶ That" --no paragraph indent--.

COLUMN 5:

Line 32, "in" (second occurrence) should be deleted.

COLUMN 7:

Line 65, "waits" should read --waits for--.

UNITED STATES PATENT AND TRADEMARK OFFICE
CERTIFICATE OF CORRECTION

PATENT NO.    :  6,026,192
DATED         :  February 15, 2000
INVENTOR(S)   :  MITSURU MAEDA It is certified that error appears in the above-identified patent and that said Letters Patent is hereby corrected as shown below:

COLUMN 8:

Line 27, "waits" should read --waits for--; and
Line 28, "th" should read --to--.

COLUMN 9:

Line 41, "waits" should read --waits for--; and
Line 43, "an" should be deleted.

COLUMN 11:

Line 58, "been" should be deleted.

COLUMN 12:

Line 15, "in" (second occurrence) should be deleted; and
Line 60, "of" should be deleted.

COLUMN 13:

Line 40, "of" should be deleted.

COLUMN 14:

Line 33, "waits" should read --waits for--;
Line 34, "th" should read --to--;
Line 40, "(S339)." --no line break--; and
Line 41, "¶ Furthermore" --no paragraph indent--.

UNITED STATES PATENT AND TRADEMARK OFFICE
CERTIFICATE OF CORRECTION

PATENT NO. : 6,026,192
DATED : February 15, 2000
INVENTOR(S) : MITSURU MAEDA

*It is certified that error appears in the above-identified patent and that said Letters Patent is hereby corrected as shown below:*

COLUMN 15:

Line 28, "waits" should read --waits for--; and
Line 30, "an" should be deleted.

COLUMN 16:

Line 7, "waits" should read --waits for--; and
Line 10, "an" should be deleted; and
Line 23, "$(Px-Ws/2^{(Dlevel-Clevel-1)}.$" should read --$(Px-Ws/2^{(Dlevel-Clevel-1)},$--.

COLUMN 19:

Line 17, "(S412)" should read --(S412).--.

COLUMN 22:

Line 22, "an" should read --a--.

COLUMN 23:

Line 7, "(S516)" should read --(S516).--.

COLUMN 24:

Line 23, "stripe" should read --stripe of--.

COLUMN 25:

Line 5, "stored" should read --stores--; and
Line 31, "he" should read --the--.

UNITED STATES PATENT AND TRADEMARK OFFICE
CERTIFICATE OF CORRECTION

PATENT NO.   :   6,026,192

DATED        :   February 15, 2000

INVENTOR(S)  :   MITSURU MAEDA

It is certified that error appears in the above-identified patent and that said Letters Patent is hereby corrected as shown below:

COLUMN 26:

Line 31, "belong" should read --belonging--; and
    Line 46, "plurality" should read --plurality of --.

COLUMN 27:

Line 17, "comprising" should read --comprising:--.

COLUMN 28:

Line 4,  "the" should read --The--;
    Line 29, "comprising" should read --comprising:--;
    Line 31, "each" should read --for each--; and
    Line 39, "a" should be deleted.

UNITED STATES PATENT AND TRADEMARK OFFICE
CERTIFICATE OF CORRECTION

PATENT NO. : 6,026,192

DATED : February 15, 2000

INVENTOR(S) : MITSURU MAEDA

It is certified that error appears in the above-identified patent and that said Letters Patent is hereby corrected as shown below:

COLUMN 30:

Line 41, "atep" should read --step--.

Signed and Sealed this

Twenty-fourth Day of April, 2001

Attest:

NICHOLAS P. GODICI

Attesting Officer    Acting Director of the United States Patent and Trademark Office